US009765568B2

(12) United States Patent
Colson et al.

(10) Patent No.: US 9,765,568 B2
(45) Date of Patent: Sep. 19, 2017

(54) METHODS AND APPARATUS TO CONTROL ARCHITECTURAL OPENING COVERING ASSEMBLIES

(71) Applicant: Hunter Douglas Inc., Pearl River, NY (US)

(72) Inventors: Wendell B. Colson, Weston, MA (US); Daniel M. Fogarty, Framingham, MA (US); Paul G. Swiszcz, Niwot, CO (US); Jörg Bohlen, Bremerhaven (DE); Kevin M. Dann, Englewood, CO (US); William Johnson, Milford, MA (US)

(73) Assignee: Hunter Douglas Inc., Pearl River, NY (US)

( * ) Notice: Subject to any disclaimer, the term of this patent is extended or adjusted under 35 U.S.C. 154(b) by 0 days.

(21) Appl. No.: 14/349,629

(22) PCT Filed: Oct. 3, 2012

(86) PCT No.: PCT/US2012/000428
§ 371 (c)(1),
(2) Date: Apr. 3, 2014

(87) PCT Pub. No.: WO2013/052083
PCT Pub. Date: Apr. 11, 2013

(65) Prior Publication Data
US 2014/0290870 A1    Oct. 2, 2014

Related U.S. Application Data

(60) Provisional application No. 61/542,760, filed on Oct. 3, 2011, provisional application No. 61/648,011, filed on May 16, 2012.

(51) Int. Cl.
G05B 7/00    (2006.01)
E06B 9/74    (2006.01)
(Continued)

(52) U.S. Cl.
CPC ............... *E06B 9/74* (2013.01); *E06B 9/264* (2013.01); *E06B 9/32* (2013.01); *E06B 9/322* (2013.01);
(Continued)

(58) Field of Classification Search
USPC ........ 318/9, 14, 115, 489, 560, 568.17, 652, 318/48, 127, 400.16, 282, 265, 286, 1,
(Continued)

(56) References Cited

U.S. PATENT DOCUMENTS 2,878,865 A    3/1959    Manley
3,186,473 A    6/1965    Myers et al.
(Continued)

FOREIGN PATENT DOCUMENTS

AU    2010901077    3/2010
CN    1331945    1/2002
(Continued)

OTHER PUBLICATIONS

Patent Cooperation Treaty, "International Search Report," issued in connection with Application No. PCT/US2012/000429, mailed Dec. 17, 2012, 3 pages.
(Continued)

*Primary Examiner* — Jorge L Carrasquillo
(74) *Attorney, Agent, or Firm* — Hanley, Flight & Zimmerman, LLC

(57) ABSTRACT

Methods and apparatus to control architectural opening covering assemblies are disclosed herein. An example architectural opening covering assembly includes a manual controller operatively coupled to a tube to rotate the tube. The tube includes an architectural opening covering. The example architectural opening covering assembly also includes a motor operatively coupled to the tube to rotate the tube. A local controller is communicatively coupled to the
(Continued)

motor to control the motor. The example architectural opening covering assembly further includes a gravitational sensor to determine an angular position of the tube.

21 Claims, 27 Drawing Sheets

(51) Int. Cl.

| | | |
|---|---|---|
| *E06B 9/32* | (2006.01) | |
| *E06B 9/40* | (2006.01) | |
| *E06B 9/68* | (2006.01) | |
| *E06B 9/42* | (2006.01) | |
| *F16H 59/02* | (2006.01) | |
| *E06B 9/72* | (2006.01) | |
| *E06B 9/264* | (2006.01) | |
| *E06B 9/322* | (2006.01) | |
| *E06B 9/78* | (2006.01) | |
| *E06B 9/26* | (2006.01) | |
| *E06B 9/24* | (2006.01) | |
| *E06B 9/262* | (2006.01) | |

(52) U.S. Cl.
CPC ............... *E06B 9/40* (2013.01); *E06B 9/42* (2013.01); *E06B 9/68* (2013.01); *E06B 9/72* (2013.01); *E06B 9/78* (2013.01); *F16H 59/0278* (2013.01); *E06B 9/26* (2013.01); *E06B 2009/2429* (2013.01); *E06B 2009/2627* (2013.01); *E06B 2009/6809* (2013.01); *E06B 2009/6818* (2013.01); *E06B 2009/6845* (2013.01); *E06B 2009/6854* (2013.01); *E06B 2009/785* (2013.01); *Y10T 74/2014* (2015.01)

(58) Field of Classification Search
USPC ....... 318/831, 540, 626, 266, 466, 467, 468, 318/566; 160/84.02, 310, 331
See application file for complete search history.

(56) References Cited

U.S. PATENT DOCUMENTS

| | | | |
|---|---|---|---|
| 3,732,914 A | 5/1973 | Flageollet | |
| 3,853,167 A * | 12/1974 | Wardlaw | E06B 9/84 160/133 |
| 4,085,345 A | 4/1978 | Bullat | |
| 4,112,996 A | 9/1978 | Fühl | |
| 4,372,367 A | 2/1983 | Baldanello et al. | |
| 4,413,665 A | 11/1983 | Corcoran | |
| 4,417,185 A | 11/1983 | Bullat | |
| 4,472,910 A | 9/1984 | Iha | |
| 4,519,487 A | 5/1985 | Florin | |
| 4,519,554 A | 5/1985 | Dussoliet et al. | |
| 4,560,046 A | 12/1985 | Lorello et al. | |
| 4,618,804 A | 10/1986 | Iwasaki | |
| 4,766,941 A | 8/1988 | Sloop et al. | |
| 4,794,715 A | 1/1989 | Cherwin | |
| 4,807,686 A | 2/1989 | Schnebly et al. | |
| 4,972,129 A * | 11/1990 | Kawai | H02P 7/03 180/268 |
| 4,979,603 A | 12/1990 | Wheatland | |
| 5,039,925 A | 8/1991 | Schap | |
| 5,105,871 A | 4/1992 | Baud et al. | |
| 5,547,009 A | 8/1996 | Plumer | |
| 5,671,387 A | 9/1997 | Jacobs et al. | |
| 5,709,349 A | 1/1998 | Villette et al. | |
| 5,794,381 A | 8/1998 | Rizkovsky | |
| 5,799,716 A | 9/1998 | Yamaguchi et al. | |
| 5,803,150 A | 9/1998 | Boiteau | |
| 5,839,555 A | 11/1998 | Hsieh | |
| 5,848,634 A | 12/1998 | Will et al. | |
| 5,975,185 A | 11/1999 | Miller et al. | |
| 6,104,156 A | 8/2000 | Bruno | |
| 6,111,376 A | 8/2000 | Jean-Marc | |
| 6,158,563 A | 12/2000 | Welfonder et al. | |
| 6,244,325 B1 | 6/2001 | Miller et al. | |
| 6,259,218 B1 * | 7/2001 | Kovach | E06B 9/262 318/16 |
| 6,341,638 B1 | 1/2002 | Thompson et al. | |
| 6,346,889 B1 | 2/2002 | Moss | |
| 6,381,903 B1 * | 5/2002 | Desrochers | E06B 9/74 160/310 |
| 6,497,267 B1 | 12/2002 | Azar et al. | |
| 6,571,853 B1 | 6/2003 | Ciuca et al. | |
| 6,628,029 B2 | 9/2003 | Astegno | |
| 6,680,594 B2 | 1/2004 | Collett et al. | |
| 6,733,413 B2 | 5/2004 | Lagarde et al. | |
| 6,751,909 B2 | 6/2004 | Ranaudo | |
| 6,810,997 B2 | 11/2004 | Schreiber et al. | |
| 6,843,301 B2 | 1/2005 | Carrillo et al. | |
| 6,843,303 B2 | 1/2005 | Siak et al. | |
| 6,979,962 B2 | 12/2005 | Cavarec et al. | |
| 7,089,991 B2 | 8/2006 | Jorgensen et al. | |
| 7,134,474 B2 | 11/2006 | Lagarde et al. | |
| 7,240,582 B1 * | 7/2007 | Manaras | E06B 9/74 74/563 |
| 7,261,139 B2 * | 8/2007 | Varley | E06B 9/76 160/310 |
| D553,079 S | 10/2007 | Poulet et al. | |
| 7,466,090 B2 | 12/2008 | Meewis et al. | |
| 7,481,133 B2 * | 1/2009 | Walravens | E05F 15/603 49/139 |
| 7,599,612 B2 | 10/2009 | Moseley et al. | |
| 7,726,379 B2 | 6/2010 | Beau | |
| 7,770,961 B2 | 8/2010 | Oxley | |
| 7,839,109 B2 | 11/2010 | Carmen, Jr. et al. | |
| 8,037,922 B2 | 10/2011 | Hawkins et al. | |
| 8,125,167 B1 | 2/2012 | Mullet et al. | |
| 8,339,086 B2 | 12/2012 | Feldstein et al. | |
| 8,368,328 B2 | 2/2013 | Mullet et al. | |
| 8,575,872 B2 | 11/2013 | Mullet et al. | |
| 8,662,139 B2 | 3/2014 | Anthony et al. | |
| 8,723,454 B2 * | 5/2014 | Skinner | E06B 9/322 318/16 |
| 8,910,695 B2 | 12/2014 | Knight | |
| 8,931,541 B2 | 1/2015 | Chambers et al. | |
| 8,947,027 B2 | 2/2015 | Mullet et al. | |
| 9,181,750 B2 | 11/2015 | Ticoalu et al. | |
| 2002/0011262 A1 | 1/2002 | Dieckmann | |
| 2002/0153854 A1 * | 10/2002 | Reed | E06B 9/68 318/466 |
| 2002/0190678 A1 | 12/2002 | Huber et al. | |
| 2004/0011477 A1 | 1/2004 | Walker et al. | |
| 2004/0169490 A1 | 9/2004 | Heurtault | |
| 2004/0169940 A1 | 9/2004 | Yoshida | |
| 2005/0035238 A1 * | 2/2005 | Fun | E06B 9/72 242/381 |
| 2005/0051283 A1 | 3/2005 | Chatellard et al. | |
| 2005/0173080 A1 | 8/2005 | Carmen, Jr. et al. | |
| 2005/0253710 A1 * | 11/2005 | Eskildsen | G08B 13/08 340/545.5 |
| 2006/0042763 A1 | 3/2006 | Le Ru | |
| 2006/0042765 A1 * | 3/2006 | Varley | E06B 9/76 160/310 |
| 2006/0086874 A1 | 4/2006 | Habel et al. | |
| 2008/0052034 A1 | 2/2008 | David et al. | |
| 2008/0052220 A1 | 2/2008 | David et al. | |
| 2008/0283200 A1 | 11/2008 | Hummel et al. | |
| 2009/0005911 A1 | 1/2009 | Decroix et al. | |
| 2009/0256021 A1 | 10/2009 | Dorrough | |
| 2010/0006240 A1 | 1/2010 | Cieslik | |
| 2010/0018654 A1 | 1/2010 | Skinner et al. | |
| 2010/0073262 A1 * | 3/2010 | Matsumoto | G02B 27/0176 345/8 |
| 2010/0191409 A1 | 7/2010 | Weston | |
| 2010/0200176 A1 | 8/2010 | Magli | |
| 2010/0236891 A1 | 9/2010 | Lagarde et al. | |
| 2010/0244602 A1 | 9/2010 | Perret et al. | |
| 2010/0279779 A1 | 11/2010 | Anthoine | |
| 2011/0048655 A1 | 3/2011 | Andreasen et al. | |

(56) References Cited

U.S. PATENT DOCUMENTS

| | | | |
|---|---|---|---|
| 2011/0073262 A1* | 3/2011 | Frede | E06B 9/62 160/309 |
| 2011/0139380 A1 | 6/2011 | Anthony et al. | |
| 2011/0203748 A1* | 8/2011 | Mullet | E06B 9/42 160/310 |
| 2011/0203754 A1 | 8/2011 | Mullet et al. | |
| 2012/0200247 A1 | 8/2012 | Baugh | |
| 2013/0199735 A1 | 8/2013 | Colson et al. | |
| 2014/0090787 A1 | 4/2014 | Colson et al. | |
| 2014/0133019 A1 | 5/2014 | Mullet et al. | |
| 2014/0224437 A1 | 8/2014 | Colson et al. | |
| 2014/0262058 A1 | 9/2014 | Mullet et al. | |
| 2014/0262078 A1 | 9/2014 | Colson et al. | |
| 2015/0090409 A1 | 4/2015 | Mullet et al. | |

FOREIGN PATENT DOCUMENTS

| | | | |
|---|---|---|---|
| CN | 2823518 | | 10/2006 |
| CN | 1981311 | | 6/2007 |
| CN | 201202392 | | 3/2009 |
| CN | 201943550 | | 8/2011 |
| CN | 102333469 | | 1/2012 |
| DE | 29818023 | | 12/1998 |
| DE | 202011051106 | | 9/2011 |
| EP | 0783072 | A1 | 7/1997 |
| EP | 0838574 | | 4/1998 |
| EP | 0940553 | A2 | 9/1999 |
| EP | 1659256 | | 5/2006 |
| EP | 2192249 | | 6/2010 |
| JP | 59230942 | | 12/1984 |
| JP | 622797 | | 1/1987 |
| JP | 253496 | | 4/1990 |
| JP | 7477 | | 1/1995 |
| JP | 08199950 | | 8/1996 |
| JP | H1046961 | | 2/1998 |
| JP | 2002070465 | | 3/2002 |
| JP | 2004190476 | | 7/2004 |
| JP | 2004237362 | | 8/2004 |
| JP | 20062531 | | 1/2006 |
| JP | 2006233418 | | 9/2006 |
| WO | WO0241740 | | 5/2002 |
| WO | 2010011751 | A1 | 1/2010 |
| WO | WO 2010011751 | A1 * | 1/2010 ............. E06B 9/322 |
| WO | 2011113094 | | 9/2011 |

OTHER PUBLICATIONS

Patent Cooperation Treaty, "Written Opinion of the International Searching Authority," issued in connection with Application No. PCT/US2012/000429, mailed Dec. 17, 2012, 5 pages.

Patent Cooperation Treaty, "International Search Report," issued in connection with Application No. PCT/US2012/000428, mailed Dec. 21, 2012, 3 pages.

Patent Cooperation Treaty, "Written Opinion of the International Searching Authority," issued in connection with Application No. PCT/US2012/000428, mailed Dec. 21, 2012, 6 pages.

Patent Cooperation Treaty, "International Preliminary Report on Patentability," issued in connection with Application No. PCT/US2011/038469, mailed Dec. 13, 2012, 10 pages.

Patent Cooperation Treaty, "International Search Report," issued in connection with Application No. PCT/US2011/038469, mailed Sep. 23, 2011, 4 pages.

Patent Cooperation Treaty, "Written Opinion of the International Searching Authority," issued in connection with Application No. PCT/US2011/038469, mailed Sep. 23, 2011, 7 pages.

International Bureau, "International Preliminary Report on Patentability," issued in connection with application No. PCT/US2012/000429, mailed on Apr. 17, 2014, 7 pages.

International Bureau, "International Preliminary Report on Patentability," issued in connection with application No. PCT/US2012/000428, mailed on Apr. 17, 2014, 8 pages.

International Searching Authority,"International Search Report and Written Opinion of the International Searching Authority," issued in connection with application No. PCT/US2014/028534, mailed on Aug. 5, 2014, 11 pages.

European Patent Office, "Extended European Search Report," issued in connection with European application No. 13186952.1, on Jan. 9, 2015, 9 pages.

United States Patent and Trademark Office, "Final Office Action," issued in connection with U.S. Appl. No. 12/816,152, on Jul. 9, 2013. (7 pages).

United States Patent and Trademark Office, "Non-Final Office Action" issued in connection with U.S. Appl. No. 12/816,152, on Nov. 20, 2012. (11 pages).

United States Patent and Trademark Office, "Non-Final Office Action" issued in connection with U.S. Appl. No. 14/044,832, on Nov. 6, 2014. (26 pages).

United States Patent and Trademark Office, "Non-Final Office Action," issued in connection with U.S. Appl. No. 12/816,152, on May 31, 2012. (13 pages).

United States Patent and Trademark Office, "Non-Final Office Action," issued in connection with U.S. Appl. No. 13/367,000, on Sep. 18, 2014. (28 pages).

United States Patent and Trademark Office, "Non-Final Office Action," issued in connection with U.S. Appl. No. 14/044,832, on Nov. 6, 2014. (25 pages).

United States Patent and Trademark Office, "Notice of Allowance," issued in connection with U.S. Appl. No. 12/816,152, on Oct. 23, 2013. (18 pages).

Japanese Patent Office, "Office Action," issued in connection with application No. 2013-512066 on Apr. 21, 2015, 7 pages.

United States Patent and Trademark Office, "Non-Final Office Action," issued in connection with U.S. Appl. No. 14/349,628, on Jun. 2, 2015. (85 pages).

State Intellectual Property Office, "Search Report with English Translation," issued in connection with application No. 2012800520005 on Apr. 20, 2015, 2 pages.

United States Patent and Trademark Office, "Non-Final Office Action," issued in connection with U.S. Appl. No. 13/699,580, on Jul. 2, 2015. (32 pages).

Somfy, "Motor Catalog" , Sonfy Systems, Inc. , Dec. 2013, http://www.usautomated.com/vendors/catalogs/somfy/Motor_Catalog.pdf, 78 pages.

Somfy, "Motor for Awnings", Somfy LT CSI WT—Automatic manual over-ride, http:/lwww.somfy.co.uk/product/en-uk/lt-csi-wt/1440.cfm?channel=pro, retrieved on Nov. 22, 2010, 1 page.

Somfy, "The Motor With Back-Up Operation for Terrace Awnings", http://www.somfy.co.uk/product/en-uk/lt-csi-rts/1439.cfm?channel=pro, retrieved on Nov. 22, 2010, 1 page.

Somfy, "Sunea RTS CMO Universal Performance", Somfy Systems, Inc. North America Headquarters, Aug. 2009, 2 pages.

Somfy, "Sunea RTS CMO (Compact Manual Override)", Somfy Systems Inc., Feb. 2015, 1 page.

Patent Cooperation Treaty, "International Preliminary Report on Patentability", issued in connection with international application No. PCT/US2014/028534, on Sep. 15, 2015, 6 pages.

United States Patent and Trademark Office, "Final Office Action," issued in connection with U.S. Appl. No. 14/044,832, on Dec. 8, 2015, 53 pages.

United States Patent and Trademark Office, "Notice of Allowance," issued in connection with U.S. Appl. No. 14/349,628, on Jan. 6, 2016, 48 pages.

United States Patent and Trademark Office, "Final Office Action," issued in connection with U.S. Appl. No. 13/699,580, on Mar. 11, 2016, 40 pages.

United States Patent and Trademark Office, "Non-Final Office Action," issued in connection with U.S. Appl. No. 14/044,832, on May 19, 2016, 38 pages.

United States Patent and Trademark Office, "Non-Final Office Action," issued in connection with U.S. Appl. No. 13/699,580, mailed on Nov. 16, 2016, 24 pages.

Colombian Patent Office, "Office Action," issued in connection with Colombian Patent Application No. 14-093599, Nov. 12, 2016, 21 pages (machine translation included).

(56) References Cited

OTHER PUBLICATIONS

United States Patent and Trademark Office, "Final Office Action," issued in connection with U.S. Appl. No. 14/044,832, mailed on Dec. 28, 2016, 87 pages.

United States Patent and Trademark Office, "Non-final Office Action," issued in connection with U.S. Appl. No. 14/044,832, on Mar. 20, 2017, 44 pages.

United States Patent and Trademark Office, "Notice of Allowance," issued in connection with U.S. Appl. No. 13/699,580, dated Jun. 13, 2017, 21 pages.

* cited by examiner

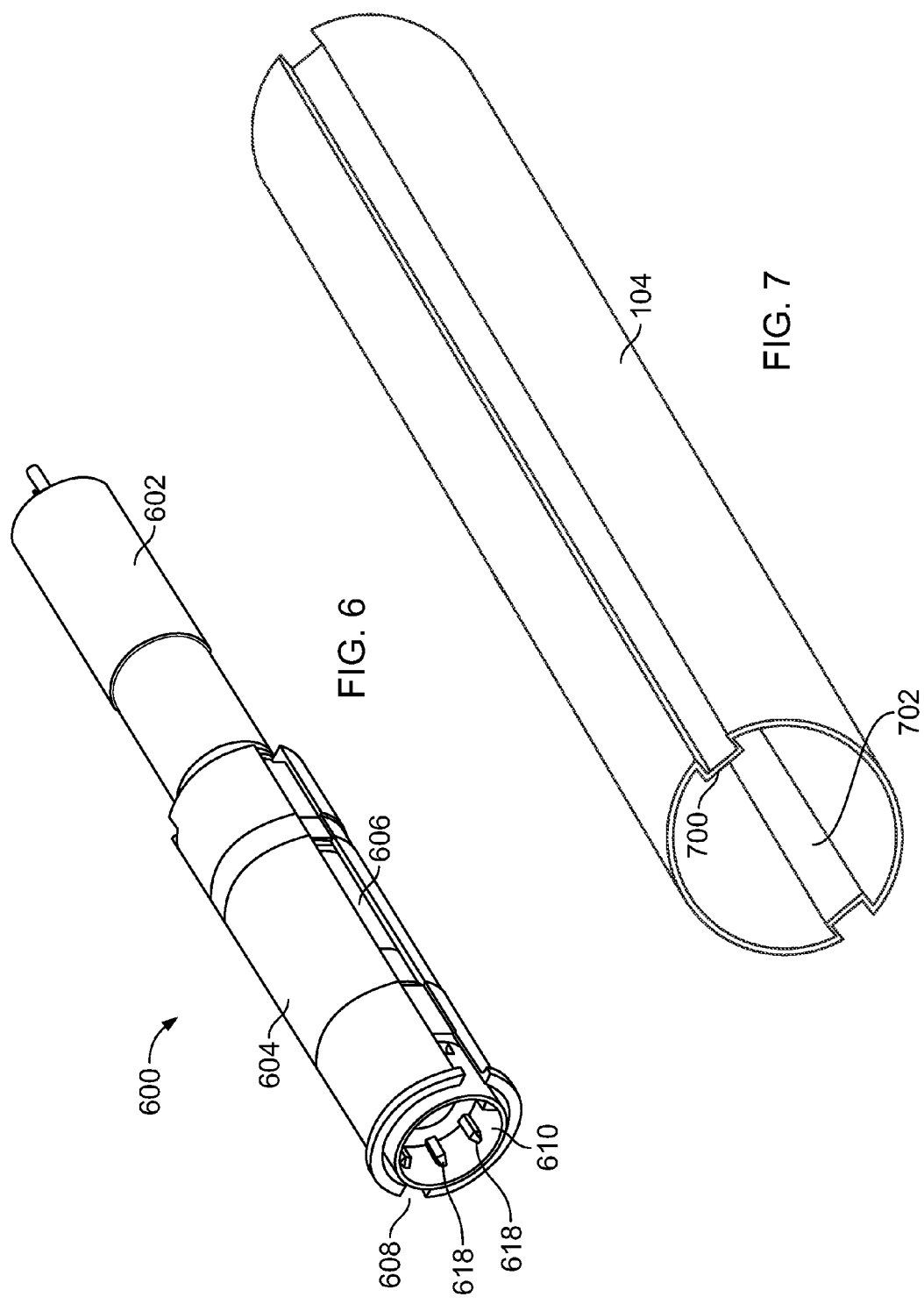

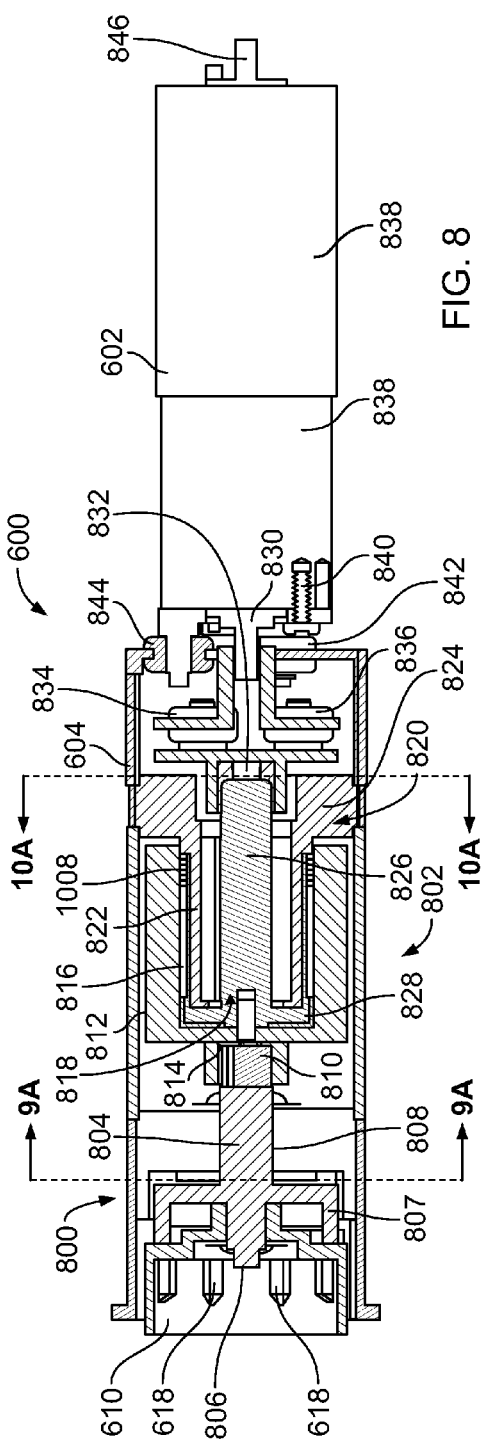
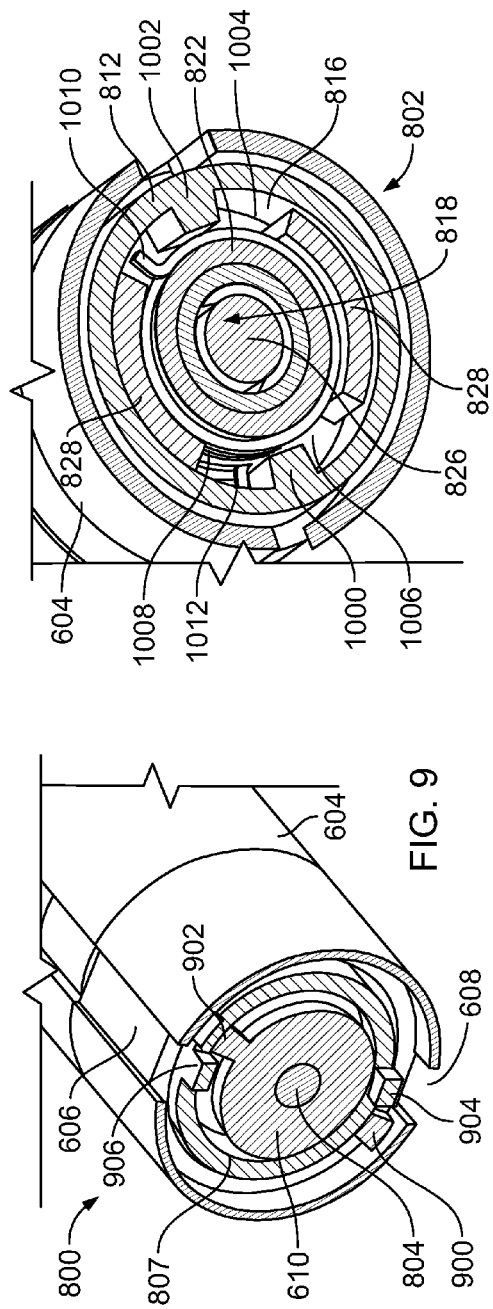
FIG. 8
FIG. 9
FIG. 10

METHODS AND APPARATUS TO CONTROL ARCHITECTURAL OPENING COVERING ASSEMBLIES

RELATED APPLICATIONS

This patent is a national stage of PCT Application No. PCT/US2012/000428, filed Oct. 3, 2012, entitled "METHODS AND APPARATUS TO CONTROL ARCHITECTURAL OPENING COVERING ASSEMBLIES," which claims priority to U.S. Provisional Application Ser. No. 61/542,760, entitled "CONTROL OF ARCHITECTURAL OPENING COVERINGS," filed Oct. 3, 2011 and U.S. Provisional Application Ser. No. 61/648,011, entitled "METHODS AND APPARATUS TO CONTROL ARCHITECTURAL OPENING COVERING ASSEMBLIES," filed May 16, 2012. The disclosures of PCT Application No. PCT/US2012/000428, U.S. Provisional Application Ser. No. 61/542,760 and U.S. Provisional Application Ser No. 61/648,011 are hereby incorporated by reference in their entireties.

FIELD OF THE DISCLOSURE

This disclosure relates generally to architectural opening covering assemblies and, more particularly, to methods and apparatus to control architectural opening covering assemblies.

BACKGROUND

Architectural opening covering assemblies such as roller blinds provide shading and privacy. Such assemblies generally include a motorized roller tube connected to covering fabric or other shading material. As the roller tube rotates, the fabric winds or unwinds around the tube to uncover or cover an architectural opening.

BRIEF DESCRIPTION OF THE DRAWINGS

FIG. 6 is a perspective view of an example clutch assembly and motor of the example architectural opening covering assembly of FIG. 1.

FIG. 7 is a perspective view of an example roller tube of the example architectural opening covering assembly of FIG. 1.

FIG. 8 is a cross-sectional view of the example clutch assembly and the example motor of FIG. 6.

FIG. 9 is a cross-sectional view of an example first clutch of the example clutch assembly of FIG. 8 taken along line 9A-9A.

FIG. 10 is a cross-sectional view of an example second clutch of the example clutch assembly of FIG. 8 taken along line 10A-10A.

Figure 1:
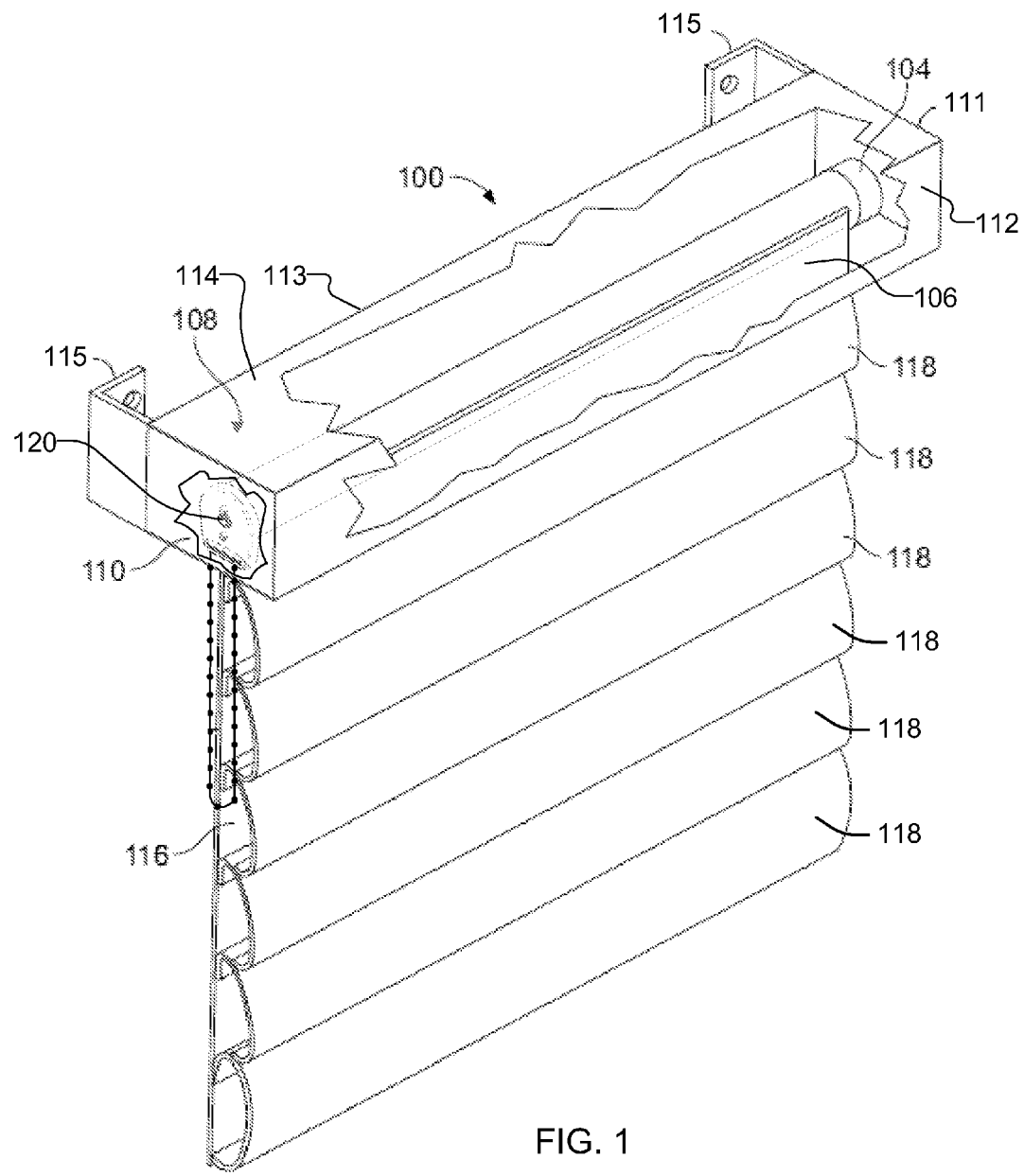
FIG. 1 is an isometric illustration of an example architectural opening covering assembly including an example manual controller.

Wherever possible, the same reference numbers will be used throughout the drawing(s) and accompanying written description to refer to the same or like parts. As used in this patent, stating that any part (e.g., an object, a layer, structure, area, plate, etc.) is in any way positioned on (e.g., positioned on, located on, disposed on, or formed on, etc.) another part, means that the referenced part is either in contact with the other part, or that the referenced part is above the other part relative to Earth with one or more intermediate part(s) located therebetween. Stating that any part is in contact with another part means that there is no intermediate part between the two parts.

DETAILED DESCRIPTION

Example architectural opening covering assemblies disclosed herein may be controlled by a central controller (for example, to coordinate covering positions based on weather, sun position, etc.) and include local, manual controllers to enable manually lowering or raising of the covering to easily override the covering position set by the central controller. Example architectural opening coverings include a motor and a local controller communicatively coupled to the central controller. In some instances, the manual controller and the motor cooperate to assist in moving the architectural opening covering (e.g., a fabric, etc.) via the manual controller. In other instances, the example local controller controls the motor to counter the operation of the manual controller to prevent lowering or raising the architectural opening covering past a threshold position such as, for example, a lower limit position or an upper limit position. In some examples, a user may countermand or cancel a command from the local controller by operating the manual controller. Some example local controllers disclosed herein include a gravitational sensor to determine a position of the covering and/or monitor movement of the covering based on gravity.

The central controller and/or the local controller cause the motor to move the covering to set positions (e.g., an upper limit position, a lower limit position, etc.). In some examples, one or more of the set positions of the covering may be established via the manual controller. When a central controller is communicatively coupled to a plurality of architectural opening covering assemblies, set positions for the respective coverings of the assemblies may be selectively established for each of the example architectural opening coverings via the local manual controllers as disclosed herein.

FIG. 1 is an isometric illustration of an example architectural opening covering assembly 100. In the example of FIG. 1, the covering assembly 100 includes a headrail 108. The headrail 108 is a housing having opposed end caps 110, 111 joined by front 112, back 113 and top sides 114 to form an open bottom enclosure. The headrail 108 also has mounts 115 for coupling the headrail 108 to a structure above an architectural opening such as a wall via mechanical fasteners such as screws, bolts, etc. A roller tube 104 is disposed between the end caps 110, 111. Although a particular example of a headrail 108 is shown in FIG. 1, many different types and styles of headrails exist and could be employed in place of the example headrail 108 of FIG. 1. Indeed, if the aesthetic effect of the headrail 108 is not desired, it can be eliminated in favor of mounting brackets.

In the example illustrated in FIG. 1, the assembly 100 includes a covering 106, which is a cellular type of shade. In this example, the cellular covering 106 includes a unitary flexible fabric (referred to herein as a "backplane") 116 and a plurality of cell sheets 118 that are secured to the backplane 116 to form a series of cells. The cell sheets 118 may be secured to the backplane 116 using any desired fastening approach such as adhesive attachment, sonic welding, weaving, stitching, etc. The covering 106 shown in FIG. 1 can be replaced by any other type of covering including, for instance, single sheet shades, blinds, and/or other cellular coverings. In the illustrated example, the covering 106 has an upper edge mounted to the roller tube 104 and a lower, free edge. The upper edge of the example covering 106 is coupled to the roller tube 104 via a chemical fastener (e.g., glue) and/or one or more mechanical fasteners (e.g., rivets, tape, staples, tacks, etc.). The covering 106 is movable between a raised position and a lowered position (illustratively, the position shown in FIG. 1). When in the raised position, the covering 106 is wound about the roller tube 104.

As discussed in detail below, the example architectural opening covering assembly 100 is provided with a powered motor to move the covering 106 between the raised and lowered positions. The powered motor is controlled by a local controller, a local controller in communication with a central controller, and/or only a central controller. In the illustrated example, the motor and the local controller are disposed inside the tube 104. The example assembly 100 of FIG. 1 further includes a manual controller 120 that may be used to manually override commands provided by the central controller and/or the local controller, and/or may be used to move the covering 106 between the raised and lowered positions.

Figure 2:
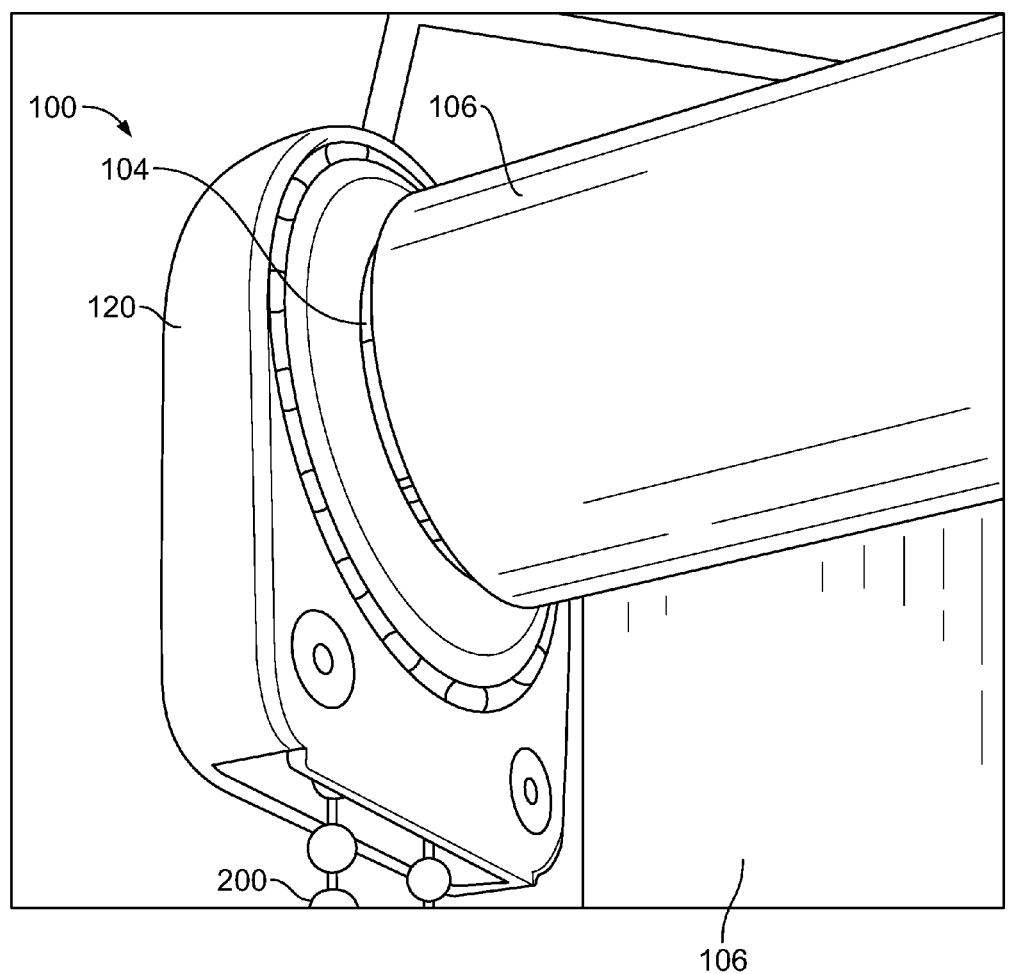
FIG. 2 is an enlarged view illustrating the manual controller of the example architectural opening covering assembly of FIG. 1.

FIG. 2 illustrates the roller tube 104 of the assembly 100 coupled to the manual controller 120. In the illustrated example, the manual controller 120 includes a cord 200. In some instances, the cord 200 may be a chain, a beaded chain, a rotatable rod, a crank, a lever, and/or any other suitable device. As described in greater detail below, when the cord 200 is actuated (e.g., pulled with sufficient force), the manual controller 120 rotates the tube 104, thereby enabling a user to selectively raise or lower the covering 106 via the manual controller 120.

Figure 3:
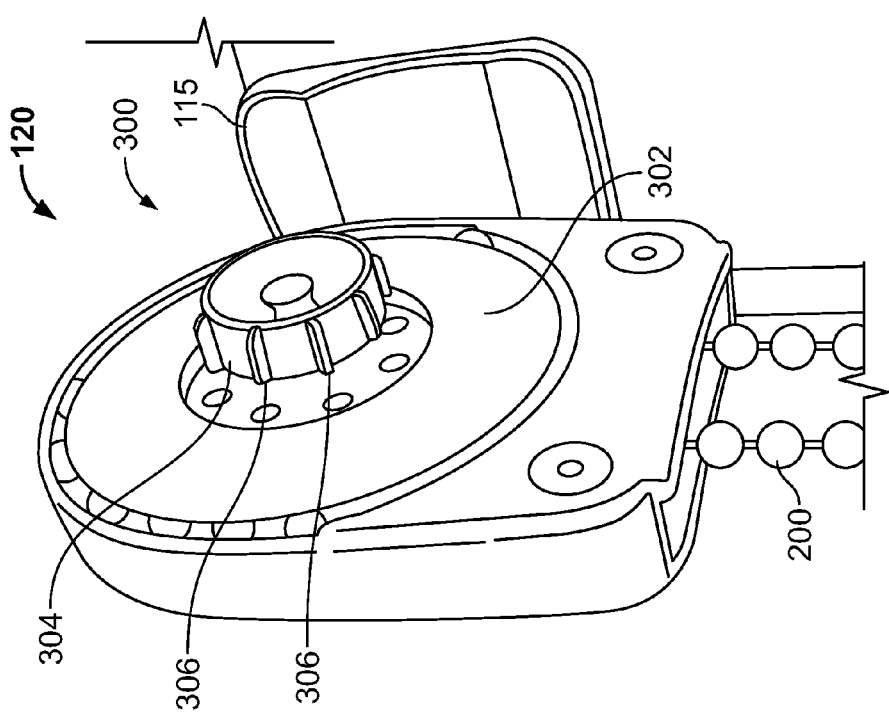
FIG. 3 is a perspective view of the example manual controller of the example architectural opening covering assembly of FIG. 1.

FIG. 3 is a perspective view of the example manual controller 120 of FIG. 1 with the tube 104 removed. In the illustrated example, the headrail 108 is also removed. The example manual controller 120 is coupled to one of the mounts 115. The manual controller 120 includes a male connector 300, which includes a plate 302 and a shaft 304 extending from the plate 302. The example shaft of FIG. 3 includes plurality of splines 306. As described in greater detail below, the shaft 304 of the male connector 300 is coupled to a clutch assembly disposed inside the tube 104.

Figure 4:
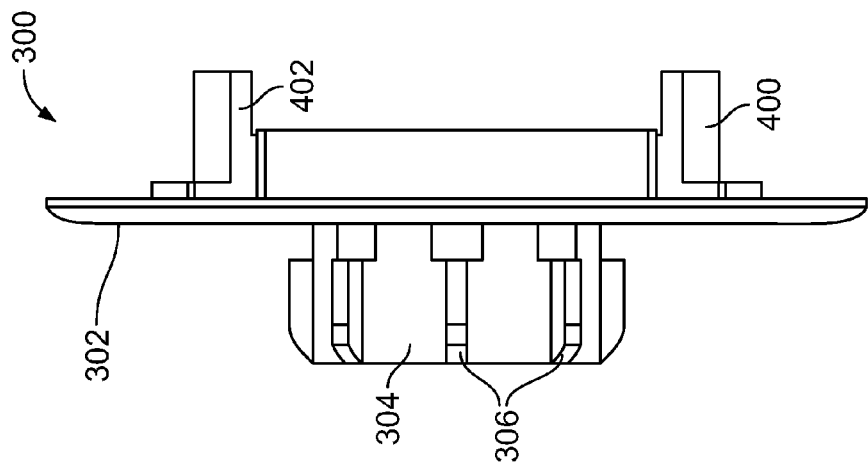
FIG. 4 is a side view of an example male connector of the example manual controller of FIG. 3.

FIG. 4 is a side view of the example male connector 300 of FIG. 3. The example male connector 300 includes a first arm 400 and a second arm 402, each of which extends from the plate 302 into the manual controller 120. As described in greater detail below, the example manual controller 120 of FIG. 3 restricts movement of the male connector 300 unless the cord 200 is moving.

Figure 5:
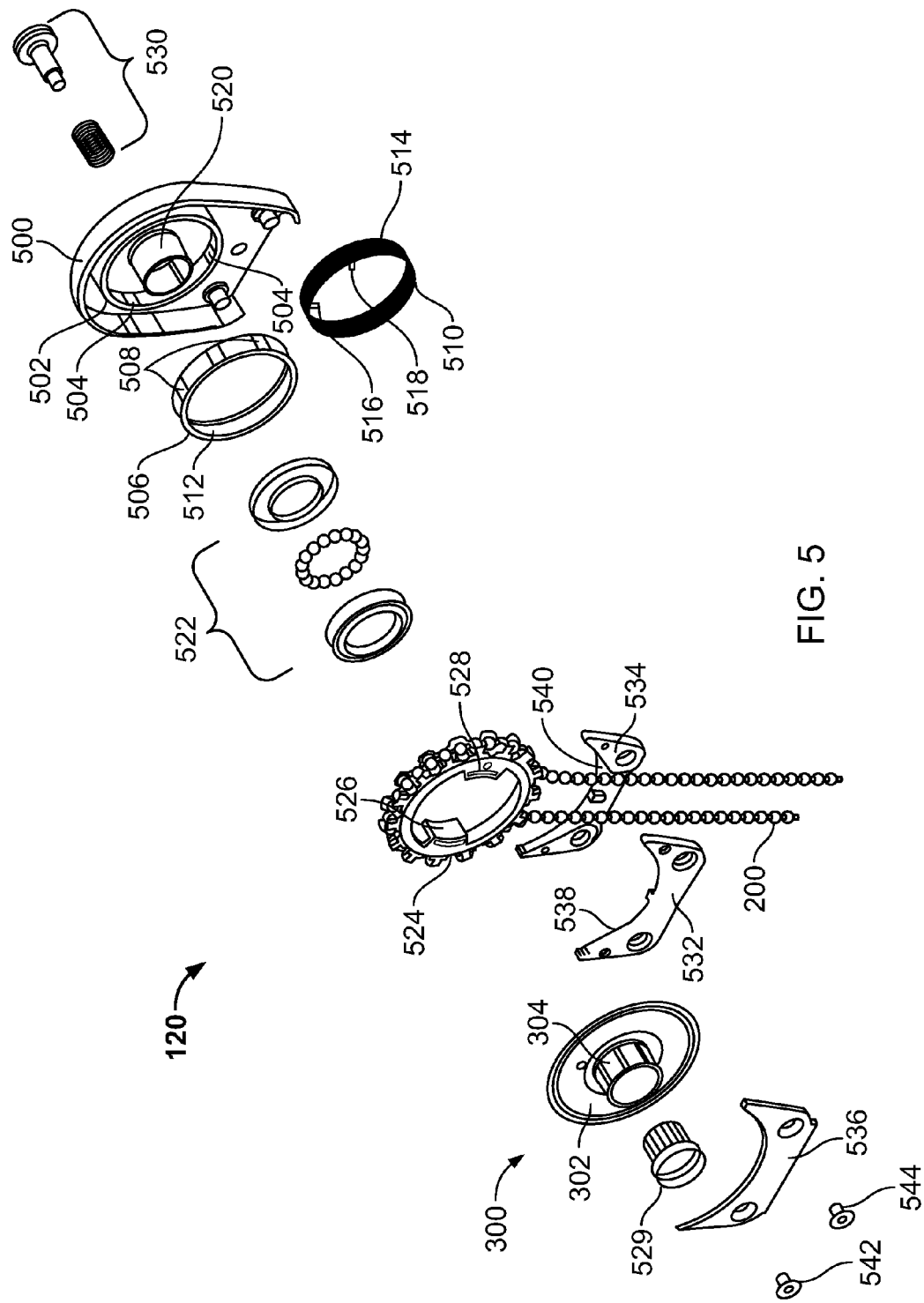
FIG. 5 is an exploded view of the example manual controller of FIG. 3.

FIG. 5 is an exploded view of the example manual controller 120 of FIG. 3. In the illustrated example, the manual controller 120 includes a housing 500 defining an annular ridge 502, which includes a plurality of grooves 504. A ring 506 defining a plurality of splines 508 is disposed in the space defined by the annular ridge 502. The grooves 504 of the ridge 502 receive the splines 508 of the ring 506 to substantially prevent rotation of the ring 506 during operation of the manual controller 120. A wrap spring 510 is disposed adjacent an interior surface 512 of the ring 506 and oriented substantially concentric to the ring 506. In the illustrated example, the wrap spring 510 is tensioned such that an outer surface 514 of the wrap spring 510 engages the interior surface 512 of the ring 506. The wrap spring 510 includes a first tang 516 and a second tang 518. The housing 500 defines a shaft 520 to receive a bearing 522 about which the wrap spring 510, a sprocket 524 and the male connector 300 are supported. The example sprocket 524 of FIG. 5 is operatively coupled to the cord 200.

The example sprocket 524 includes a first wing or arm 526 and a second wing or arm 528, each of which extends toward the housing 500 in the orientation of FIG. 5. The arms 400, 402 (illustrated in FIG. 4) of the male connector 300 and the arms 526, 528 of the sprocket 524 are disposed adjacent the tangs 516, 518 of the warp spring 510. A fitting 529 (e.g., a plug) operatively couples the male connector 300 to the housing 500, and a spring-loaded fastener 530 (e.g., a spring and a rivet) couples the housing 500 to one of the mounts 115.

A first cord guide plate 532 and a second cord guide plate 534 are coupled to the example housing 500 via a cover 536 to define a first channel 538 and a second channel 540. In the illustrated example, a first portion of the cord 200 is disposed in the first channel 538, and a second portion of the cord 200 is disposed in the second channel 540. The example first and second channels 538, 540 define first and second paths, respectively, for the cord 200 to prevent the cord 200 from disengaging the sprocket 524 during operation (e.g., when a user pulls the cord 200). In the illustrated example, a pair of mechanical fasteners 542, 544 couple the cover 536, the first cord guide plate 532, and the second cord guide plate 534 to the housing 500.

When the manual controller 120 is operated via the cord 200 (e.g., by pulling the cord 200 with sufficient force), the cord 200 applies torque to the sprocket 524. As a result, one of the arms 526, 528 of the sprocket 524 engages one the tangs 516, 518 of the wrap spring 510, thereby causing the wrap spring 510 to tighten. When the wrap spring 510 tightens, a diameter of the wrap spring 510 decreases, and the wrap spring 510 disengages the inner surface 512 of the ring 506. As a result, the wrap spring 510 and, thus, the sprocket 524 may be rotated by actuating the cord 200. When the wrap spring 510 rotates, one of the tangs 516, 518 engages one of the arms 400, 402 of the male connector 300, thereby rotating the male connector 300. As described in greater detail below, the male connector 300 is operatively coupled to the roller tube 104. Thus, the user may selectively raise or lower the example covering 106 by actuating the cord 200.

Conversely, if torque is applied to the male connector 300 via the shaft 304, one of the arms 400, 402 of the male connector 300 engages one of the tangs 516, 518 of the wrap spring 510, thereby causing the wrap spring 510 to loosen and, thus, the diameter of the wrap spring 510 to increase. As a result, the outer surface 514 of the wrap spring 510 tightly engages the inner surface 512 of the ring 506. When the wrap spring 510 engages the ring 506 with sufficient force, the wrap spring 510 is held substantially stationary by the interconnection of the ring 506 to the housing 500, thereby substantially preventing the male connector 300 from rotating. Therefore, although a user may rotate the male connector 300 by actuating the cord 200, the male connector 300 is substantially prevented from rotation via torque (e.g., torque applied by a motor) applied to the shaft 304 of the male connector 300.

FIG. 6 is perspective view of an example clutch assembly 600 and an example motor 602 of the example architectural opening covering assembly 100 of FIG. 1. The example clutch assembly 600 of FIG. 6 and the example motor 602 are disposed inside the roller tube 104. The example clutch assembly 600 includes a frame or housing 604. In the illustrated example, the frame 604 is substantially cylindrical and defines one or more grooves or channels 606, 608 to receive one or more ridges or protrusions 700, 702 (FIG. 7) of the tube 104. The example clutch assembly 600 is operatively coupled to the example manual controller 120 of FIG. 3 via a female connector or coupling 610, which receives the male connector 300 of the manual controller 120. In the illustrated example, the female connector 610 includes ridges or splines 618 to engage the splines 306 of the male connector 300. As described in greater detail below, when the covering 106 is raised or lowered under the influence of the motor 602, the male connector 300 of the manual controller 120 holds the female connector 610 of the example clutch assembly 600 substantially stationary to cause the motor 602 to rotate with the frame 604.

FIG. 7 is a perspective view of the example tube 104 of the example architectural opening covering assembly 100 of FIG. 1. In the illustrated example, the tube 104 defines a first ridge or protrusion 700 and a second ridge or protrusion 702.

The first and second protrusions 700, 702 extend radially and inwardly (e.g., toward an axis of rotation of the tube 104). When the example clutch assembly 600 of FIG. 6 is disposed inside the example tube 104, the protrusions 700, 702 of the tube 104 are disposed in the slots 606, 608 of the frame 604. During operation of the assembly 100, the motor 602 and/or the manual controller 120 applies torque to the frame 604 of the clutch assembly 600. As a result, the torque applied to the frame 604 is transferred to the protrusions 700, 702 of the tube 104 via the slots 606, 608 of the frame 604, thereby causing the tube 104 to rotate with the frame 604.

FIGS. 8-10 are cross-sectional views of the example clutch assembly 600 and the example motor 602 of FIG. 6. The example clutch assembly 600 includes a first clutch 800 and a second clutch 802. The example first clutch 800 of FIG. 8 includes the female connector 610 and a drive shaft 804. The example female connector 610 is operatively coupled to a first end 806 of the drive shaft 804. The example drive shaft 804 of FIG. 8 includes a collar 807.

FIG. 9 is a cross-sectional view taken along line 9A-9A of FIG. 8. In the illustrated example, the first clutch 800 provides a dead band (i.e., a lost motion path) between the female connector 610 and the drive shaft 804. In the illustrated example, the example female connector 610 includes a first spline or tooth 900 and a second spline or tooth 902. In the illustrated example, the first and second teeth 900, 902 are disposed approximately 180 degrees apart (e.g., the first and second teeth 900, 902 are disposed along a diameter of the female connector 610) along a circumferential surface of the female connector 610 adjacent and radial to the first end 806 of the drive shaft 804. The collar 807 of the example drive shaft 804 is adjacent the teeth 900, 902 of the female connector 610, and first and second teeth 904, 906 extend from the first collar 807 substantially parallel to a longitudinal axis of the drive shaft 804. In the illustrated example, the first and second teeth 904, 906 are about 180 degrees apart (e.g., along a diameter of the first collar 807). During operation, when the tube 104 is rotating under the influence of the motor 602, the teeth 900, 902 of the female connector 610 engage the teeth 904, 906 of the first collar 807 of the drive shaft 804. As described in greater detail below, when the covering 106 is fully unwound under the influence of the motor 602, the tooth 902 separates from the tooth 906, and the motor 602 drives the drive shaft 804 through at least a portion of the dead band. As a result, the drive shaft 804 rotates relative to the female connector 610, and the tube 104 stops rotating. As described in further detail herein, the termination of rotation of the tube 104 is detected to identify the fully unwound position.

A portion of the example drive shaft 804 is supported by a bearing 808 (e.g., a dry bearing). In the illustrated example, the bearing 808 is defined by the frame 604. A second end 810 of the drive shaft 804 is coupled to a coupling 812 of the second clutch 802 (e.g., a holding clutch). Thus, in the illustrated example, the first clutch 800 operatively couples the manual controller 120 to the second clutch 802. In some examples, the manual controller 120 and/or the first clutch 800 includes a gearbox (e.g., a planetary gearbox) to increase a torque output of the manual controller 120.

In the illustrated example, the coupling 812 includes a first bore 814 and a second bore 816 opposite the first bore 814. The example first bore 814 receives the second end 810 of the drive shaft 804. The example second bore 816 receives a motor drive shaft 818 and a core 820 of the frame 604. In the illustrated example, the core 820 of the frame 604 includes a brake shaft 822 extending from a frame collar 824. The motor drive shaft 818 of the illustrated example includes a center or core shaft 826 and an outer shaft 828 concentric to the center shaft 826.

FIG. 10 is a cross-sectional view of the clutch assembly 600 taken along line 10A-10A. In the illustrated example, the second bore 816 of the coupling 812 includes a pair of inwardly extending splines or ridges 1000, 1002 (e.g., parallel key splines). The example outer shaft 828 includes opposing slits or clefts 1004, 1006, which receive the splines 1000, 1002 of the coupling 812.

As illustrated in FIGS. 8 and 10, the brake shaft 822 is disposed around the center shaft 826 in a space defined between the center shaft 826 and the outer shaft 828. In the illustrated example, the frame collar 824 of the core 820 is coupled to the frame 604. In some examples, the frame 604 and the core 820 are integrally formed.

The example second clutch 802 includes one or more wrap springs 1008 disposed around the example brake shaft 822. In some examples, each of the wrap springs 1008 includes four coils. However, wrap springs including other numbers of coils are used in other examples. Each example wrap spring 1008 includes a first tang or arm 1010 on a first end of the spring 1008 and a second tang or arm 1012 on a second end of the spring 1008. In the illustrated example, the wrap springs 1008 are oriented such that the first tang 1010 of each of the wrap springs 1008 is disposed in the slit 1004 of the outer shaft 828 adjacent one of the splines 1000, 1002 of the coupling 812, and the second tang 1012 is disposed in the slit 1006 adjacent the other the one of the splines 1000, 1002. Thus, if the example motor drive shaft 818 rotates during operation, the outer shaft 828 engages one of the tangs 1010, 1012 of the wrap springs 1008, and if the coupling 812 rotates during operation, one of the splines 1000, 1002 of the coupling 812 engage one of the tangs 1010, 1012 of the wrap springs 1008. If the coupling 812 engages one of the tangs 1010, 1012, the corresponding coil(s) of the springs 1008 tighten around the brake shaft 822 to resist relative movement between the frame 604 and the second clutch 802. If the outer shaft 828 of the motor drive shaft 818 engages one of the tangs 1010, 1012, the coils loosen around the brake shaft 822 to release resistance to relative movement between the second clutch 802 and the frame 604.

The center shaft 826 of the example motor drive shaft 818 is coupled to an output shaft 830 of the motor 602 via a coupling 832. In the illustrated example, the coupling 832 includes a plurality of noise and/or vibration insulators 834, 836 such as, for example, one or more rubber grommets. In the illustrated example, the motor 602 is an electric motor (e.g., a 12-24V DC motor) and includes a gearbox or a transmission. The example motor 602 is able to operate at speeds up to about 6000 rpm and the gearbox provides approximately a 130:1 ratio between the speed of the motor 602 and a speed of a motor output shaft 830. The motor 602 and the gearbox are disposed inside a housing 838, which is coupled to the frame 604 via one or more mechanical fasteners 840 and sound or vibration insulators 842, 844 such as, for example, one or more rubber grommets. As described in greater detail below, the example motor 602 is communicatively coupled to a local controller (FIG. 13) via one or more wires 846.

During operation, the motor 602, the manual controller 120, or both may rotate the tube 104 and, thus, wind and/or unwind the covering 106 (i.e., lower or raise the covering 106, respectively). For example, when the motor 602 drives the motor drive shaft 818, the outer shaft 828 of the motor drive shaft 818 engages one of the tangs 1010, 1012 on each of the wrap springs 1008, thereby loosening the wrap springs 1008 around the brake shaft 822. If the manual controller 120 is not operated during this time, the male connector 300 of the manual controller 120 prevents the motor drive shaft 818 from rotating the second clutch 802. Thus, motor drive shaft 818 is held substantially stationary, which causes the motor 602 to rotate about the motor output shaft 830. As a result, the motor 602 rotates the frame 604 and, thus, the tube 104.

If the manual controller 120 is operated (e.g., by a user pulling the cord 200 with sufficient force), and the motor 602 is not driven (e.g., during a power outage, manual operation by a user without access to a central controller or other electronic controls, etc.), the male connector 300 rotates, thereby causing the female connector 610, the drive shaft 804, the coupling 812, and the motor drive shaft 818 to rotate. As a result, the coupling 812 engages one of the tangs 1010, 1012 of each of the wrap springs 1008 to cause the wrap springs 1008 to tighten around the brake shaft 822 and, thus, transfers the torque applied from the manual controller 120 to the frame 604 to cause the roller tube 104 to rotate. In the illustrated example, the wrap springs 1008 include tangs 1010, 1012 on both sides of the one of the splines 1000, 1002 of the coupling 812. Thus, rotation of the coupling 812 in the winding direction and the unwinding direction causes the wrap springs 1008 to tighten around the brake shaft 822. As a result, the covering 106 may be selectively raised or lowered by a user via the manual controller 120 (e.g., without electrical power supplied to the motor 602).

Movement of the motor 602 and, thus, the tube 104 is additive to movement of the motor drive shaft 818. For example, if the manual controller 120 causes the motor drive shaft 818 to rotate at a velocity of 20 revolutions per minute in a first direction, and the motor 602 is driven to rotate about the output shaft 830 at a velocity of 25 revolutions per minute in a second direction opposite the first direction, then the tube 104 rotates in the second direction at a velocity of 5 revolutions per minute. In another example, if the manual controller 120 causes the motor drive shaft 818 to rotate at a velocity of 20 revolutions per minute in the first direction, and the motor 602 is driven to rotate about the output shaft 830 at a velocity of 25 revolutions per minute in the first direction, the tube 104 rotates in the first direction at a velocity of 45 revolutions per minute. Thus, the manual controller 120 and the motor 602 may cooperate or compete to assist or prevent movement of the tube 104 via the manual controller 120.

During operation of the architectural opening covering assembly 100, if the tube 104 rotates to fully unwind the covering 106 (i.e., the covering 106 is at a fully unwound position), the motor 602 drives the drive shaft 804 through the dead band of the first clutch 800. For example, as the covering 106 unwinds, the motor 602 applies a first torque to the tube 104 in a first direction (e.g., counterclockwise) and a weight of the covering 106 applies a second torque to the tube 104 greater than the first torque in a second direction opposite the first direction (e.g., clockwise). As a result, the teeth 904, 906 of the drive shaft 804 engage the teeth 900, 902 of the female connector 610, and the motor 602 allows the weight of the covering 106 to cause the tube 104 and the motor 602 to rotate together to unwind the covering 106. If the tube 104 unwinds past the fully unwound position (i.e., where the covering 106 fully unwinds from the tube 104), the weight of the covering 106 applies torque to the tube 104 in the first direction. As a result, the motor 602 drives the teeth 904, 906 of the drive shaft 804 out of engagement with the teeth 900, 902 of the female connector 610 for a portion of a revolution (e.g., 160 degrees), but the tube 104 remains substantially stationary while the motor 602 is operating. As described in further detail below, the disengagement may be detected (e.g., by detecting that the motor 602 is operating but the tube 104 is not rotating) to determine a fully unwound position of the covering 106.

Figure 11:
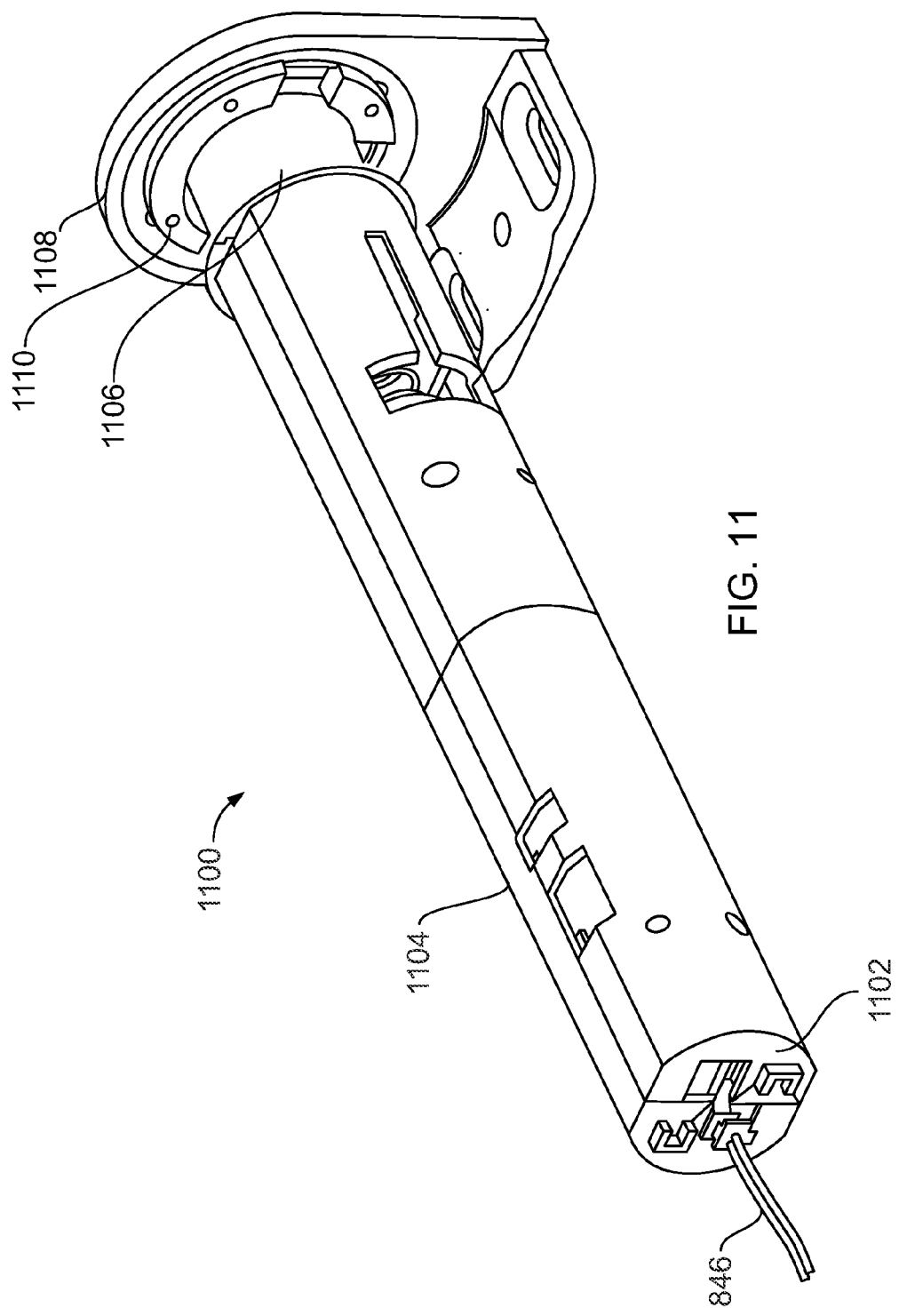
FIG. 11 is a perspective view of an example local controller of the example architectural opening covering assembly of FIG. 1.

FIG. 11 is a perspective view of an example local controller 1100. The example local controller 1100 is disposed inside of and coupled to the roller tube 104. In the illustrated example, the local controller 1100 includes a housing 1102. A first portion 1104 of the example housing 1102 is coupled to the tube 104, and a second portion 1106 of the housing 1102 is journalled to a second bracket 1108 via a slip ring or rotary electronic joint 1110. In some examples, the second bracket 1108 is mounted to a wall or an architectural opening frame. During operation, the housing 1102 rotates with the tube 104 about an axis of rotation of the tube 104.

Figure 12:
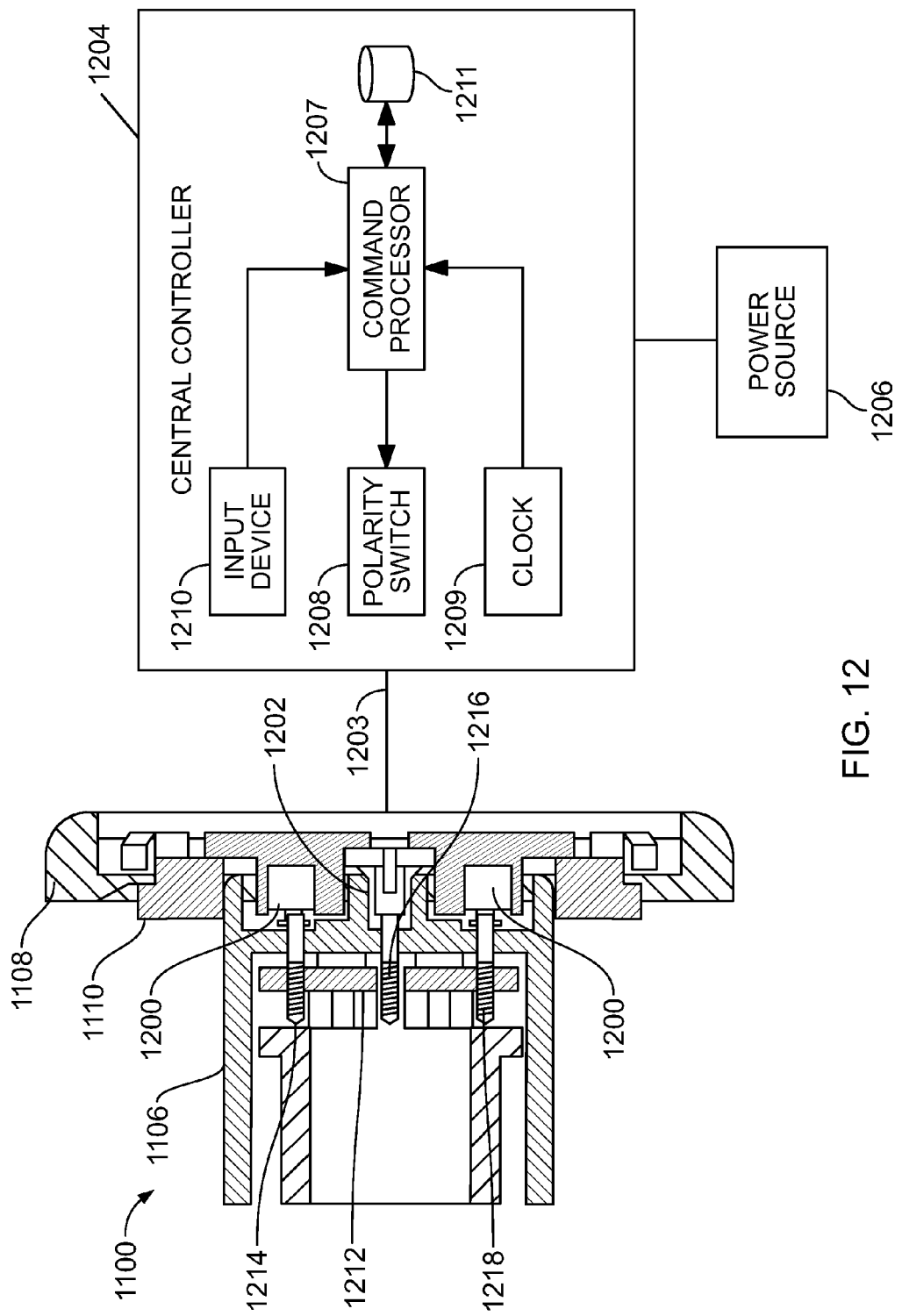
FIG. 12 is a cross-sectional view of a portion of the example local controller of FIG. 11 communicatively coupled to an example central controller and an example power source.

FIG. 12 is a cross-sectional view of the example second bracket 1108 and the second portion 1106 of the example housing 1102. In the illustrated example, the slip ring 1110 includes two electrical contacts 1200, 1202. A central controller 1204 and/or a power source 1206 are coupled to the electrical contacts 1200, 1202 via wires 1203. In the illustrated example, the central controller 1204 is communicatively coupled to the example local controller 1100. The central controller 1204 and/or the power source 1206 may be located in a room including the example architectural opening covering assembly 100 and/or in any other suitable location such as, for example, a building control room. As described in greater detail below, in some examples, the central controller 1204 is communicatively coupled to a plurality of architectural opening covering assemblies (FIG. 15), and each such assembly includes a local controller such as, for example, the local controller 1100 of FIG. 11.

In the illustrated example, the central controller 1204 includes a command processor 1207, a polarity switch 1208, a clock 1209, an input device 1210, and an information storage device 1211. The example command processor 1207 transmits signals to the example local controller 1100 to provide instructions or commands to perform an action such as, for example, rotating the tube 104 via the motor 602, entering a programming mode, etc. In the illustrated example, the polarity switch 1208 modulates (e.g., alternates) the polarity of the power supplied to the local controller 1100 to signal the commands or instructions. The example command processor 1207 receives timing information from the clock 1209 to control the duration of polarity modulations of the signal. The example central controller 1204 also includes an input device 1210 such as, for example, button(s), slides, key strokes, a remote control, wireless control, light sensor, etc. The input(s) correspond to actions of the corresponding assembly (e.g., raising to fully open, lowering to close, entering a programming mode, etc.). When the input device 1210 is actuated, the command processor 1207 sends a signal corresponding to the input to the example local controller 1100 to control the architectural opening covering assembly 100. The example information storage device 1211 stores commands or instructions, their associated signal patterns (e.g., polarity switches), and/or other information.

The example local controller 1100 of FIG. 12 includes a circuit board 1212, which is coupled to the second portion 1106 of the housing 1102 adjacent the electrical contacts 1200, 1202. The circuit board 1212 includes three spring-loaded, conductive pins 1214, 1216 and 1218. When the housing 1102 is coupled to the slip ring 810, the pins 1214, 1216 and 1218 are biased into engagement with the electrical contacts 1200, 1202 by the included springs.

Figure 13:
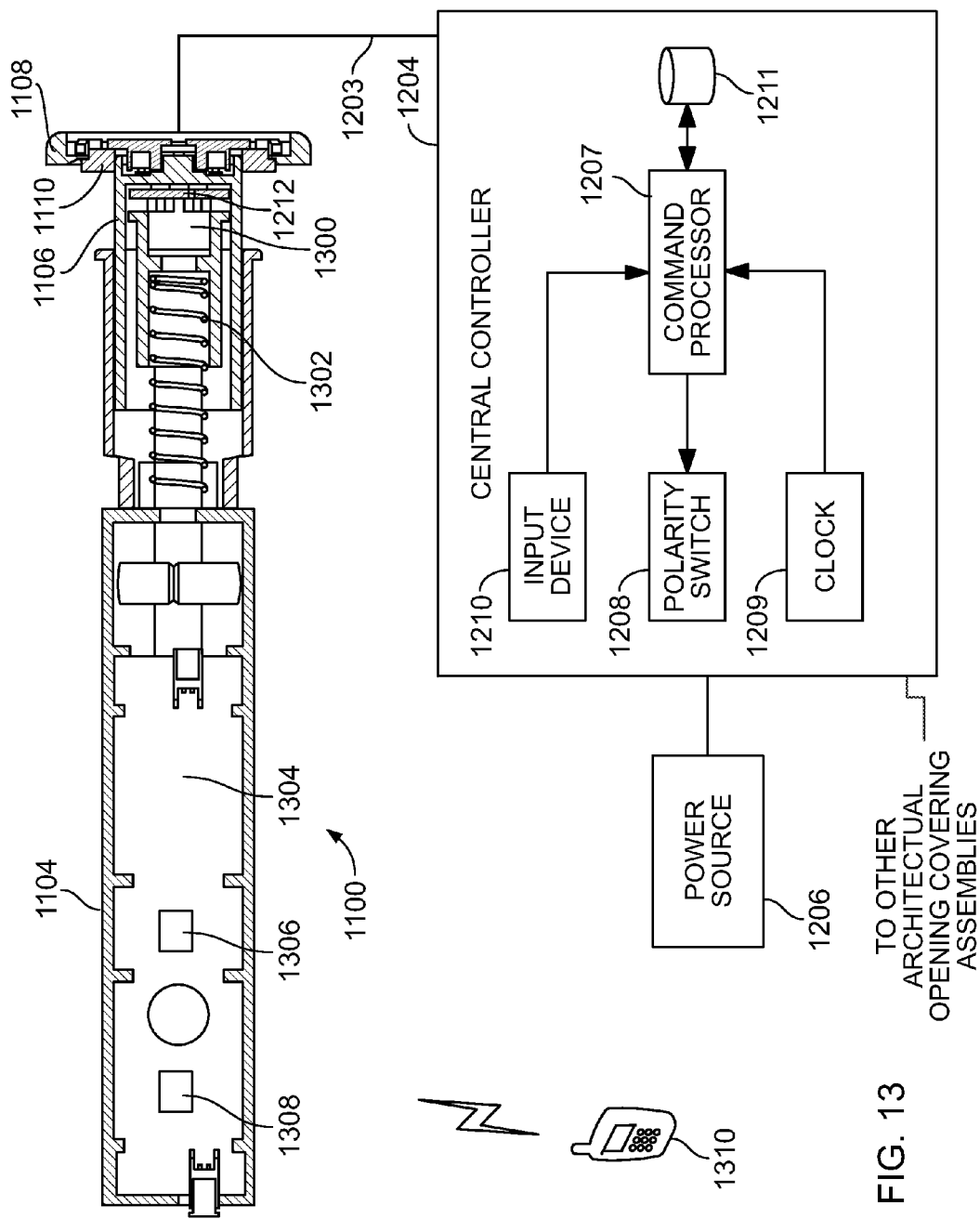
FIG. 13 is another cross-sectional view of the example local controller of FIG. 11.

FIG. 13 is another cross-sectional view of the example housing 1102 and the example bracket 1108. In the illustrated example, the second portion 1106 of the housing 1102 is slidably coupled to the first portion 1104 of the housing 1102. A plunger 1300 is disposed inside the second portion 1106 of the housing 1102 and a spring 1302 seated between the first portion 1104 of the housing 1102 and the plunger 1300 biases the circuit board 1212 toward the second bracket 1108 to urge the pins 1214, 1216 and 1218 into engagement with the electrical contacts 1200, 1202.

In the illustrated example, a control board 1304 (e.g., a printed circuit board) is disposed inside the first portion 1104 of the housing 1102. In the illustrated example, a gravitational sensor 1306 (e.g., an accelerometer, a level sensor, a gyroscope, a pendulum coupled to a rotary encoder, and/or any other suitable motion sensor) is mounted to the control board 1304 substantially along the axis of rotation of the tube 104. During operation, the example gravitational sensor 1306 determines angular positions and/or movement of the tube 104 (e.g., based on gravity).

The example local controller 1100 is communicatively coupled to the central controller 1204 and the motor 602. During operation, the local controller 1100 transmits signals to the motor 602 to cause the motor 602 to rotate the tube 104, allow the tube 104 to rotate, and/or hold the tube 104 substantially stationary. The example local controller 1100 also includes a local instruction receiver 1308.

In some examples, the architectural opening covering assembly 100 may be controlled via a remote control 1310. In such examples, a user may selectively raise or lower the example covering 106 via the remote control 1310. The remote control 1310 may be a RF remote control, an infrared remote control, a portable electronic device, a mobile telephone, a computer, etc. The remote control 1310 sends a signal (e.g., a RF signals, network communications, etc.), which corresponds to a client action (e.g., to raise the covering 106, lower the covering 106, etc.). In some such examples, the architectural opening covering assembly 100 includes a receiver (e.g., a sensor, an antenna, etc.) to receive the signal. In some examples, the receiver is disposed inside the tube 104, and the tube 104 defines an aperture through which the signal propagates. The local instruction receiver 1308 receives the signal, and the local controller 1100 causes the covering 106 to move based on the client action corresponding to the signal. In some examples, the local controller 1100 may be communicatively coupled to a light sensor to detect and measure light shining onto the side of the building. In some such examples, the local controller 1100 transmits signals to the motor 602 to cause the motor 602 to move the covering 102 based on the amount of light detected by the light sensor. For example, the covering 106 will be opened further when there is low light and will be closed further when there is bright light.

Figure 14:
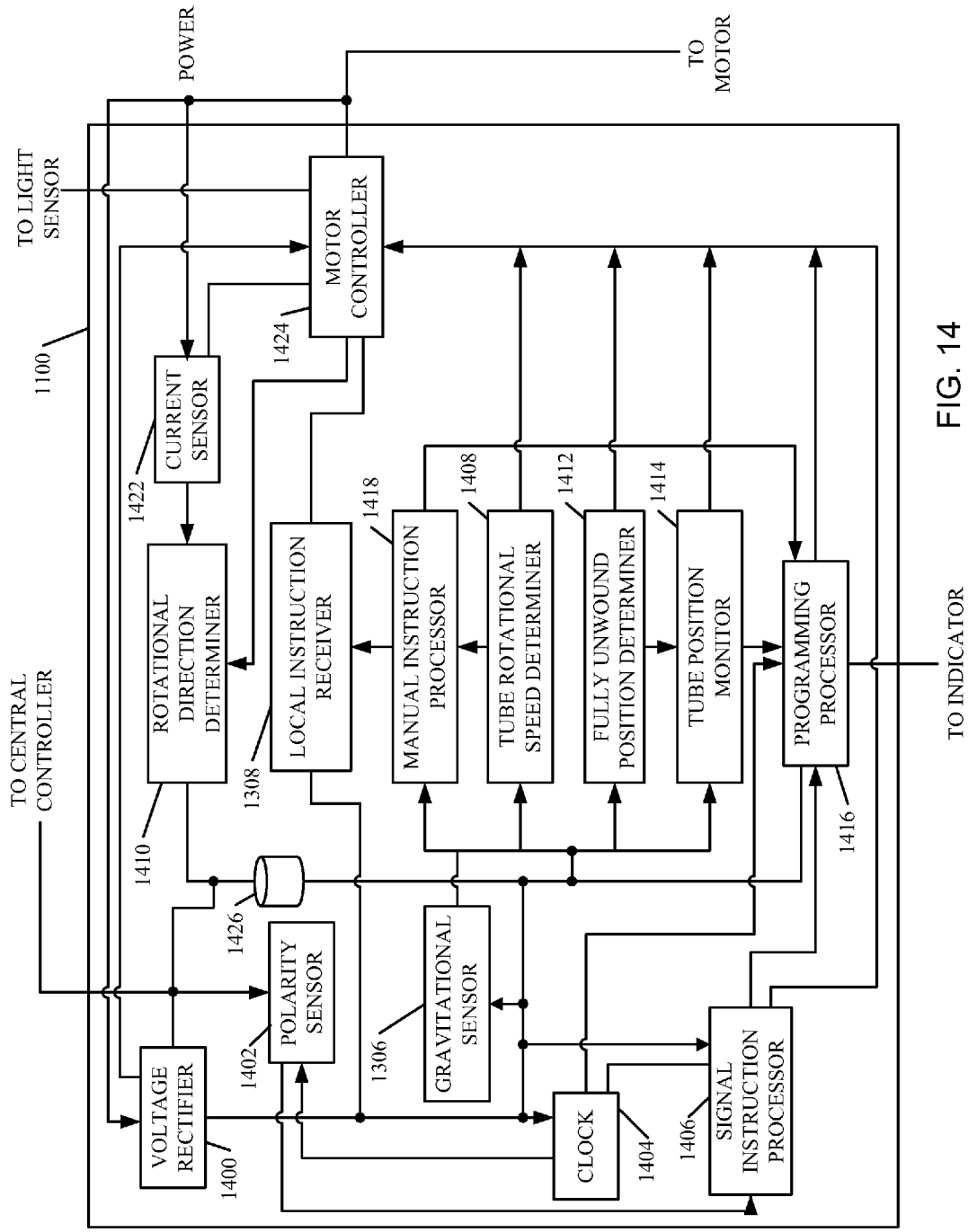
FIG. 14 is a block diagram representative of the example local controller of FIGS. 11-13.

FIG. 14 is a block diagram of the example local controller 1100. In the illustrated example, the local controller 1100 includes a voltage rectifier 1400, a polarity sensor 1402, a clock or timer 1404, a signal instruction processor 1406, the gravitational sensor 1306, a tube rotational speed determiner 1408, a rotational direction determiner 1410, a fully unwound position determiner 1412, a tube position monitor 1414, a programming processor 1416, a manual instruction processor 1418, a local instruction receiver 1308, a current sensor 1422, a motor controller 1424, and an information storage device or memory 1426.

During operation, the example polarity sensor 1402 determines a polarity (e.g., positive or negative) of a voltage source (e.g., a power supply) supplied to the local controller 1100. As described in further detail herein, the voltage source may be the central controller 1204. In some examples, the power supply may be conventional power supplied via a house and/or a building. In the illustrated example, the central controller 1204 modulates (e.g., alternates) the polarity of the power supplied to the local controller 1100 to signal commands or instructions (e.g., lower the covering 106, raise the covering 106, move the covering 106 to position X, etc.) to the local controller 1100. The example polarity sensor 1402 receives timing information from the clock 1404 to determine the duration of modulations of the polarity of the voltage (e.g., to determine that the polarity was switched from negative to positive, and held positive for 0.75 seconds indicating that the covering should be moved to 75% lowered). Thus, the illustrated example employs pulse width modulation to convey commands. The example polarity sensor 1402 of the illustrated example provides polarity information to the rotational direction determiner 1410, the memory 1426, and the motor controller 1424.

The voltage rectifier 1400 of the illustrated example converts the signal transmitted by the central controller 1204 to a direct current signal of a predetermined polarity. This direct current signal is provided to any of the components of the local controller 1100 that are powered (e.g., the programming instruction processor 1416, the memory 1426, the motor controller 1424, etc.). Accordingly, modulating (e.g., alternating) the polarity of the power signal to provide instructions to the local controller 1100 will not interfere with the operation of components that utilize a direct current signal for operation. Although the illustrated example modulates the polarity of the power signal, some examples modulate the amplitude of the signal.

The example clock or timer 1404 provides timing information using, for example, a real-time clock. The clock 1404 may provide information based on the time of day and/or may provide a running timer not based on the time of day (e.g., for determining an amount of time that has elapsed in a given period). In some examples, the clock 1404 is used to determine a time of day at which a manual input occurred. In other examples, the clock 1404 is used to determine an amount of time elapsed without a manual input. In other examples, the clock 1404 is used by the polarity sensor 1402 to determine a duration of a modulation (e.g., a polarity change).

The example signal instruction processor 1406 determines which of a plurality of actions are instructed by the signal transmitted from the central controller 1204 to the example local controller 1100. For example, the signal instruction processor 1406 may determine, via the polarity sensor 1402, that a modulation of the input power (e.g., signal having two polarity changes (e.g., positive to negative and back to positive) within one second) corresponds to a command to raise the example covering 106.

The example gravitational sensor 1306 determines an angular position of the tube 104 based on gravity. By monitoring the angular position of the tube 104 the position of the covering 106 attached to the tube 104 can be determined, recorded, and changed to a desired position. In some examples, the gravitational sensor 1306 is mounted to the example tube 104 along a longitudinal axis of the tube 104 so that it rotates about the same axis of rotation as the tube 104. In the illustrated example, a center of the gravitational sensor is disposed on (e.g., coincident with) the axis of rotation of the tube 104. The gravitational sensor 1306 may be an accelerometer (e.g., a single axis, a dual axes, a multiple axes accelerometer, etc.), a gyroscope, a pendulum attached to a rotary encoder, or any other device for determining rotation relative to an inertial frame of reference and/or based on gravity). In some examples, the gravitational sensor is a dual axes accelerometer having axes perpendicular to each other and the axis of rotation of the tube 104. While the examples described herein are described with reference to a sensor for determining rotation or position relative to an inertial frame of reference and/or based on gravity, other types of sensors may be used in addition to or in place of the gravitational sensor 1306. Thus, this disclosure is not limited to gravitational sensors.

The example tube rotational speed determiner 1408 determines a speed of rotation of the tube 104 using rotation information from the gravitational sensor 1306. Information from the tube rotational speed determiner 1408 facilitates a determination that the manual controller 120 and the motor 602 are operating simultaneously. For example, when the motor 602 is operating and the tube 104 is moving faster or slower than the speed at which the motor 602 is driving the tube 104, the speed difference is assumed to be caused by the operation of the manual controller 120 to assist or countermand the motor 602.

The fully unwound position determiner 1412 determines a position of the covering 106 where the covering 106 is fully unwound from the tube 104. In some examples, the fully unwound position determiner 1412 determines the fully unwound position based on movement of the tube 104 as described in further detail below. Because the fully unwound position will not change for a given covering 106 (e.g., unless the covering 106 is physically modified or an obstruction is present) the fully unwound position is a reference that can be used by the controller 1100. In other words, once the fully unwound position is known, other positions of the covering 106 can be referenced to that fully unwound position (e.g., the number of rotations of the tube 104 from the fully unwound position to a desired position). If the current position of the covering 106 is later unavailable (e.g., after a power loss, after the architectural opening cover 100 is removed and reinstalled, etc.), the local controller 1100 can be calibrated by moving the covering 106 to the fully unwound position as determined by the fully unwound position determiner 1412 and then rotating the tube 104 the known number of rotations to reach a desired position of the covering 106.

The example tube position monitor 1414 of FIG. 14 determines positions of the tube 104 during operation via the example gravitational sensor 1306. In some examples, the position of the tube 104 is determined relative to the fully unwound position. In some examples, the position of the tube 104 is determined in units of revolutions (e.g., revolutions relative to the fully unwound position).

The example rotational direction determiner 1410 of FIG. 14 determines a direction of rotation of the tube 104 such as, for example, clockwise or counterclockwise via the gravitational sensor 1306. In some examples, the rotational direction determiner 1410 associates the direction of rotation of the tube 104 with raising or lowering the example covering 106. For example, during initial setup, after a disconnection of power, etc., the rotational direction determiner 1410 may determine the direction of rotation of the tube 104 by operating the example motor 602 using the supplied voltage.

The example current sensor 1422 determines an amperage of a current supplied to drive the example motor 602. During operation, a first amperage provided to drive the motor 602 to raise the covering 106 is greater than a second amperage provided to drive the motor 602 to lower the covering 106 or to enable the covering 106 to lower. Accordingly, the current sensed by the current sensor 1422 is used by the rotational direction determiner 1410 to determine the direction of rotation of the tube 104.

The example manual instruction processor 1418 of FIG. 14 monitors the architectural opening covering assembly 100 for operation of the manual controller 120. The example manual instruction processor 1418 determines that the manual controller 120 is being operated when rotation of the tube 104 is sensed by the gravitational sensor 1306 while the motor 602 is not operated by the motor controller 1424 and/or the speed of rotation of the tube 104 as sensed by the tube rotational speed determiner 1408 is greater than or less than thresholds of rotational speed of the tube 104 expected via operation of the motor 602 by the motor controller 1424. The manual instruction processor 1418 of the illustrated example also determines if the user input is a command to enter a programming mode, a command to stop or move the covering 106, or any other command. Detection of commands is described in further detail below.

The example local instruction receiver 1308 receives signals (e.g., a RF signal) from the remote control 1310. In some examples, the signals correspond to an action such as, for example, raising or lowering the covering 106. After receiving the signals from the remote control 1310, the example local instruction receiver 1308 instructs the motor controller 1424 to move the covering 106 based on the client action corresponding to the signals.

The example programming processor 1416 enters a programming mode in response to a command from the manual controller 120 or the central controller 1204. The example programming processor 1416 determines and records preset positions of the covering 106 such as, for example, a lower limit position, an upper limit position, and/or any other desired position entered by a user (e.g., via the manual controller 120, via the central controller 1204, via the local controller 1100, etc.). The programming processor 1416 stores position information in the memory 1426.

The example information storage device or memory 1426 stores (a) times at which recurrent actions occurred, (b) rotational direction associations with polarity and operation of the motor 602, (c) commands or instructions and their associated signal patterns (e.g., polarity switches), (d) covering 106 positions (e.g., current positions, preset positions, etc.), (e) amperages associated with operation of the motor 602, and/or (f) any other information.

The example motor controller 1424 sends signals to the motor 602 to cause the motor 602 to operate the covering (e.g., lower the covering 106, raise the covering 106, and/or to prevent (e.g., brake, stop, etc.) movement of the covering 106, etc.). The example motor controller 1424 of FIG. 14 is responsive to instructions from the signal instruction processor 1406, the local instruction receiver 1308, the fully unwound position determiner 1412, and/or the programming processor 1416. The motor controller 1424 may include a motor control system, a speed controller (e.g., a pulse width modulation speed controller), a brake, or any other component for operating the motor 602. The example motor controller 1424 of FIG. 14 controls the supply of the voltage (i.e., power) provided by the voltage rectifier 1400 to the motor 602 to regulate the speed of the motor 602).

While an example manner of implementing the local controller 1100 has been illustrated in FIG. 14, one or more of the elements, processes and/or devices illustrated in FIG. 14 may be combined, divided, re-arranged, omitted, eliminated and/or implemented in any other way. Further, the example voltage rectifier 1400, polarity sensor 1402, clock or timer 1404, signal instruction processor 1406, gravitational sensor 1306, tube rotational speed determiner 1408, rotational direction determiner 1410, fully unwound position determiner 1412, tube position monitor 1414, programming processor 1416, manual instruction processor 1418, local instruction receiver 1308, current sensor 1422, motor controller 1424, information storage device or memory 1426, and/or the example local controller 1100 of FIG. 14 may be implemented by hardware, software, firmware and/or any combination of hardware, software and/or firmware. Thus, for example, any of the example voltage rectifier 1400, polarity sensor 1402, clock or timer 1404, signal instruction processor 1406, gravitational sensor 1306, tube rotational speed determiner 1408, rotational direction determiner 1410, fully unwound position determiner 1412, tube position monitor 1414, programming processor 1416, manual instruction processor 1418, local instruction receiver 1308, current sensor 1422, motor controller 1424, information storage device or memory 1426, and/or the example local controller 1100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example, the example voltage rectifier 1400, polarity sensor 1402, clock or timer 1404, signal instruction processor 1406, gravitational sensor 1306, tube rotational speed determiner 1408, rotational direction determiner 1410, fully unwound position determiner 1412, tube position monitor 1414, programming processor 1416, manual instruction processor 1418, local instruction receiver 1308, current sensor 1422, motor controller 1424, information storage device or memory 1426, and/or the example local controller 1100 are hereby expressly defined to include a tangible computer readable medium such as a memory, DVD, CD, Blu-ray, etc. storing the software and/or firmware. Further still, the example local controller 1100 of FIG. 14 may include one or more elements, processes and/or devices in addition to, or instead of, those illustrated in FIG. 14, and/or may include more than one of any or all of the illustrated elements, processes and devices.

Figure 15:
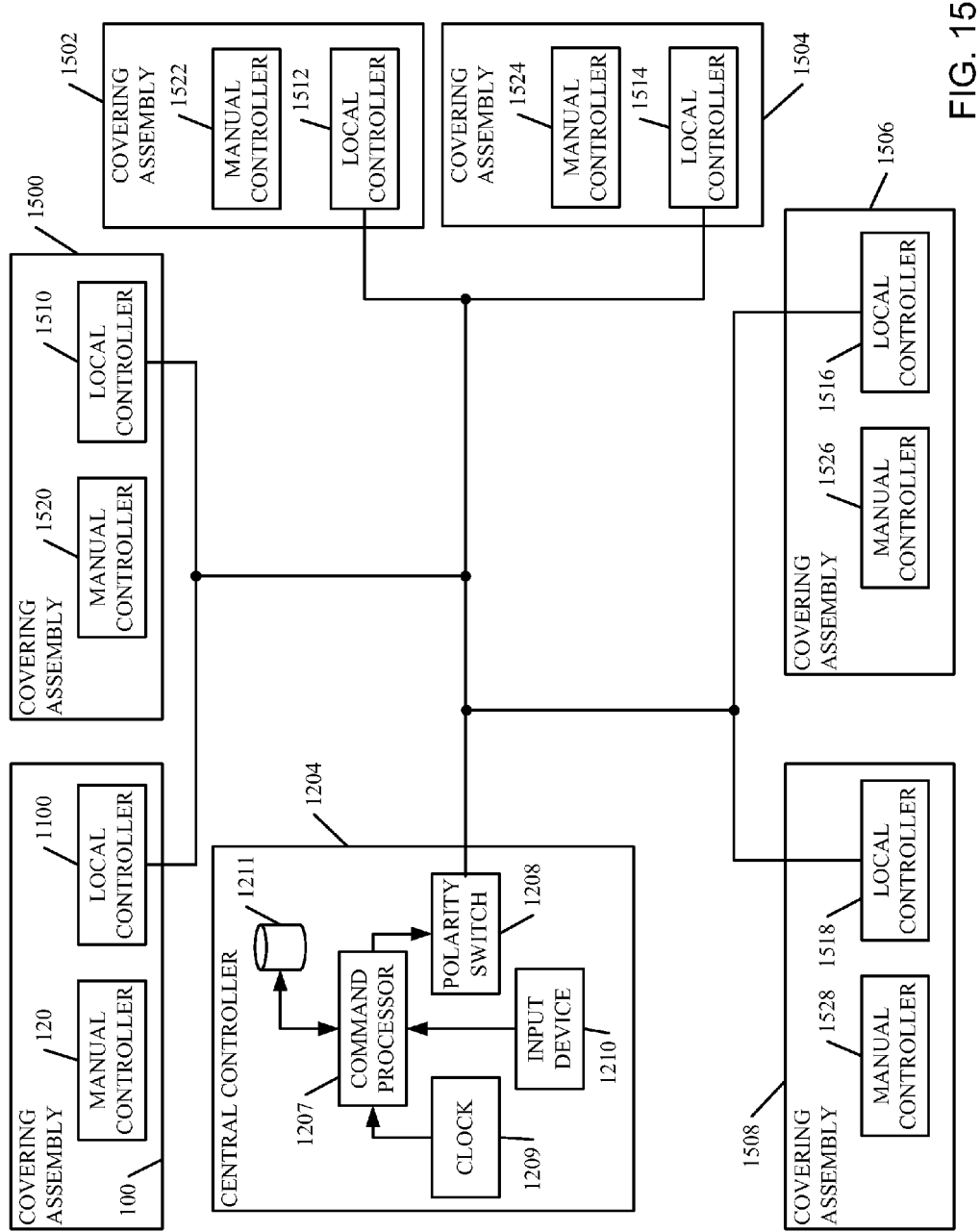
FIG. 15 is a block diagram representative of the example central controller of FIGS. 12 and 13 communicatively coupled to a plurality of example architectural opening covering assemblies each including a local controller and a manual controller.

FIG. 15 is a block diagram of the central controller 1204 of FIGS. 12 and 13 communicatively coupled to the architectural opening covering assembly 100 of FIG. 1 and a plurality of other architectural opening covering assemblies 1500, 1502, 1504, 1506 and 1508. The example architectural opening covering assemblies 1500, 1502, 1504, 1506 and 1508 of FIG. 15 are substantially identical the example architectural opening covering assembly 100 discussed above. Each of the architectural opening covering assemblies 100, 1500, 1502, 1504, 1506 and 1508 includes a local controller 1100, 1510, 1512, 1514, 1516 and 1518 (e.g., the example local controller 1100 of FIG. 14) and a manual controller 120, 1520, 1522, 1524, 1526 and 1528 (e.g., the example manual controller 120 of FIG. 3). The example architectural opening covering assemblies 100, 1500, 1502, 1504, 1506 and 1508 of FIG. 15 are located in one or more architectural openings in one or more rooms and/or any other suitable location(s). For example, the architectural opening covering assemblies 100, 1500, 1502, 1504, 1506 and 1508 may be disposed in architectural openings in multiple rooms on a single face of a building. The example central controller 1204 transmits signals to the local controllers 1100, 1510, 1512, 1514, 1516 and 1518 of the respective architectural opening covering assemblies 100, 1500, 1502, 1504, 1506 and 1508 to provide instructions or commands to perform an action(s) such as, for example, rotating the tube 104 via the motor 602, entering a central programming mode, etc. Thus, the example central controller 1204 may be used to collectively control the example architectural opening covering assemblies 100, 1500, 1502, 1504, 1506 and 1508. User(s) may also selectively raise or lower each of the coverings using the respective manual controllers 120, 1520, 1522, 1524, 1526 and 1528 of the architectural opening covering assemblies 100, 1500, 1502, 1504, 1506 and 1508.

While an example manner of implementing the central controller 1204 has been illustrated in FIGS. 12, 13 and 15, one or more of the elements, processes and/or devices illustrated in FIGS. 12, 13 and 15 may be combined, divided, re-arranged, omitted, eliminated and/or implemented in any other way. Further, the example command processor 1207, polarity switch 1208, clock 1209, input device 1210, information storage device 1211 and/or the example central controller 1204 of FIGS. 12, 13 and 15 may be implemented by hardware, software, firmware and/or any combination of hardware, software and/or firmware. Thus, for example, any of the example command processor 1207, polarity switch 1208, clock 1209, input device 1210, information storage device 1211 and/or the example central controller 1204 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example, the example command processor 1207, polarity switch 1208, clock 1209, input device 1210, information storage device 1211 and/or the example central controller 1204 are hereby expressly defined to include a tangible computer readable medium such as a memory, DVD, CD, Blu-ray, etc. storing the software and/or firmware. Further still, the example central controller 1204 of FIGS. 12, 13 and 15 may include one or more elements, processes and/or devices in addition to, or instead of, those illustrated in FIGS. 12, 13 and 15, and/or may include more than one of any or all of the illustrated elements, processes and devices.

Figure 16:
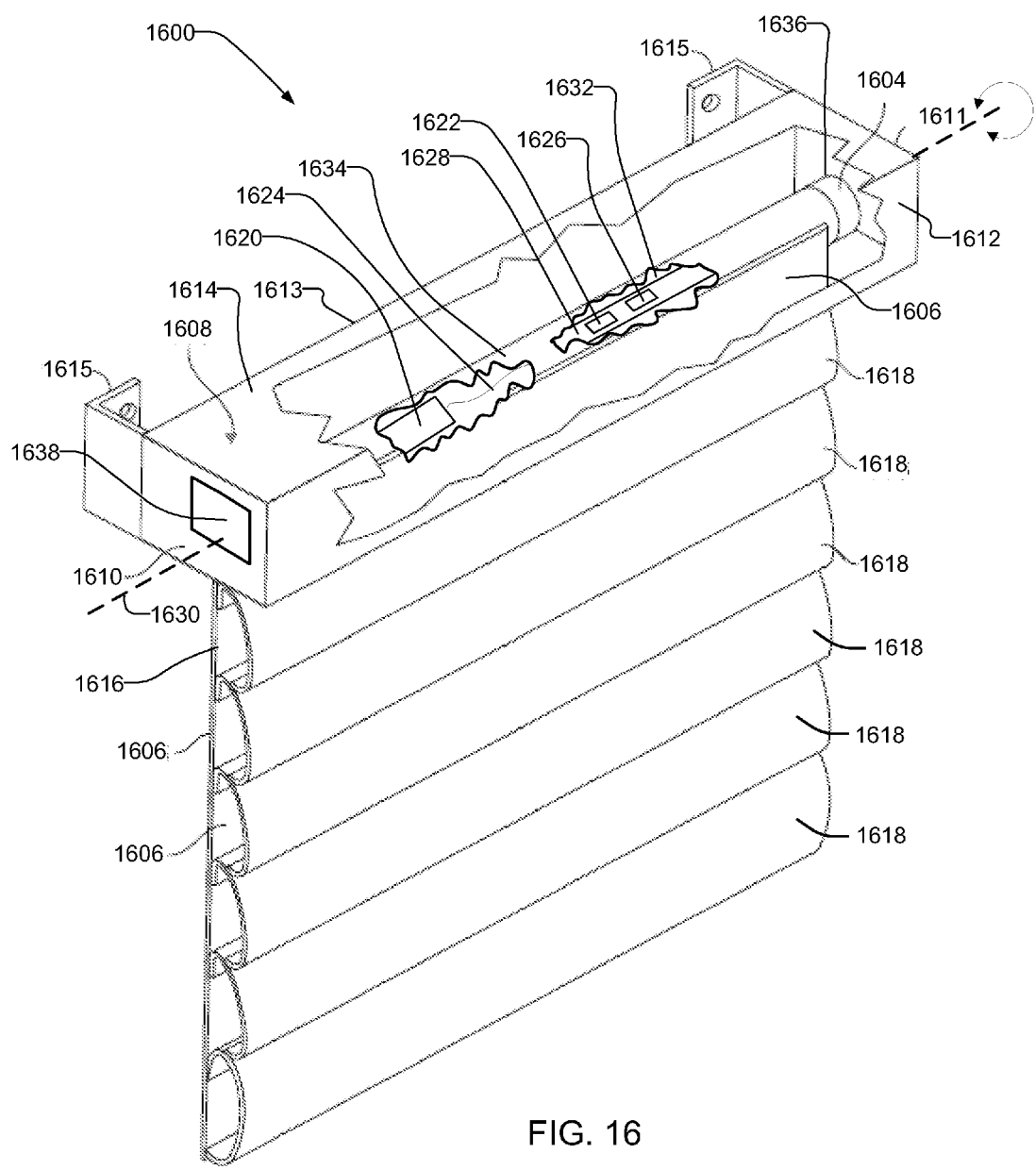
FIG. 16 is an isometric illustration of another example architectural opening covering assembly constructed in accordance with the teachings of this disclosure.

FIG. 16 is an isometric illustration of another example architectural opening covering assembly 1600 disclosed herein. In the example of FIG. 16, the covering assembly 1600 includes a headrail 1608. The headrail 1608 is a housing having opposed end caps 1610, 1611 joined by front 1612, back 1613 and top sides 1614 to form an open bottom enclosure. The headrail 1608 also has mounts 1615 for coupling the headrail 1608 to a structure above an architectural opening such as a wall via mechanical fasteners such as screws, bolts, etc. A roller tube 1604 is disposed between the end caps 1610, 1611. Although a particular example of a headrail 1608 is shown in FIG. 16, many different types and styles of headrails exist and could be employed in place of the example headrail 1608 of FIG. 16. Indeed, if the aesthetic effect of the headrail 1608 is not desired, it can be eliminated in favor of mounting brackets.

In the example illustrated in FIG. 16, the architectural opening covering assembly 1600 includes a covering 1606, which is a cellular type of shade. In this example, the cellular covering 1606 includes a unitary flexible fabric (referred to herein as a "backplane") 1616 and a plurality of cell sheets 1618 that are secured to the backplane 1616 to form a series of cells. The cell sheets 1618 may be secured to the backplane 1616 using any desired fastening approach such as adhesive attachment, sonic welding, weaving, stitching, etc. The covering 1606 shown in FIG. 16 can be replaced by any other type of covering including, for instance, single sheet shades, blinds, other cellular coverings, and/or any other type of covering. In the illustrated example, the covering 1606 has an upper edge mounted to the roller tube 1604 and a lower, free edge. The upper edge of the example covering 1606 is coupled to the roller tube 1604 via a chemical fastener (e.g., glue) and/or one or more mechanical fasteners (e.g., rivets, tape, staples, tacks, etc.). The covering 1606 is movable between a raised position and a lowered position (illustratively, the position shown in FIG. 16). When in the raised position, the covering 1606 is wound about the roller tube 1604.

The example architectural opening covering assembly 1600 is provided with a motor 1620 to move the covering 1606 between the raised and lowered positions. The example motor 1620 is controlled by a controller 1622. In the illustrated example, the controller 1622 and the motor 1620 are disposed inside the tube 1604 and communicatively coupled via a wire 1624. Alternatively, the controller 1622 and/or the motor 1620 may be disposed outside of the tube 1604 (e.g., mounted to the headrail 1608, mounted to the mounts 1615, located in a central facility location, etc.) and/or communicatively coupled via a wireless communication channel.

The example architectural opening covering assembly 1600 of FIG. 16 includes a gravitational sensor 1626 (e.g., the gravitational sensor made by Kionix® as part number KXTC9-2050) communicatively coupled to the controller 1622. The example gravitational sensor 1626 of FIG. 16 is coupled to the tube 1604 via a mount 1628 to rotate with the tube 1604. In the illustrated example, the gravitational sensor 1626 is disposed inside the tube 1604 along an axis of rotation 1630 of the tube 1604 such that an axis of rotation of the gravitational sensor 1626 is substantially coaxial to the axis of rotation 1630 of the tube 1604. In the illustrated example, a central axis of the tube 1604 is substantially coaxial to the axis of rotation 1630 of the tube 1604, and a center of the gravitational sensor 1626 is on (e.g., substantially coincident with) the axis of rotation 1630 of the tube 1604. In other examples, the gravitational sensor 1626 is disposed in other locations such as, for example, on an interior surface 1632 of the tube 1604, on an exterior surface 1634 of the tube 1604, on an end 1636 of the tube 1604, on the covering 1606, and/or any other suitable location. As described in greater detail below, the example gravitational sensor 1626 generates tube position information, which is used by the controller 1622 to determine an angular position of the tube 1604 and/or monitor movement of the tube 1604 and, thus, the covering 1606.

In some examples, the architectural opening covering assembly 1600 is operatively coupled to an input device 1638, which may be used to selectively move the covering 1606 between the raised and lowered positions. In some examples, the input device 1638 sends a signal to the controller 1622 to enter a programming mode in which one or more positions (e.g., a lower limit position, an upper limit position, a position between the lower limit position and the upper limit position, etc.) are determined and/or recorded. In the case of an electronic signal, the signal may be sent via a wired or wireless connection.

In some examples, the input device 1638 is a mechanical input device such as, for example, a cord, a lever, a crank, and/or an actuator coupled to the motor 1620 and/or the tube 1604 to apply a force to the tube 1604 to rotate the tube 1604. In some examples, the input device 1638 is implemented by the covering 1606 and, thus, the input device 1638 is eliminated. In some examples, the input device 1638 is an electronic input device such as, for example, a switch, a light sensor, a computer, a central controller, a smartphone, and/or any other device capable of providing instructions to the motor 1620 and/or the controller 1622 to raise or lower the covering 1606. In some examples, the input device 1638 is a remote control, a smart phone, a laptop, and/or any other portable communication device, and the controller 1622 includes a receiver to receive signals from the input device 1638. Some example architectural opening covering assemblies include other numbers of input devices (e.g., 0, 2, etc.). The example architectural opening covering assembly 1600 may include any number and combination of input devices.

Figure 17:
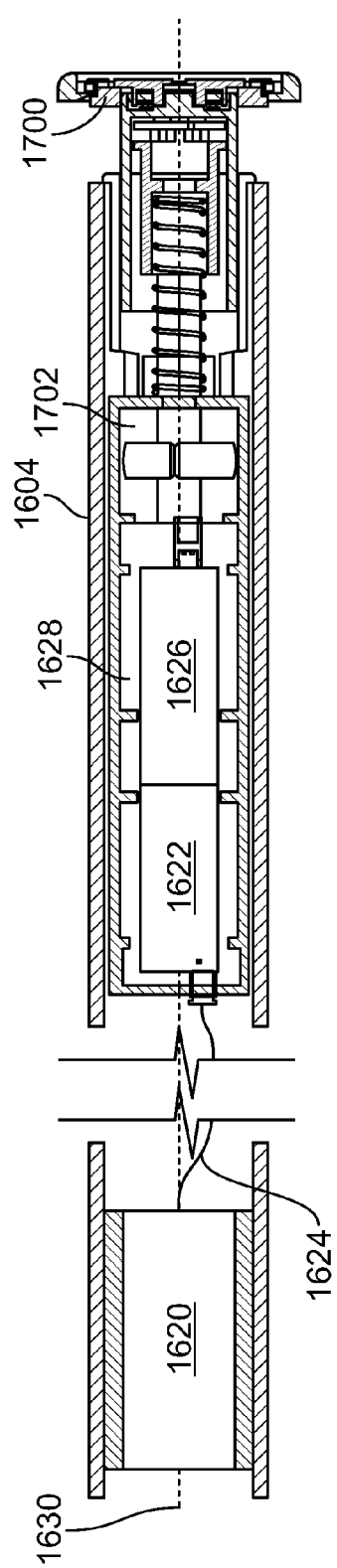
FIG. 17 is a cross-sectional view of a tube of the example architectural opening covering assembly of FIG. 16.

FIG. 17 is a cross-sectional view of the example tube 1604 of FIG. 16. In the illustrated example, the tube 1604 is coupled to the end cap 1611 and/or the mount 1615 via a slip ring 1700. In some examples, a power source provides power to the input device 1638, the motor 1620, the controller 1622, and/or other components of the architectural opening covering assembly 1600 via the slip ring 1700. A housing 1702 is disposed inside the example tube 1604 of FIG. 17 to rotate with the tube 1604. In the illustrated example, the mount 1628 is disposed inside the housing 1702 and is coupled to the housing 1702. The example mount 1628 of FIG. 17 is a circuit board (e.g., a printed circuit board (PCB)) onto which components of the controller 1622 are coupled. Thus, in the illustrated example, the controller 1622 and the gravitational sensor 1626 rotate with the tube 1604.

As mentioned above, the example gravitational sensor 1626 is coupled to the mount 1628 such that an axis of rotation of the gravitational sensor 1626 is substantially coaxial to the axis of rotation 1630 of the tube 1604, which is substantially coaxial to a central axis of the tube. In the illustrated example, the center of the gravitational sensor 1626 is disposed on (e.g., substantially coincident with) the axis of rotation 1630 of the tube 1604. As a result, when the tube 1604 rotates about the axis of rotation 1630, the gravitational sensor 1626 is subjected to a substantially constant gravitational force (g-force) of about 1 g (i.e., the gravitational sensor 1626 does not substantially move up and down relative to Earth). In other examples, the gravitational sensor 1626 is disposed in other positions and experiences variable g-forces as the tube 1604 rotates. As described below, the g-force provides a frame of reference independent of the angular position of the tube 1604 from which the rotation and, thereby, an angular position of the tube 1604 can be determined.

In the illustrated example, the gravitational sensor 1626 is an accelerometer (e.g., a capacitive accelerometer, a piezoelectric accelerometer, a piezoresistive accelerometer, a Hall Effect accelerometer, a magnetoresistive accelerometer, a heat transfer accelerometer and/or any other suitable type of accelerometer). Alternatively, the gravitational sensor 1626 may be any other type of gravitational sensor such as, for example, a tilt sensor, a level sensor, a gyroscope, an eccentric weight (e.g., a pendulum) movably coupled to a rotary encoder, an inclinometer, and/or any other suitable gravitational sensor.

Alternatively, any other sensor that determines the angular position of the tube 1604 relative to one or more frame(s) of references that are independent of (e.g., substantially fixed or constant relative to) the angular position of the tube 1604 may be utilized. For example, a sensor that generates tube position information based a magnetic field imparted by one or more magnets disposed outside of the tube 1604 (e.g., on a wall, bracket, etc. adjacent the tube 1604) may be employed by the example architectural opening covering assembly 1600. Similarly, a sensor may generate tube position information based on a radio frequency (RF) signal transmitted from outside of the tube 1604 (e.g., by detecting a strength of the RF signal, which may vary depending on the angular position of the sensor in and/or on the tube 1604 relative to a RF signal transmitter, and so forth.

Figure 18C:
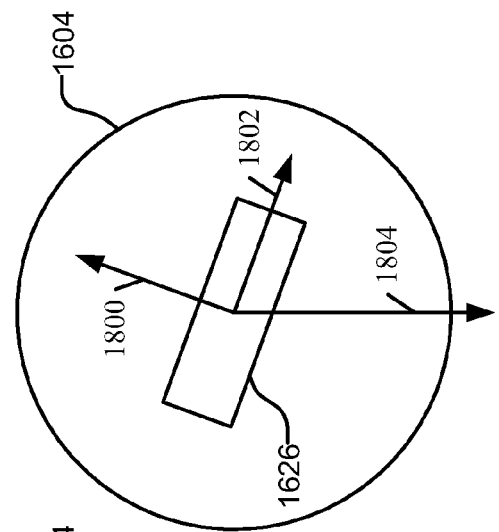
FIG. 18A-C illustrates angular positions of the tube of the example architectural opening covering assembly of FIGS. 16-17.
Figure 18B:
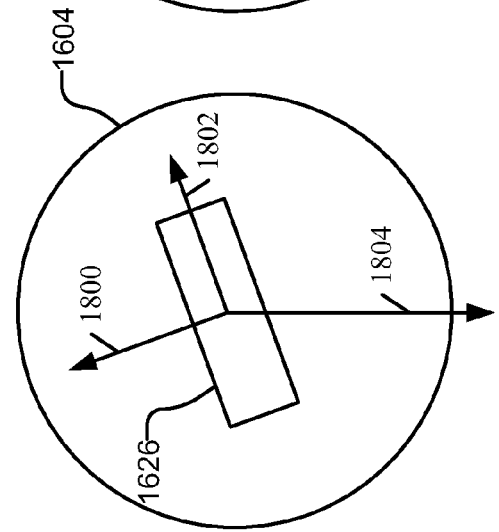
Figure 18A:
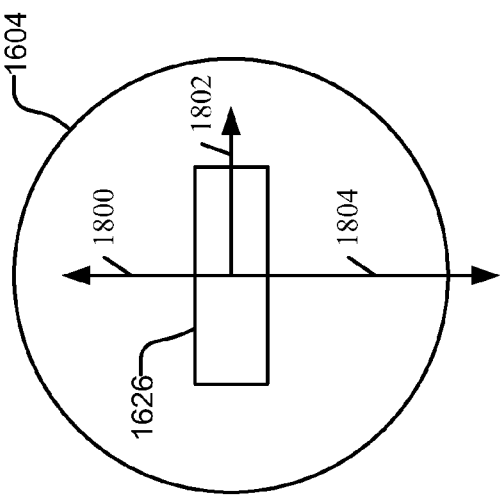

FIGS. 18A-C illustrate the example tube 1604 and the example gravitational sensor 1626 oriented in various angular positions. In the illustrated example, the gravitational sensor 1626 is a dual-axis gravitational sensor. Thus, the gravitational sensor 1626 generates tube position information based on an orientation of a first axis 1800 and a second axis 1802 of the gravitational sensor 1626 relative to a direction of gravitational force, which is illustrated in FIGS. 18A-C as a gravitational vector of Earth 1804. In the illustrated example, the axis of rotation 1630 of the tube 1604 runs perpendicular to the plane in which FIGS. 18A-C are drawn. The example first axis 1800 and the example second axis 1802 of FIGS. 18A-C are perpendicular to each other and the axis of rotation 1630 of the tube 1604. As a result, when the first axis 1800 is aligned with the gravitational field vector of Earth 1804, as illustrated in FIG. 18A, the second axis 1802 is perpendicular to the gravitational field vector of Earth 1804. Alternatively, the gravitational sensor 1626 may be a tri-axial gravitational sensor and/or any other type of gravitational sensor.

The gravitational sensor 1626 of the illustrated example generates tube position information and transmits the tube position information to the controller 1622. The example gravitational sensor 1626 outputs a first signal associated with the first axis 1800 and a second signal associated with the second axis 1802. The first signal includes a first value (e.g., a voltage) corresponding to a g-force experienced by the gravitational sensor 1626 along the first axis 1800. The second signal includes a second value (e.g., a voltage) corresponding to a g-force experienced by the gravitational sensor 1626 along the second axis 1802. Thus, the tube position information generated by the example gravitational sensor 1626 includes the first value and the second value, which are based on the orientation of the gravitational sensor 1626. In the illustrated example, the gravitational sensor 1626 substantially constantly outputs the first signal and/or the second signal. In some examples, the gravitational sensor 1626 outputs the first signal and the second signal according to a schedule (e.g., the gravitational sensor 1626 outputs the first signal and/or the second signal every one one-hundredth of a second irrespective of the detection of movement, etc.).

Each angular position of the gravitational sensor 1626 and, thus, the tube 1604 corresponds to a different first value and/or second value. Thus, the first value and/or the second value are indicative of an angular displacement of the gravitational sensor 1626 relative to the gravitational field vector of Earth 1804. A combination of the first value and the second value is indicative of a direction of the angular displacement (e.g., clockwise or counterclockwise) of the example gravitational sensor 1626 relative to the gravitational vector of Earth 1804. As a result, based on the first value and the second value, an angular position (i.e., the amount of angular displacement in a given direction relative to the gravitational vector of Earth 1804) of the tube 1604 may be determined. A change in the first value and/or the second value is indicative of motion (i.e., rotation) of the tube 1604. Thus, a rate of change of the first value and/or the second value is indicative of a speed of rotation of the tube 1604, and a rate of change of the speed of rotation of the tube 1604 indicates an angular acceleration of the tube 1604.

In the illustrated example of FIG. 18A, the gravitational sensor 1626 is in a first angular position such that the first axis 1800 is aligned with the gravitational field vector 1804 and pointing in an opposite direction of the gravitational field vector 1804. As a result, the example gravitational sensor 1626 outputs a first value corresponding to positive 1 g. In the illustrated example of FIG. 18A, the second axis 1802 is perpendicular to the gravitational field vector 1804 and, thus, the gravitational sensor 1626 outputs a second value corresponding to zero g.

In the illustrated example of FIG. 18B, the gravitational sensor is in a second angular position such that the gravitational sensor 1626 is rotated about 30 degrees counterclockwise in the orientation of FIG. 18B from the first angular position. The first value and the second value output by the example gravitational sensor 1626 are sinusoidal functions of the angular position of the gravitational sensor 1626 relative to the gravitational vector of Earth 1804. Thus, in the illustrated example, one or more trigonometric functions may be used to determine the angular position of the gravitational sensor 1626 based on the first value and the second value. In the illustrated example of FIG. 18B, when the gravitational sensor 1626 is in the second position, the gravitational sensor 1626 outputs the first value indicative of 0.866 g (0.866 g=1 g×sin(60 degrees)) and the second value indicative of about 0.5 g (0.5 g=1 g×sin(30 degrees). Thus, an inverse tangent of the g-force indicated by the first value over the g-force indicated by the second value indicates that the second angular position of the gravitational sensor 1626 and, thus, the tube 1604 is thirty degrees counterclockwise from the first angular position.

In FIG. 18C, the tube 1604 is in a third angular position at which the tube 1604 is rotated thirty degrees clockwise in the orientation of FIG. 18C from the first angular position. As a result, the first value indicates a g-force of positive 0.866 g and the second value indicates a g-force of negative 0.5 g. Thus, the inverse tangent of the g-force indicated by the first value over the g-force indicated by the second value indicates that the tube 1604 is rotated thirty degrees clockwise from the first angular position.

As the tube 1604 and, thus, the gravitational sensor 1626 rotate about the axis of rotation 1630, the first value and the second value of the first signal and the second signal, respectively, change according to the orientation (e.g., angular position) of the gravitational sensor 1626. Thus, rotation of the tube 1604 may be determined by detecting a change in the first value and/or the second value. Further, the angular displacement (i.e., amount of rotation) of the tube 1604 may be determined based on the amount of change of the first value and/or the second value.

The direction of the angular displacement may be determined based on how the first value and/or the second value change (e.g., increase and/or decrease). For example, if the g-force experienced along the first axis decrease and the g-force experienced along the second axis decrease, the tube 1604 is rotating counterclockwise in the orientation of FIGS. 18A-C. While particular units and directions are disclosed as examples herein, any units and/or directions may be utilized.

For example, an orientation that results in a positive value in an example disclosed herein may alternatively result in a negative value in a different example.

A revolution of the tube 1604 may be determined and/or incremented by detecting a repetition of a combination of the first value and the second value during rotation of the tube 1604. For example, if the tube 1604 is rotating in one direction and a given combination of the first value and the second value repeat (e.g., a combination indicative of 1 g and 0 g for the first value and the second value, respectively), the tube 1604 rotated one revolution from the angular position at which the combination of the first and second value corresponds (e.g., the first angular position).

In some examples, a rotational speed of the tube 1604 is determined based on a rate of change of the angular position of the gravitational sensor 1626. In some examples, the controller 1622 determines the angular position of the tube 1604, the rotational speed of the tube 1604, the direction of rotation of the tube 1604 and/or other information based on the tube position information generated by the gravitational sensor 1626. In other examples, the tube position information includes the angular position of the tube 1604, the rotational speed of the tube 1604, and/or other information.

Based on the angular displacement (e.g., a number of revolutions) of the tube 1604 from a reference position of the covering 1606 (e.g., a previously stored position, a fully unwound position, a lower limit position, an upper limit position, etc.), a position of the covering 1606 may be determined, monitored and/or recorded.

During operation of the example architectural opening covering assembly 1600, the example gravitational sensor 1626 transmits tube position information to the controller 1622. In some examples, the controller 1622 receives a command from the input device 1638 to move the covering 1606 in a commanded direction (e.g., to raise the covering 1606, to lower the covering 1606, etc.) and/or move the covering 1606 to a commanded position (e.g., a lower limit position, an upper limit position, etc.). In some examples, based on the tube position information, the controller 1622 determines a direction in which the tube 1604 is to be rotated to move the covering 1606 in the commanded direction, a number of (and/or a fraction of) revolutions of the tube 1604 to move the covering 1606 from its current position to the commanded position, and/or other information. The example controller 1622 then transmits a signal to the motor 1620 to rotate the tube 1604 in accordance with the command. As the motor 1620 rotates the tube 1604 and winds or unwinds the covering 1606, the gravitational sensor 1626 transmits tube position information to the controller 1622, and the controller 1622 determines, monitors and/or stores the position of the covering 1606, the number of revolutions of the tube 1604 (which may be whole numbers and/or fractions) away from the commanded position and/or a reference position, and/or other information. Thus, the controller 1622 controls the position of the covering 1606 based on the tube position information generated by the example gravitational sensor 1626.

In some examples, the user provides a user input that causes the tube 1604 to rotate or rotate at a speed greater than or less than one or more thresholds of rotational speed of the tube 1604 expected via operation of the motor 1620 (e.g., by pulling on the covering 1606, twisting the tube 1604, etc.). In some examples, based on the tube position information generated by the example gravitational sensor 1626, the controller 1622 monitors movement of the tube 1604 and detects the user input (e.g., based on detecting movement of the tube 1604 (e.g., a rock and/or rotation, an angular acceleration, a deceleration, etc.) when the motor 1620 is not being operated to move the tube 1604). When the user input is detected, the controller 1622 may operate the motor 1620 (e.g., to counter or assist rotation of the tube 1604).

Figure 19:
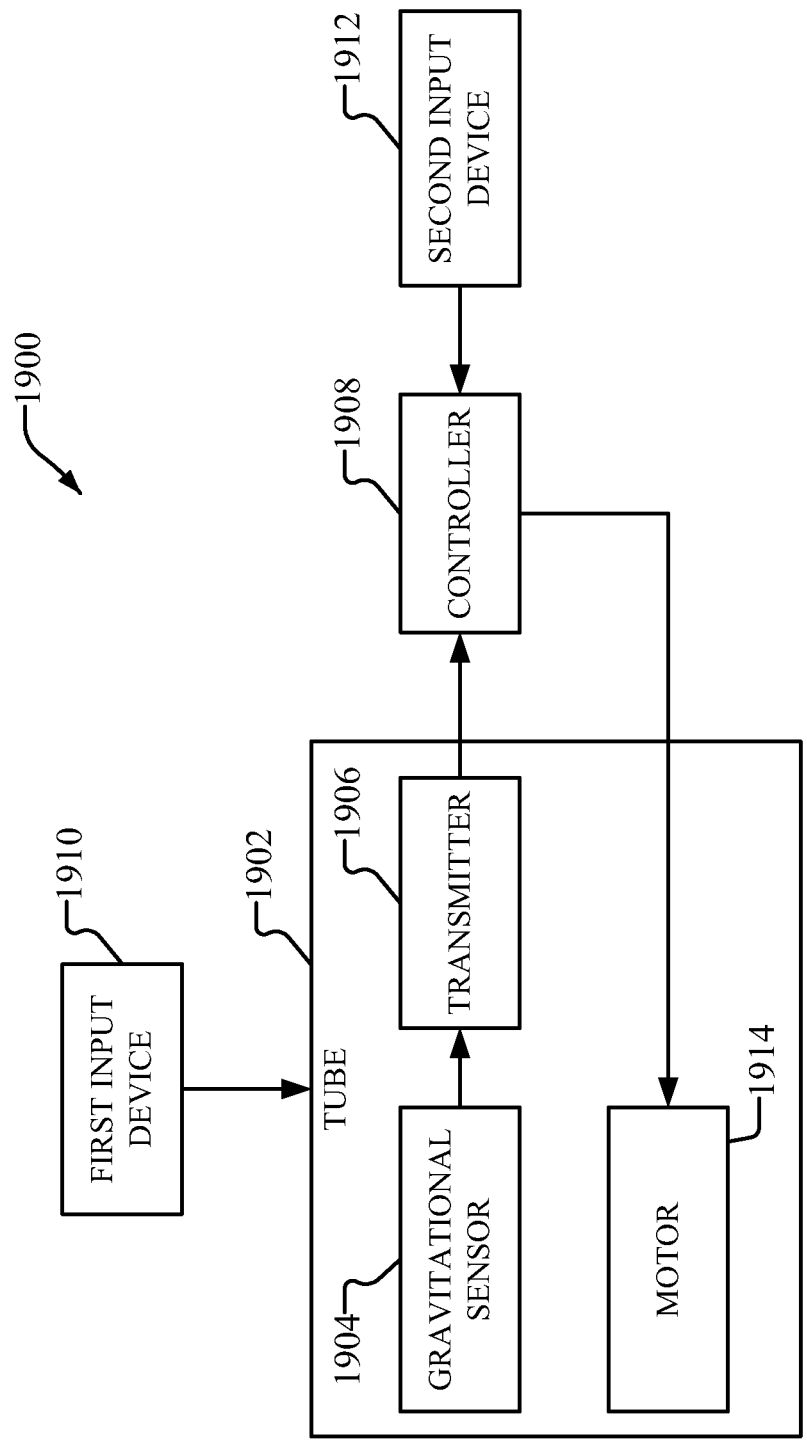
FIG. 19 is a block diagram representative of another example architectural opening covering assembly disclosed herein.

FIG. 19 is a block diagram of another example architectural opening covering assembly 1900 disclosed herein. In the illustrated example, the architectural opening covering assembly 1900 includes a tube 1902, a gravitational sensor 1904, a transmitter 1906, a controller 1908, a first input device 1910, a second input device 1912 and a motor 1914. In the illustrated example, the gravitational sensor 1904, the transmitter 1906 and the motor 1914 are disposed inside the tube 1902. The example controller 1908 of FIG. 19 is disposed outside of the tube 1902 (e.g., in a control box adjacent an architectural opening). In the illustrated example, the first input device 1910 is a mechanical input device (e.g., a cord (e.g., a loop) drivable actuator) operatively coupled to the tube 1902. The example second input device 1912 is an electronic input device (e.g., a remote control) communicatively coupled to the controller 1908. During operation of the example architectural opening covering assembly 1900, the gravitational sensor 1904 generates tube position information, and the transmitter 1906 transmits the tube position information to the controller 1908 (e.g., wirelessly, via a wire, etc.). The example controller 1908 utilizes the tube position information to monitor a position of the tube 1902 and operate the motor 1914.

Figure 20:
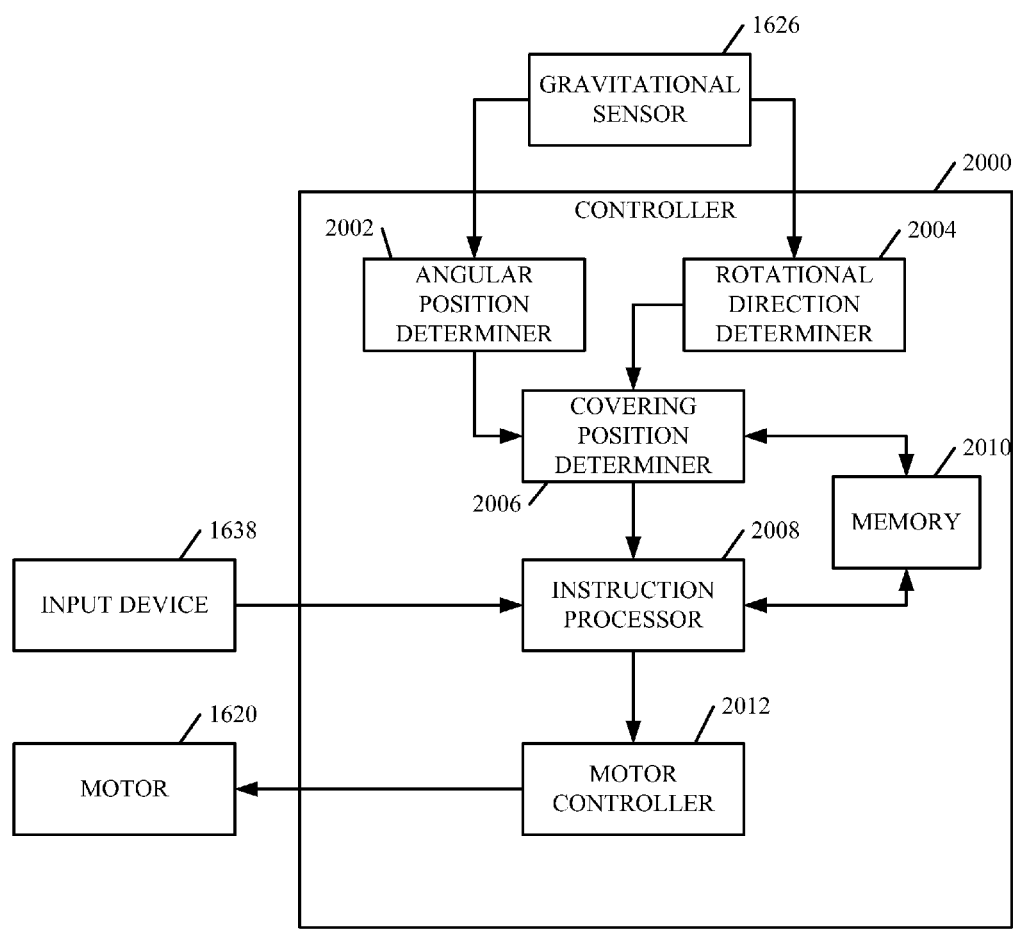
FIG. 20 is a block diagram representative of an example controller, which may control the example architectural opening covering assemblies of FIGS. 1, 16 and/or 19.

FIG. 20 is a block diagram of an example controller 2000 disclosed herein, which may implement the example controller 1100 of FIG. 14, the example controller 1622 of FIGS. 16-17 and/or the example controller 1908 of FIG. 19. Although the example controller 2000 of FIG. 20 is described below in conjunction with the example architectural opening covering assembly 1600 of FIGS. 16-17, the example controller 2000 may be employed as the controller of other examples such as the controller 1100 of FIG. 14, the controller 1908 of the architectural opening covering assembly 1900 of FIG. 19, etc.

In the illustrated example, the controller 2000 includes an angular position determiner 2002, a rotational direction determiner 2004, a covering position determiner 2006, an instruction processor 2008, a memory 2010 and a motor controller 2012. During operation of the controller 2000, the gravitational sensor 1626 generates tube position information (e.g., voltages corresponding to g-forces experienced along dual axes of the gravitational sensor 1626). The tube position information is transmitted to the angular position determiner 2002 and/or the rotational direction determiner 2004 (e.g., via a wire). In the illustrated example, the angular position determiner 2002 processes the tube position information and/or determines an angular position of the tube 1604 (e.g., relative to a gravitational field vector of Earth) based on the tube position information.

The example rotational direction determiner 2004 of FIG. 20 determines a direction of rotation of the tube 1604 such as, for example, clockwise or counterclockwise based on the angular positions of the tube 1604 and/or the tube position information. In the illustrated example, the rotational direction determiner 2004 determines the direction of rotation based on how the first value and/or the second value outputted by the example gravitational sensor 1626 changes as the tube 1604 rotates. The example the rotational direction determiner 2004 associates the direction of rotation of the tube 1604 with raising or lowering the example covering 1606. For example, during initial setup, after a disconnection of power, etc., the rotational direction determiner 2004 associates the direction of rotation of the tube 1604 with raising or lowering the example covering 1606 based on a first voltage supplied to the motor 1620 to rotate the tube 1604 in a first direction and a second voltage supplied to the motor 1620 to rotate the tube 1604 in a second direction (e.g., if the first voltage is greater than the second voltage and, thus, a first load on the motor to rotate the tube 1604 in the first direction is greater than a second load on the motor to rotate the tube 1604 in the second direction, the first voltage is associated with raising the covering 1606).

In some examples, the example instruction processor 2008 may receive instructions via the input device 1638 to raise or lower the covering 1606. In some examples, in response to receiving the instructions, the instruction processor 2008 determines a direction of rotation of the tube 1604 to move the covering 1606 to a commanded position and/or an amount of rotation of the tube 1604 to move the covering 1606 to the commanded position. In the illustrated example, the instruction processor 2008 sends instructions to the motor controller 2012 to operate the motor 1620.

The example memory 2010 of FIG. 20 organizes and/or stores information such as, for example, a position of the covering 1606, a direction of rotation of the tube 1604 to raise the covering 1606, a direction of rotation of the tube 1604 to lower the covering 1606, one or more reference positions of the covering 1606 (e.g., a fully unwound position, an upper limit position, a lower limit position, etc.), and/or any other information that may be utilized during the operation of the architectural opening covering assembly 1600.

The example motor controller 2012 sends signals to the motor 1620 to cause the motor 1620 to operate the covering 1606 (e.g., lower the covering 1606, raise the covering 1606, and/or prevent (e.g., brake, stop, etc.) movement of the covering 1606, etc.). The example motor controller 2012 of FIG. 20 is responsive to instructions from the instruction processor 2008. The motor controller 2012 may include a motor control system, a speed controller (e.g., a pulse width modulation speed controller), a brake, or any other component for operating the motor 1620. In some examples, the example motor controller 2012 of FIG. 20 controls a supply of the voltage (e.g., corresponding to power) to the motor 1620 to regulate the speed of the motor 1620.

The example covering position determiner 2006 of FIG. 20 determines a position of the covering 1606 relative to a reference position such as, for example, a previously stored position, a fully unwound position, a lower limit position, an upper limit position and/or any other reference position. To determine the position of the covering 1606, the example covering position determiner 2006 determines an angular displacement (i.e., an amount of rotation) of the tube 1604 from a given position such as, for example, a previously stored position and/or any other position, and the covering position determiner 2006 increments a number of revolutions of the tube 1604 from the reference position. The covering position determiner 2006 may adjust a stored position of the covering 1606. In some examples, the covering position determiner 2006 determines the position of the covering 1606 in units of degrees of tube rotation relative to the reference position (e.g., based on the angular position of the tube 1604 determined via the angular position determiner 2002 and the direction of rotation of the tube 1604 determined via the rotational direction determiner 2004) and/or any other unit of measurement.

While an example manner of implementing the controller 2000 has been illustrated in FIG. 20, one or more of the elements, processes and/or devices illustrated in FIG. 20 may be combined, divided, re-arranged, omitted, eliminated and/or implemented in any other way. Further, the example gravitational sensor 1626, angular position determiner 2002, rotational direction determiner 2004, covering position determiner 2006, instruction processor 2008, motor controller 2012, input device 1638, memory 2010, and/or the example controller 2000 of FIG. 20 may be implemented by hardware, software, firmware and/or any combination of hardware, software and/or firmware. Thus, for example, any of the example gravitational sensor 1626, angular position determiner 2002, rotational direction determiner 2004, covering position determiner 2006, instruction processor 2008, motor controller 2012, input device 1638, memory 2010, and/or the example controller 2000 of FIG. 20 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example gravitational sensor 1626, angular position determiner 2002, rotational direction determiner 2004, covering position determiner 2006, instruction processor 2008, motor controller 2012, input device 1638, memory 2010, and/or the example controller 2000 of FIG. 20 are hereby expressly defined to include a tangible computer readable medium such as a memory, DVD, CD, Blu-ray, etc. storing the software and/or firmware. Further still, the example controller 2000 of FIG. 20 may include one or more elements, processes and/or devices in addition to, or instead of, those illustrated in FIG. 20, and/or may include more than one of any or all of the illustrated elements, processes and devices.

Flowcharts representative of example machine readable instructions for implementing the example local controller 1100 of FIG. 14, the controller 1622 of FIG. 16, the controller 1908 of FIG. 19, and/or the controller 2000 of FIG. 20 are shown in FIGS. 21-30. In these examples, the machine readable instructions comprise a program for execution by a processor such as the processor 3112 shown in the example processor platform 3100 discussed below in connection with FIG. 31. The program may be embodied in software stored on a tangible computer readable medium such as a CD-ROM, a floppy disk, a hard drive, a digital versatile disk (DVD), a Blu-ray disk, or a memory associated with the processor 3112, but the entire program and/or parts thereof could alternatively be executed by a device other than the processor 3112 and/or embodied in firmware or dedicated hardware. Further, although the example program is described with reference to the flowcharts illustrated in FIGS. 21-30, many other methods of implementing the example local controller 1100 may alternatively be used. For example, the order of execution of the blocks may be changed, and/or some of the blocks described may be changed, eliminated, or combined.

As mentioned above, the example processes of FIGS. 21-30 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage device or storage disc and to exclude propagating signals. Additionally or alternatively, the example processes of FIGS. 21-30 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage device or storage disc and to exclude propagating signals.

Figure 21:
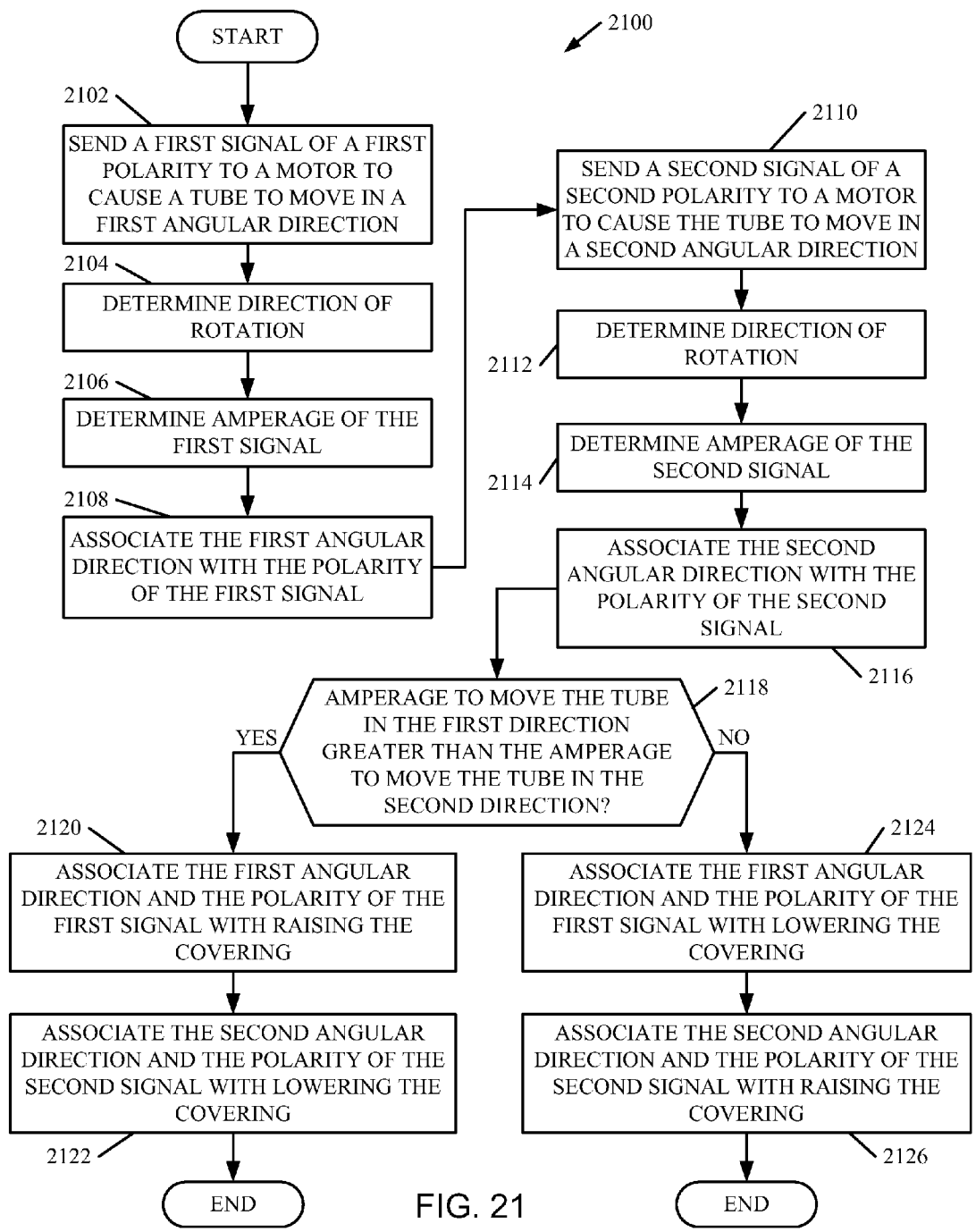
FIGS. 21-26 are flowcharts representative of example machine readable instructions for implementing the local controller of FIG. 14.

FIG. 21 is a flow chart representative of example machine readable instructions which may be executed to implement the example controller 1100 of FIG. 14, the example controller 1622 of FIGS. 16-17, the example controller 1908 of FIG. 19 and/or the example controller 2000 of FIG. 20. The example instructions 2100 of FIG. 21 are executed to determine the direction of rotation of the tube 104 that raises the covering 106 (i.e., winds the covering 106 around the tube 104) and, conversely, the direction of rotation of the tube 104 lowers the covering 106 (e.g., unwinds the covering 106 from the tube 104). In some examples, the instructions 2100 are initiated in response to an initial supply of power to the local controller 1100 and/or the central controller 1204, a manual input provided via the manual controller 120, a command from the central controller 1204 and/or the programming processor 1416 (e.g., to enter a programming mode, etc.), a temporary loss of power to the local controller 1100, and/or other event or condition. In other examples, the instructions are executed continuously and/or whenever there is movement of the roller tube 104.

The example instructions of FIG. 21 begins by the rotational direction determiner 1410 responding to a command from the programming processor 1416 by causing the motor controller 1424 to send a first signal of a first polarity to the motor 602 to cause the tube 104 to move in a first angular direction (block 2102). For example, the motor controller 1424 of the local controller 1100 sends a signal (e.g., voltage and/or current) having a positive polarity to the motor 602 and, as a result, the motor 602 rotates the tube 104 in the first angular direction. The motor controller 1424 receives a voltage from the voltage rectifier 1400 that has a constant polarity and passes the voltage to the motor 602 directly or after modulating (e.g., switching) the polarity to a desired polarity.

The rotational direction determiner 1410 determines the first angular direction (e.g., clockwise) based on movement of the tube 104 determined by the gravitational sensor 1306 (e.g., an accelerometer) (block 2104). The current sensor 1422 determines an amperage of the first signal provided to the motor 602 (block 2106). The rotational direction determiner 1410 associates the first angular direction with the polarity of the first signal (block 2108). For example, the rotational direction determiner 1410 associates a positive polarity with a clockwise direction of rotation.

The motor controller 1424 of the illustrated example sends a second signal of a second polarity to the motor 602 to cause the tube 104 to move in a second angular direction opposite the first angular direction (block 2110). In some such examples, the motor 602 rotates the tube 104 or enables the tube 104 to rotate in the second angular direction (e.g., the motor 602 applies a torque less than a torque applied by the weight of the covering 106 to allow the weight of the covering to rotate the tube 104 to unwind the covering 106). The rotational direction determiner 1410 determines the second angular direction (e.g., counterclockwise) based on movement of the tube 104 determined by the gravitational sensor 1306 (block 2112). The current sensor 1422 determines an amperage of the second signal (block 2114). The rotational direction determiner 1410 associates the second angular direction with the polarity of the second signal (block 2116). In the illustrated example, the rotational direction determiner 1410 associates the negative polarity with the counterclockwise direction.

The rotational direction determiner 1410 determines whether the amperage to move the tube 104 in the first direction is greater than the amperage to move the tube 104 in the second direction (block 2118). If the amperage to move the tube 104 in the first direction is greater than the amperage to move the tube 104 in the second direction, the rotational direction determiner 1410 associates the first angular direction and the polarity of the first signal with raising the covering 106 (i.e., winding the covering 106 onto the tube 104) (block 2120) and associates the second angular direction and the polarity of the second signal with lowering the covering 106 (i.e., unwinding the covering 106 from the tube 104) (block 2122). If the amperage to move the tube 104 in the first direction is less than the amperage to move the tube 104 in the second direction, the rotational direction determiner 1410 associates the first angular direction and the polarity of the first signal with lowering the covering 106 (block 2124) and associates the second angular direction and the polarity of the second signal with raising the covering 106 (block 2126). The associations may be stored in the memory 1426 to be referenced by the local controller 1100 when receiving instructions to raise or lower the cover 102.

Figure 22:
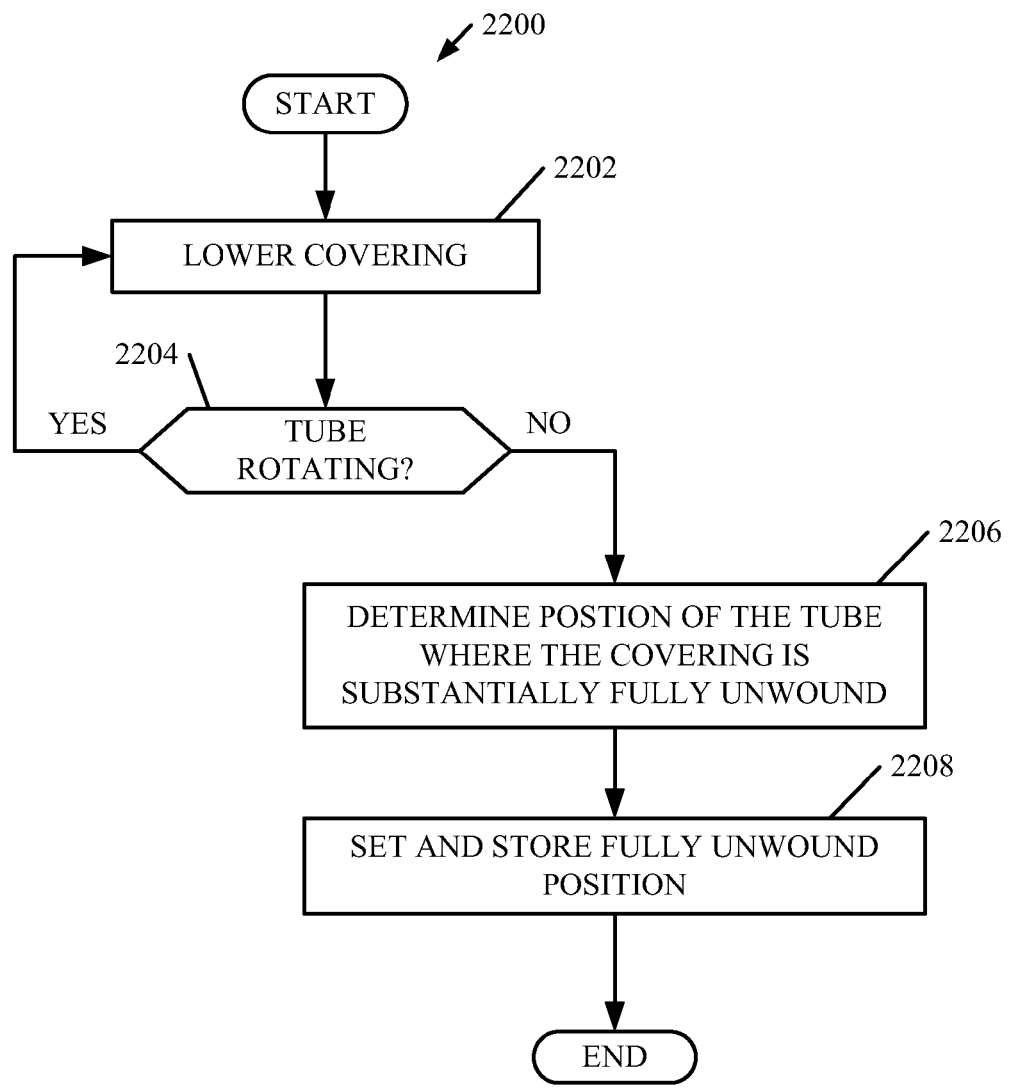

FIG. 22 is a flow chart of example machine readable instructions which may be executed to implement the example controller 1100 of FIG. 14, the example controller 1622 of FIGS. 16-17, the example controller 1908 of FIG. 19, and/or the example controller 2000 of FIG. 20. The example instructions 2200 of FIG. 22 are executed to determine and/or set a fully unwound position (e.g., where the covering 106 is fully unwound from the tube 104). The example instructions 2200 may be initiated in response to an initial supply of power to the local controller 1100 and/or the central controller 1204, a manual input provided via the manual controller 120, a command from the central controller 1204 and/or the programming processor 1416, continuously whenever the tube moves, and/or in response to any other event or condition.

In the example of FIG. 22, the instructions begins when the fully unwound position determiner 1412 responds to a command from the programming processor 1416 to determine a fully unwound position by sending a signal to the motor controller 1424 to lower the covering 106 (block 2202). For example, the motor controller 1424 responds to the signal from the fully unwound position determiner 1412 by sending a signal to the motor 602 to cause the motor 602 to rotate in the unwinding direction. In some examples, a polarity of the signal is associated with the unwinding direction (e.g., by repeating the instructions of 2100 of FIG. 21). 12. In some examples, the motor 602 drives the tube 104 in the unwinding direction. In other examples, the motor 602 enables the weight of the covering 106 to cause the tube 104 to rotate in the unwinding direction and the motor 602 does not oppose the unwinding or opposes it with less force than the force applied by the weight of the covering 106.

The tube rotational speed determiner 1408 of the illustrated example determines whether the tube 104 is rotating (block 2204). For example, the gravitational sensor 1306 (e.g., an accelerometer) detects movement of the tube 104, and the example rotational speed determiner 1408 determines whether the position of the covering 106 is changing over a time imposed with reference to the example clock 1404. Due to a provided dead band (i.e., a lost motion) when the motor is operatively disengaged from the tube 104, a one-way gear that prevents the motor from driving the tube 104 in the unwinding direction, and/or any other component, the tube 104 stops rotating, at least temporarily, when the covering reaches its lowermost position (e.g., the fully unwound position). If the rotational speed determiner 1408 determines that the tube 104 is rotating, the example instructions 2200 return to block 2202 to continue waiting for the tube 104 to stop rotating, which indicates that the covering has reached its lowermost position.

If the tube 104 is not rotating (block 2204), the fully unwound position determiner 1412 of the illustrated example determines the position of the tube 104 where the covering 106 is substantially fully unwound (i.e., the fully unwound position) (block 2206). For example, when the motor 602 is provided with the signal to lower the covering 106 but the tube 104 is rotated to or past the fully unwound position, the motor 602 causes the drive shaft 804 to rotate at least partially through the dead band provided by the example first clutch 800. As a result, the tube 104 does not rotate for a time, and the lack of movement of the tube 104 is determined or sensed by the gravitational sensor 1306 and the tube rotational speed determiner 1408. Based on the signal sent to the motor 602 and the lack of movement of the tube 104 while the motor 602 drives the drive shaft 804 through the dead band of the first clutch 800, the fully unwound position determiner 1412 determines that the tube 104 is in the fully unwound position.

The programming processor 1416 sets and stores the fully unwound position (block 2208). In some examples, the fully unwound position is stored in the example information storage device 1426 as a position of zero revolutions. In other examples, the fully unwound position is stored in the example information storage device 1426 as a position relative to one or more frames of reference (e.g., a reference axis of the gravitational sensor 1306, a previously determined fully unwound position, etc.). In some such examples, the fully unwound position is adjusted based on the one or more frames of reference.

In some examples, the tube position monitor 1414 determines other position(s) of the tube 104 relative to the fully unwound position during operation of the example architectural opening covering assembly 100. For example, when the tube 104 is moved, the tube position monitor 1414 determines a count of revolutions of the tube 104 in the winding direction away from the fully unwound position based on rotation information provided by the example gravitational sensor 1306.

In some examples, after the fully unwound position is stored, the tube 104 is rotated one or more revolutions from the fully unwound position in the winding direction to reduce the strain of the covering 106 on the fixture that attaches the covering 106 to the tube 104. In such examples, the tube position monitor 1414 determines or detects the amount of movement of the tube 104 in the winding direction based on the angular movement information provided by the gravitational sensor 1306, and the motor controller 1424 sends a signal to the motor 602 to drive the motor 602 in the winding direction.

Figure 23:
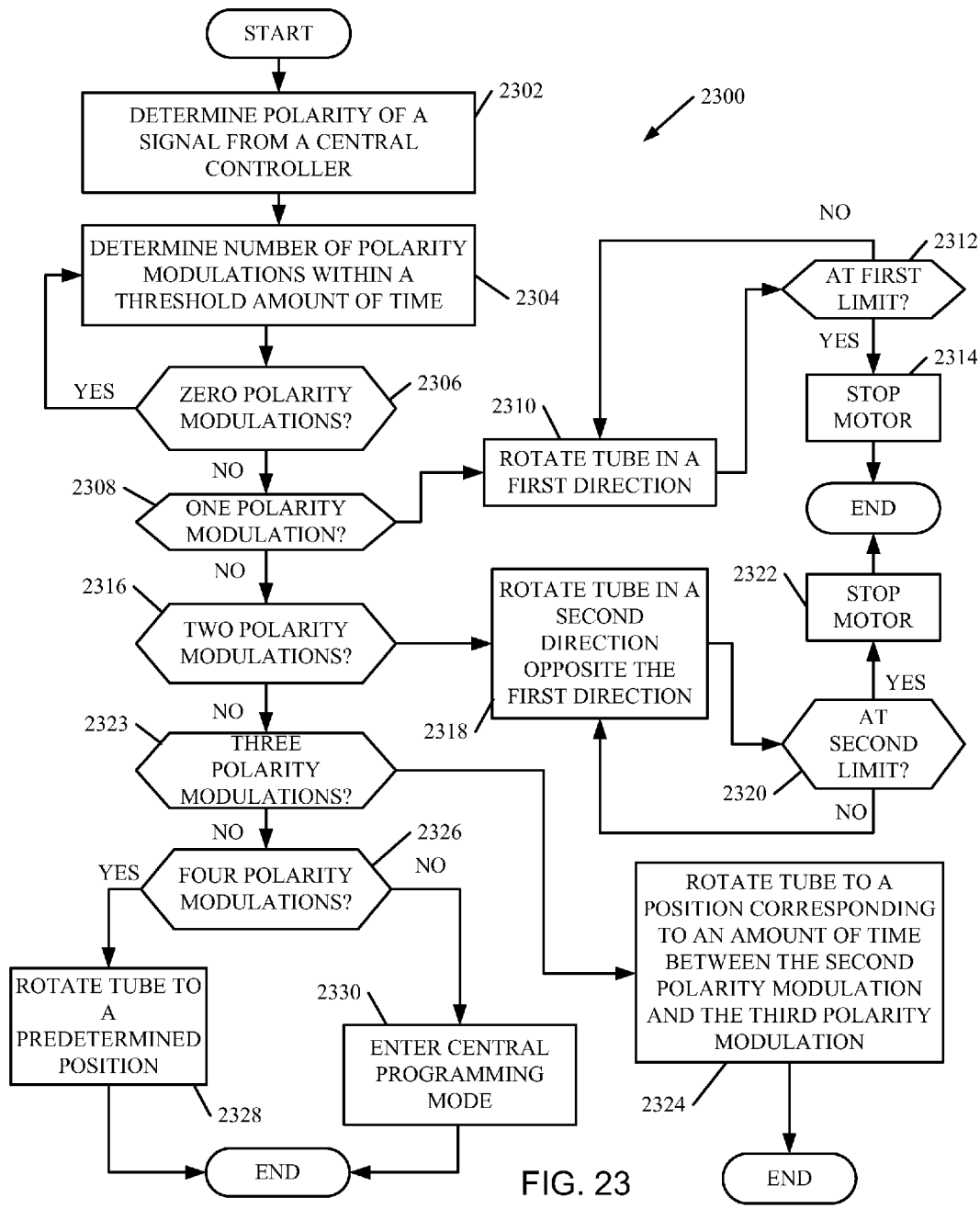

FIG. 23 is a flow chart of example machine readable instructions which may be executed to implement one of the example local controllers 1100, 1510, 1512, 1514, 1516 and 1518 of FIG. 15 and/or the example controller 1100 of FIG. 14, the example controller 1622 of FIGS. 16-17 and/or the example controller 1908 of FIG. 19. The example central controller 1204 transmits signals to the example local controllers to provide instructions or commands to perform an action such as, for example, rotating the tube 104 via the motor 602, entering a programming mode, etc. In some examples, a polarity of the signal is modulated (e.g., alternated) by the central controller 1204 to define the instructions or commands. For example, particular polarity modulation patterns may be associated with particular instructions as described below. Other examples employ other communication techniques (e.g., data communication, packetized communication, other modulation techniques or algorithms, etc.).

The following commands and actions are merely examples, and other commands and/or actions may be used in other examples. Although the following example instructions are described in conjunction with the example central controller 1204 and the example architectural opening covering assembly 100 of FIGS. 1-13, in some examples, the example commands are transmitted from the central controller 1204 to the plurality of example architectural opening covering assemblies (e.g., the example architectural opening assemblies 100, 1500, 1502, 1504, 1506 and 1508 of FIG. 15) and/or are transmitted by a device other than the central controller 1204.

The example instructions 2300 of FIG. 23 begin when the polarity sensor 1402 determines a polarity of a signal received from the central controller 1204 (block 2302). In the illustrated example, the signal from the central controller 1204 has a positive polarity or a negative polarity, which can be modulated (e.g., changed or reversed) by the polarity switch 1208. The signal instruction processor 1406 determines a number of polarity modulations within a corresponding amount of time (block 2304). The amount of time is a time period that is sufficiently short to ensure that the entire command is recognized and that two commands or other fluctuations of the signal are not identified or misinterpreted as a first command. For example, if the polarity of the signal modulations from positive to negative to positive within the amount of time, the signal instruction processor 1406 determines that two polarity modulations occurred within the measured amount of time. In some examples, the length of the time period is about one second. In some examples, the time period may be tracked by starting a timer when a first polarity modulation occurs and detecting polarity modulations that occur before the timer expires. Additionally or alternatively, a sliding window having a width equal to the time period may be used to analyze the signal and polarity modulations in the window may be detected. Any suitable method for determining polarity modulations may be used (e.g., a synch may be detected, a start signal and a stop signal may be detected, etc.).

If no (i.e., zero) polarity modulations occur in a given window (block 2306), the example instructions 2300 returns to block 2304 to continue monitoring for polarity modulations. If one polarity modulation occurs (block 2308), the motor controller 1424 sends a signal to the motor 602 to rotate the tube 104 in a first direction (block 2310). In some examples, if one polarity modulation occurs and the polarity of the signal modulations from positive to negative, the tube 104 rotates in a direction associated with the negative polarity. In some examples, the polarity of the signal is associated with the unwinding direction or the winding direction using the example instructions 2100 of FIG. 21.

Then, the tube position monitor 1414 determines if the tube 104 is at a first limit position (block 2312). In some examples, the first limit position is a predetermined lower limit position such as, for example, a preset lower limit position, the fully unwound position, one revolution away from the fully unwound position in the winding direction, an upper limit position, or any other suitable position. The example tube position monitor 1414 determines the position of the tube 104 based on the rotation of the tube 104 relative to the fully lowered position and/or the lower limit position. If the tube position monitor 1414 determines that the tube 104 is not at the first limit position, the example instructions 2300 returns to block 2310. If the tube position monitor 1414 determines that the tube 104 is at the first limit position, the motor controller 1424 causes the motor 602 to stop (block 2314). The instructions of FIG. 23 may be terminated or may return to block 2304.

Returning to the NO result of block 2308, if two polarity modulations occur (block 2316), the motor controller 1424 sends a signal to the motor 602 to rotate the tube 104 in a second direction opposite the first direction (block 2318). In some examples, if two polarity modulations occur and the polarity modulations from positive to negative to positive within the amount of time, the tube 104 is rotated in a direction associated with the positive polarity (e.g., the winding direction). At block 2320, the tube position monitor 1414 determines whether the tube 104 is at a second limit position. In some examples, the second limit is a predetermined upper limit position. If the tube 104 is not at the second limit position, the example instructions 2300 returns to block 2318 to wait for the tube 104 to reach the second limit position. If the tube 104 is at the second limit position, the motor controller 1424 causes the motor 602 to stop (block 2322). As described in greater detail below, the user may set the lower limit position and the upper limit position via a local programming mode or a central programming mode.

If three polarity modulations occur (block 2323), the motor controller 1424 sends a signal to the motor 602 to rotate the tube 104 to an intermediate position corresponding to an amount of time that passed between the second polarity modulation and the third polarity modulation (block 2324). For example, the amount of opening may be indicated by an amount of time between 0 and 1 second. For example, if the amount of time between the second polarity modulation and the third polarity modulation is about 400 milliseconds, the motor controller 1424 sends a signal to the motor 602 to rotate the tube 104 to a position corresponding to a position a distance of about 40 percent of a distance between the lower limit position and the upper limit position (i.e., the covering 106 is about 40 percent open). In some examples, amount of opening of the covering 106 that is desired and, thus, the amount of time in the command, corresponds to an amount of sunlight shining onto a side of a building in which the example architectural opening covering assembly 100 is disposed. For example, the central controller 1204 may be communicatively coupled to a light sensor to detect and measure light shining onto the side of the building, and the covering 106 will be opened further when there is low light and will be closed further when there is more light.

If four polarity modulations occur (block 2326), the motor controller 1424 sends a signal to the motor 602 to rotate the tube 104 to a predetermined position (block 2328). In some examples, the predetermined position is an intermediate position between the lower limit and the upper limit. If the number of polarity modulations within the amount of time is greater than four, the example programming processor 1416 causes the example local controller 1100 to enter central programming mode (block 2330). As described in greater detail below, a user may set position limits using the central controller 1204 and the manual controller 120 while the local controller 1100 is in the central programming mode.

Figure 24:
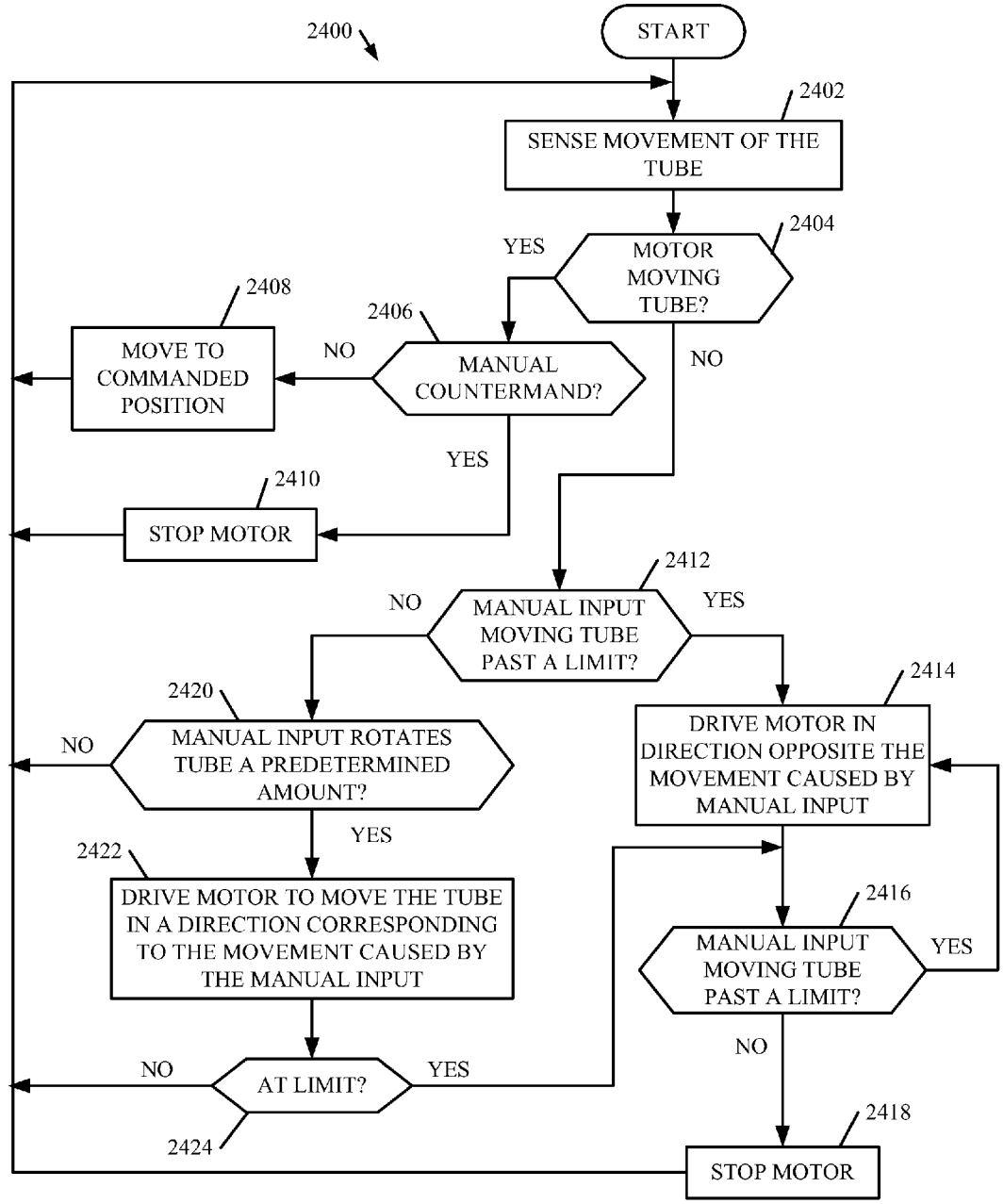

FIG. 24 is a flowchart representative of example machine readable instructions which may be executed to implement the example controller 1100 of FIG. 14, the example controller 1622 of FIGS. 16-17, the example controller 1908 of FIG. 19 and/or the example controller 2000 of FIG. 20. In some examples, the manual controller 120, the local controller 1100, and/or the central controller 1204 cooperate to control the example architectural opening covering assembly 100 disclosed herein. For example, the tube rotational speed determiner 1408 may detect an input via the manual controller 120 and, based on the input, the motor controller 1424 causes the motor 602 to facilitate or assist movement of the tube 104 or prevent movement of the tube 104 (e.g., to prevent the manual controller 120 from moving the tube 104 past an upper or lower limit). In some examples, the manual controller 120 is used to override operation of the motor 602 by the motor controller 1424.

The example instructions 2400 of FIG. 24 begin with the tube position monitor 1414 sensing movement of the tube 104 (block 2402). In some examples, the tube position monitor 1414 continuously senses the position of the tube 104. For example, the gravitational sensor 1306 of the example local controller 1100 determines angular positions of rotation of the tube 104, which the tube position monitor 1414 uses to determine positions of the tube 104 relative to the fully unwound position or the lower limit position. The tube rotational speed determiner 1408 determines whether the motor 602 is moving the tube 104 (block 2404). For example, the tube rotational speed determiner 1408 determines whether the manual controller 120 is moving the tube 104 or the motor 602 is moving the tube 104 in response to a command from the motor controller 1424. If the motor 602 is moving the tube 104, the manual instruction processor 1418 determines whether a user is providing a manual countermand (block 2406). For example, if only the motor 602 is rotating the tube 104, the speed at which the tube 104 rotates is based on the gearbox ratio and the speed of the motor 602. If the manual instruction processor 1418 determines that the tube 104 is rotating at an unexpected speed or in an unexpected direction (e.g., rotating faster or slower than the speed at which only the motor 602 rotates the tube 104, not rotating, rotating in a direction opposite a direction commanded by the motor controller 1424, etc.), then the manual instruction processor 1418 determines that the manual controller 120 is being operated. If the manual controller 120 is being operated in a direction opposite of the rotation of the motor 602, the tube 104 spins slower than the speed at which the motor 602 rotates the tube 104, stops, and/or moves in a direction opposite a direction commanded by the motor controller 1424. As a result, the manual instruction processor 1418 determines that the user is providing the manual countermand. In some examples, the manual countermand is a manual input in either a direction of the rotation of the motor 602 or the direction opposite the rotation of the motor 602.

If the user is not providing the manual countermand (block 2406), the motor controller 1424 sends a signal to the motor 602 to cause the tube 104 to move to a commanded position (block 2408). In some examples, the commanded position is the lower limit position, the upper limit position, or any other set position such as, for example, an intermediate position between the upper limit position and the lower limit position. The example instructions then returns to block 2402.

If the user is providing the manual countermand (block 2406), the motor controller 1424 sends a signal to stop the motor 602 (block 2410). Thus, the user may countermand or cancel the command from the motor controller 1424 by providing operating the manual controller 120. The example instructions then returns to block 2402.

Returning to block 2404, if the motor 602 is not moving the tube 104 (i.e., the manual controller 120 is moving the tube 104), the tube position monitor 1414 determines whether the manual input is moving the tube 104 past a limit (block 2412). For example, a user may provide a manual input by pulling on the cord 200 to rotate the tube 104 past the lower limit position or the upper limit position. In such examples, the tube position monitor 1414 determines the position of the tube 104 relative to the lower limit position and/or the fully unwound position. In some examples, the current sensor 1422 determines an amperage of the current supplied to the motor 602 to determine whether the tube 104 is rotating past the upper limit position. For example, if the covering 106 fully winds around the tube 104, an end of the covering 106 may engage a portion of the example architectural opening covering assembly 100, which causes the amperage supplied to the motor 602 to increase. In such examples, if the motor controller 1424 determines that the increase in the amperage has occurred, the motor controller 1424 determines that the tube 104 is rotating past the upper limit position. In other examples, if the manual input moves the tube 104 past the upper limit by a predetermined amount (e.g., one half of a rotation or more), the example local controller 1400 again determines the fully unwound position using, for example, the example instructions 2200 of FIG. 22. For example, the fully unwound position may be determined again because it is assumed that the calibration of the tube rotation may have been lost because the tube 104 was rotated past an upper limit of the architectural opening covering assembly 100.

If the manual input is moving the tube 104 past the limit (block 2412), the motor controller 1424 sends a signal to the motor 602 to drive the motor 602 in a direction opposite of the movement of the tube 104 caused by the manual input (block 2414). For example, if the manual input is moving the tube 104 past the lower limit position, the motor controller 1424 sends a signal to the motor 602 to drive the tube 104 in the winding direction. The manual instruction processor 1418 again determines whether the user is providing a manual input causing the tube 104 to move past the limit (block 2416). If the user is not providing a manual input causing the tube 104 to move past the limit, the motor controller 1424 sends a signal to the motor 602 to stop (block 2418), and the example instructions returns to block 2402. Accordingly, the tube 104 is prevented from rotating past the limit.

Returning to block 2412, if the manual input is not moving the tube 104 past the limit, the manual instruction processor 1418 determines whether the manual input has rotated the tube 104 a threshold amount (block 2420). In some examples, the threshold amount corresponds to at least a number of tube rotations. In some such examples, the threshold amount is at least a quarter of one revolution. In some examples, the manual instruction processor 1418 determines whether the manual input is provided for a continuous amount of time (e.g., at least two seconds). In other examples, the manual instruction processor 1418 determines whether the manual input is provided for a total amount of time such as, for example, two seconds within a threshold period amount of time such as, for example, 3 seconds. In some examples, the manual instruction processor 1418 determines the amount of time the manual input is provided in only a first direction or a second direction. In some examples, the manual instruction processor 1418 determines whether the manual input is equal to or greater than a threshold distance in the first direction or the second direction within the threshold amount of time.

If the manual instruction processor 1418 determines that the manual input is not provided for a threshold amount of time or distance, the example instructions returns to block 2402. If the manual input is provided for the threshold amount of time or distance, the motor controller 1424 sends a signal to the motor 602 to move the tube 104 in a direction corresponding to the movement of the tube 104 caused by the manual input (block 2422). For example, if the manual input causes the covering 106 to rise, the motor controller 1424 sends a signal to the motor 602 to cause the motor 602 to drive the tube 104 in the winding direction. The tube position monitor 1414 determines whether the tube 104 is at the limit (block 2424). If the tube 104 is not at the limit, the example instructions returns to block 2402. If the tube 104 is at the limit, the manual instruction processor 1418 determines whether the user is providing a manual input causing the tube 104 to move past the limit (block 2416). If the user is providing a manual input causing the tube 104 to move past the limit, the motor controller 1424 sends a signal to the motor 602 to drive the tube 104 in the direction opposite of the movement caused by the manual input (block 2414). If the user is not providing a manual input causing the tube 104 to move past the limit, the motor controller 1424 causes the motor 602 to stop (block 2418), and the example instructions returns to block 2402.

Figure 25:
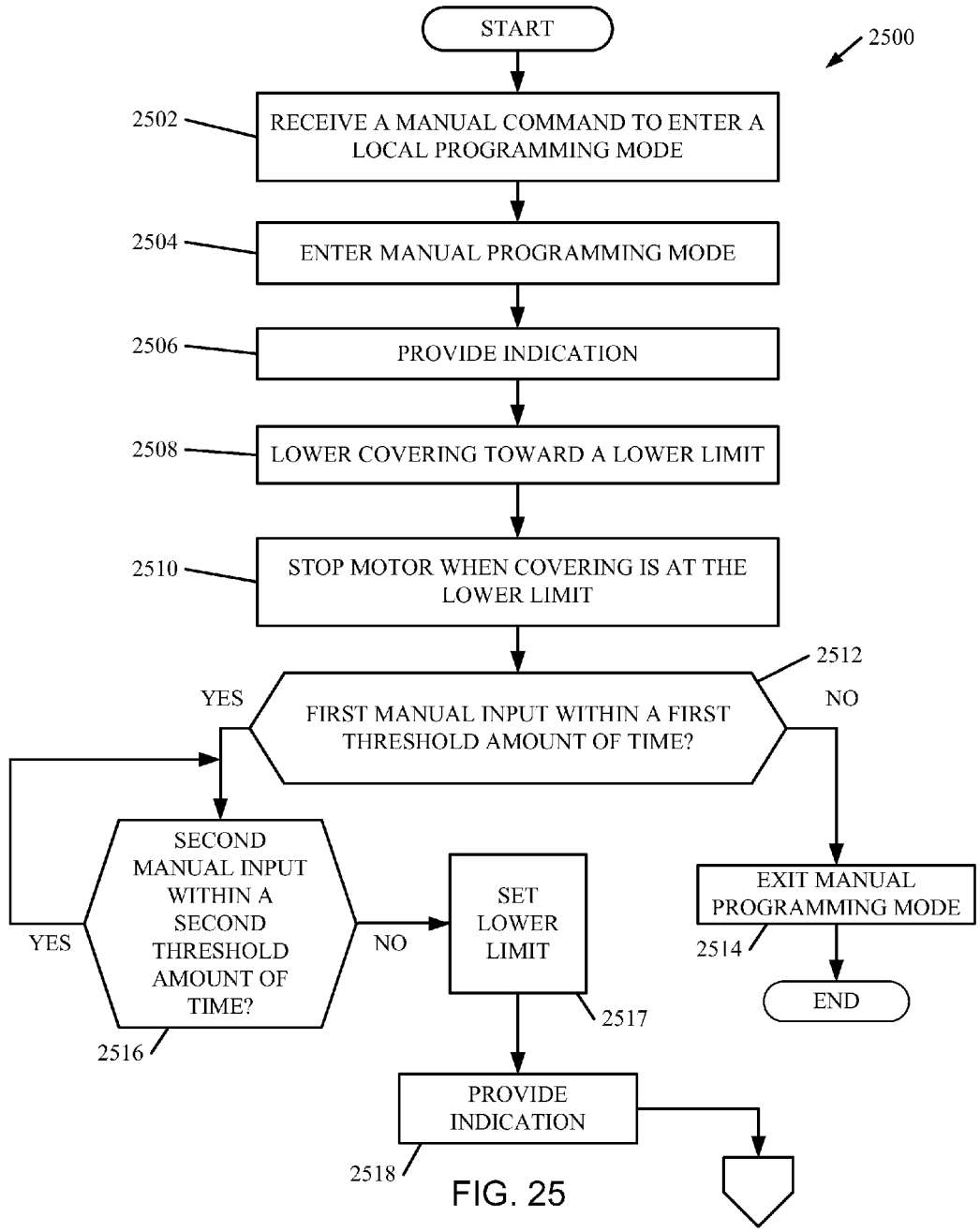
Figure 26:
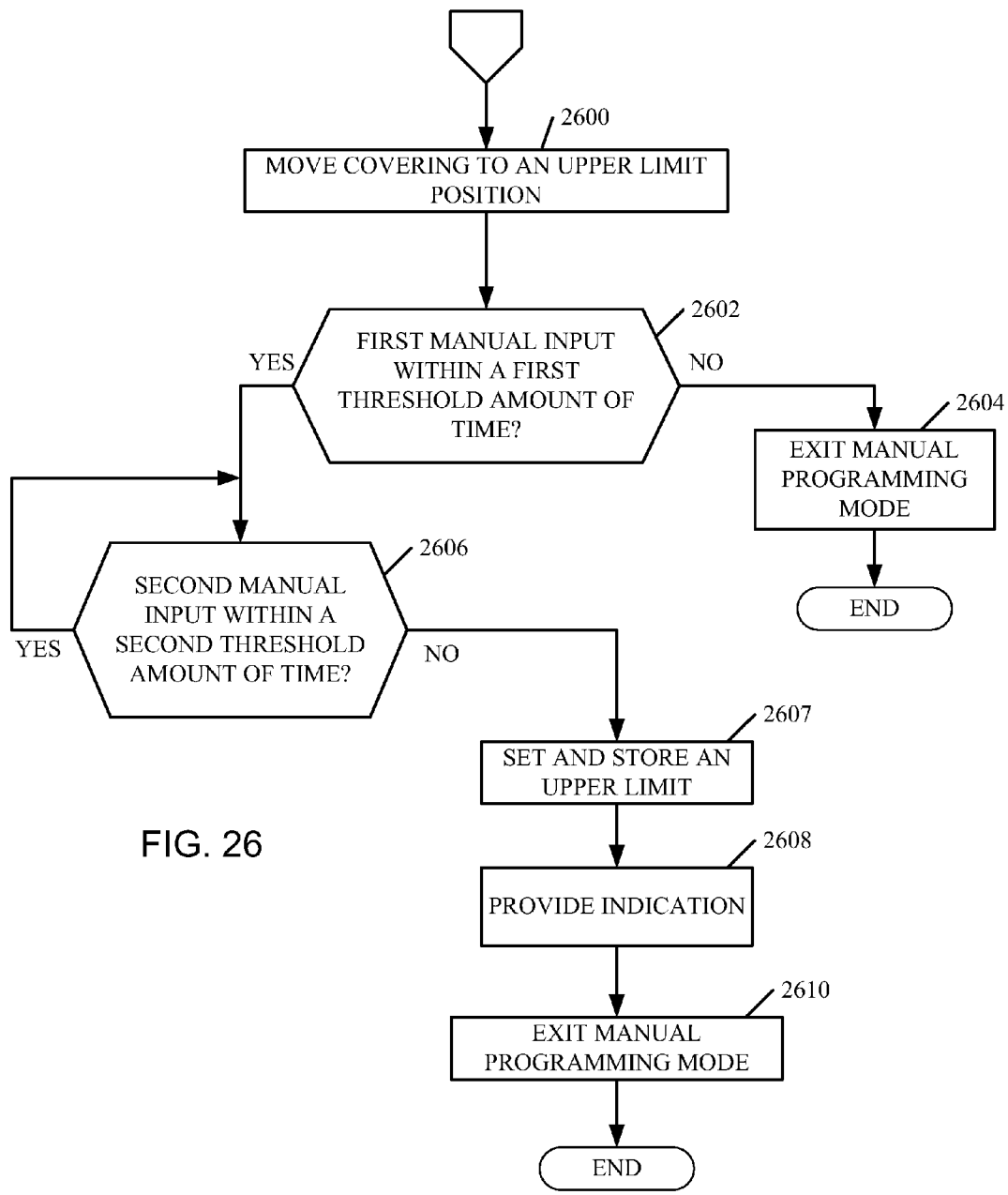

FIGS. 25-26 are machine readable instructions which may be used to implement the example controller 1100 of FIG. 14, the example controller 1622 of FIGS. 16-17, the example controller 1908 of FIG. 19 and/or the example controller 2000 of FIG. 20. In some examples, the example local controller 1100 sets and stores positions such as, for example, a lower limit position, an upper limit position, and/or any other desirable positions during a local programming mode. In such examples, a user may selectively set or adjust the positions using the manual controller 120.

The instructions 2500 of FIG. 25 begins with the local controller 1100 receiving a command from the manual controller 120 or the remote control 1310 to enter a local programming mode (block 2502). For example, the manual instruction processor 1418 senses movement of the tube 104 caused by the manual controller 120 (i.e., when the motor 602 is not operating). If the manual instruction processor 1418 determines that the user moved the tube 104 via the manual controller 120 in a predetermined sequence, the programming processor 1416 causes the local controller 1100 to enter the local programming mode. In some examples, the predetermined sequence is movement of the tube 104 within a threshold amount of time in the following sequence: movement in a first direction, then movement in a second direction, then movement in the first direction, and then movement in the second direction. The above-noted sequence is one example and, thus, other example sequences are used in other examples. In some examples, the local instruction receiver 1308 receives a signal from the remote control 1310 to enter the local programming mode. The programming processor 1416 causes the local controller 1100 to enter the local programming mode (block 2504).

The programming processor 1416 provides an indication that the local controller 1100 entered the local programming mode (block 2506). For example, the programming processor 1416 causes an alert sound to be provided by a speaker and/or an indicator (e.g., a light, a light emitting diode, etc.) to blink. In some examples, the motor controller 1424 sends a signal to the motor 602 to move the tube 104 to indicate that the local controller 1100 entered local programming mode. For example, the motor controller 1424 may drive the tube 104 in a first direction for one quarter turn and then drive the tube in the second direction for one quarter turn. In some such examples, the rotational direction determiner 1410 determines the winding direction and the unwinding direction using the example instructions 2100 of FIG. 21 while providing the indication. In some examples, in response to the command to enter the local programming mode, the fully unwound position determiner 1412 determines and sets the fully unwound position using the example instructions 2200 of FIG. 22.

The motor controller 1424 then sends a signal to the motor 602 to move the covering 106 toward a lower limit position (e.g., a previously set lower limit position, the fully unwound position, one revolution of the tube 104 from the fully unwound position in the winding direction, etc.) (block 2508). In some examples, while the covering 106 is moving (e.g., being lowered), the manual instruction processor 1418 determines whether a manual countermand is provided by a user. For example, while the covering 106 is moving, the user may input a manual countermand by providing a manual input via the manual controller 120 in a direction opposite a direction of the movement of the tube 104. If the manual instruction processor 1418 determines that a manual countermand occurred, the motor controller 1424 causes the motor 602 to stop. If no manual countermand is determined or detected by the manual instruction processor 1418, the motor controller 1424 causes the motor 602 to stop when the covering 106 is at the lower limit position (block 2510). In other examples, the manual instruction processor 1418 does not determine whether a manual countermand occurs while the covering 106 is moving, and the motor 602 is stopped when the covering 106 is at the lower limit position.

After the motor is stopped, the example manual instruction processor 1418 determines whether a first manual input has occurred within a first amount of time (block 2512). For example, the position of the covering 106 may be adjusted via the manual controller 120 or the remote control 1310, and the manual instruction processor 1418 may determine whether the positions of the tube 104 determined by the tube position monitor 1414 change within the first amount of time. If the user does not provide the first manual input within the first amount of time (e.g., thirty minutes), the programming processor 1416 exits the manual programming mode (block 2514). If the manual instruction processor 1418 determines that the user provided the first manual input within the first threshold amount of time, the manual instruction processor 1418 determines whether a second manual input occurs within a second amount of time (e.g., five seconds) (block 2516). If the manual instruction processor 1418 determines that no second manual input occurred, the programming processor 1416 sets the lower limit position (block 2517). In such examples, the lower limit position is a position of the covering 106 where the user moved the covering 106 via the first manual input. In some examples, the lower limit position is determined relative to the fully unwound position of the tube 104 by the tube position monitor 1414. At block 2518, an indication is provided. For example, the programming processor 1416 causes a sound to be emitted, a light to blink, the tube 104 to move, and/or any other suitable indication. If the example manual instruction processor 1418 determines that a second manual input occurred within the second amount of time, the instructions return to block 2516.

Continuing to FIG. 26, after block 2518, the motor controller 1424 sends a signal to the motor 602 to move the covering 106 to an upper limit position (block 2600). For example, if a previously set upper limit position exists, the motor controller 1424 causes the motor 602 to rotate the tube 104 toward the previously set upper limit position. In some examples, no previously set upper limit position exists (e.g., after power is initially supplied to the example local controller 1100). If no previously set upper limit position exists, the motor controller 1424 causes the motor 602 to rotate the tube 104 in the winding direction toward a position corresponding to a number of revolutions (e.g., one, two, one and one half, etc.) of the tube 104 in the winding direction from the lower limit position.

The manual instruction processor 1418 determines whether a first manual input occurred within a first threshold amount of time (block 2602). If the manual instruction processor 1418 determines that the user did not provide the first manual input within the first threshold amount of time (e.g., thirty minutes), the programming processor 1416 causes the local controller 1100 to exit the manual programming mode (block 2604). If the manual instruction processor 1418 determines the user provided the first manual input within the first threshold amount of time, the manual instruction processor 1418 determines whether a second manual input has occurred within a second threshold amount of time (e.g., five seconds) (block 2606). If the manual instruction processor 1418 determines that no second manual input occurred, the programming processor 1416 sets the upper limit position (block 2607). In such examples, the upper limit position is a position of the covering 106 determined by the tube position monitor 1414 where the covering 106 has been moved via the first manual input. Returning to block 2606, if the manual instruction processor 1418 determines that the user provided the second manual input within the threshold amount of time, the example instructions returns to block 2606. In such examples, the upper limit position set at block 2604 is a position of the covering 106 determined by the tube position monitor 1414 where the user moved the covering 106 after the second manual input. After the upper limit position is set, an indication is provided (block 2608). At block 2610, the programming processor 1416 causes the local controller 1100 to exit the local programming mode and return to normal operation awaiting a next instruction (e.g., an instruction to raise the covering 106, an instruction to lower the cover 102, an instruction to enter manual or central programming mode, etc.).

Although only the lower limit position and the upper limit position are set using the example instructions 2500 of FIGS. 25 and 26, in some examples, the programming processor 1416 sets one or more other positions (e.g., intermediate positions) while the local controller 1100 is in the local programming mode. In such examples, the local programming mode is used to set the lower limit position, the upper limit position, and/or one or more other positions. In some such examples, the one or more other positions are positions between the lower limit position and the upper limit position (i.e., intermediate positions).

Figure 27:
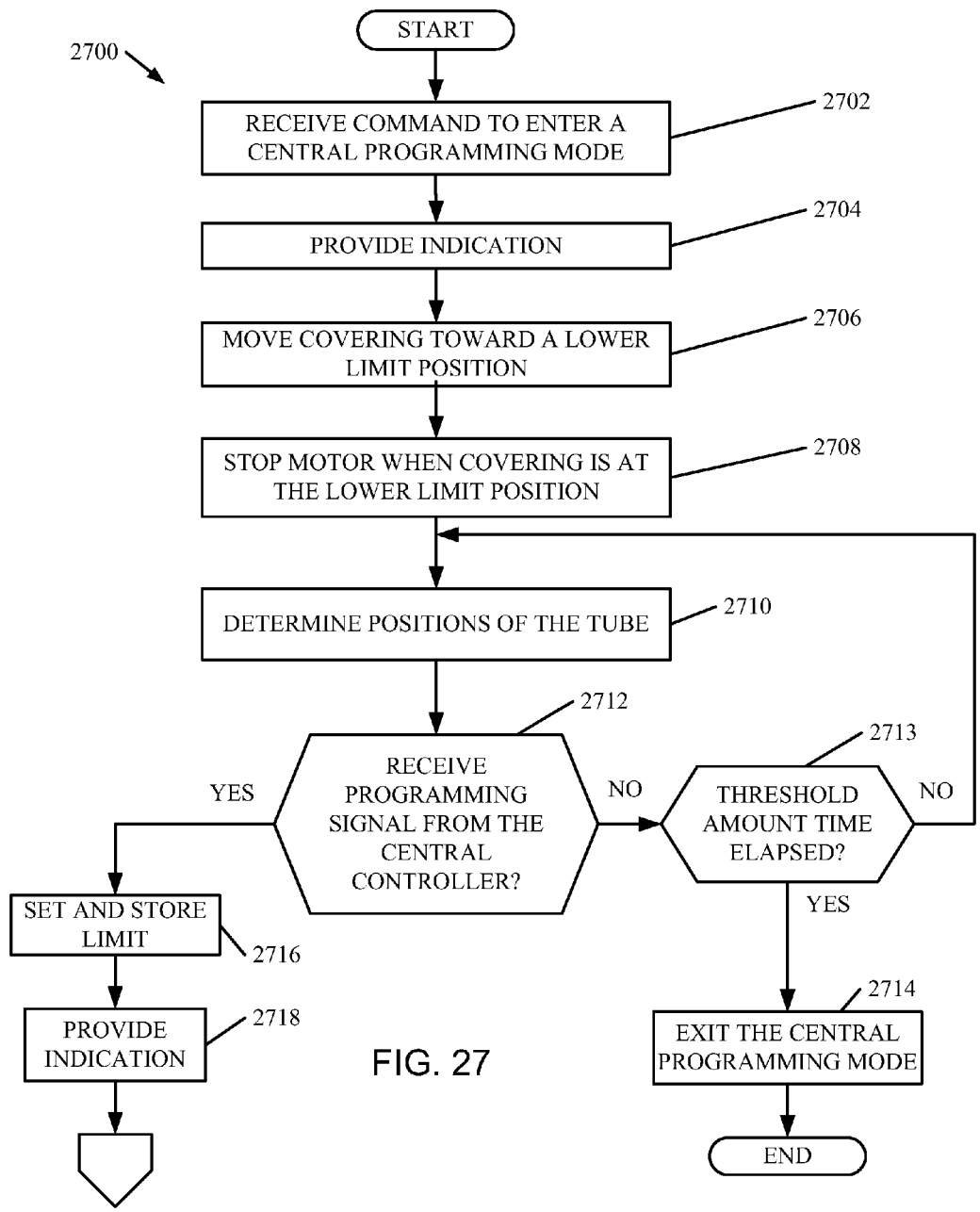
FIGS. 27-29 are flowcharts representative of example machine readable instructions for implementing one of the local controllers of FIG. 15.
Figure 28:
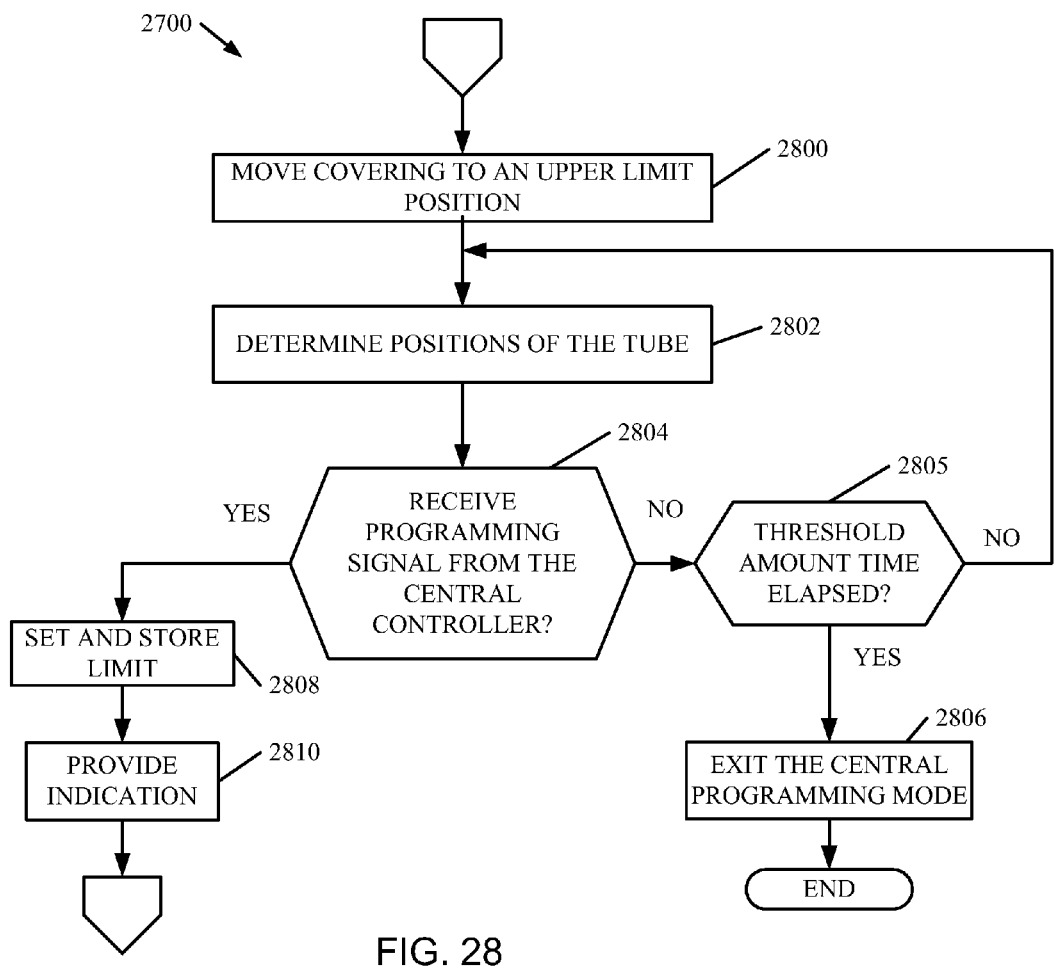
Figure 29:
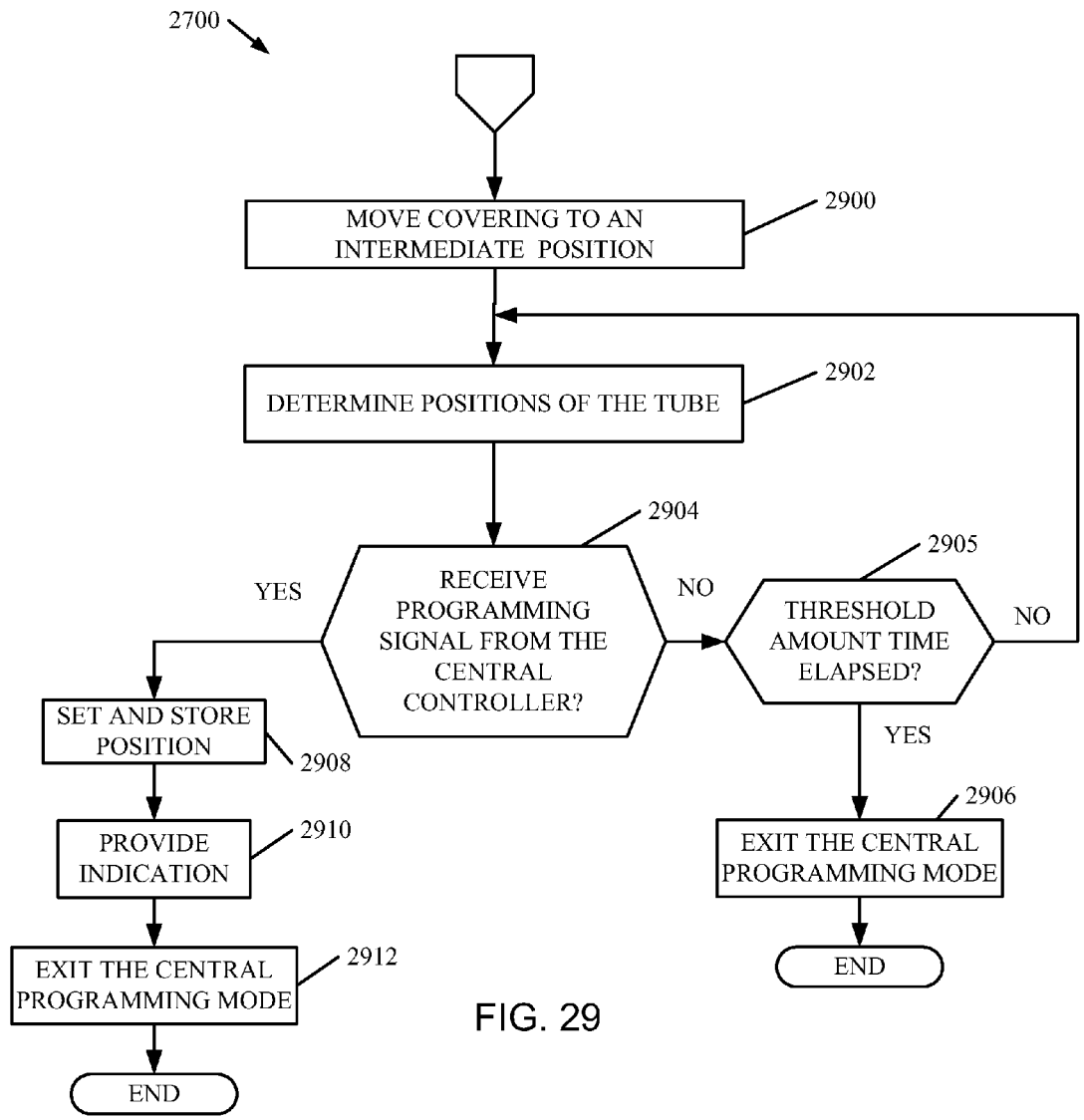

FIGS. 27-29 is a flow chart of example machine readable instructions 2700 which may be used to implement one of the plurality of example local controllers 1100, 1510, 1512, 1514, 1516 and 1518 of FIG. 15. In some examples, the central controller 1204 causes each of the example local controllers 1100, 1510, 1512, 1514, 1516 and 1518 of the architectural opening covering assemblies 100, 1500, 1502, 1504, 1506 and 1508 to enter a central programming mode in which the central controller 1204 is used to set a lower limit position, an upper limit position, and/or other positions of the coverings. For example, if a user actuates the input device 1210 of the example central controller 1204, the central controller 1204 transmits a signal (e.g., a signal having six polarity modulations within period of time) to the local controllers 1100, 1510, 1512, 1514, 1516 and 1518 of the architectural opening covering assemblies 100, 1500, 1502, 1504, 1506 and 1508 to cause each of the local controllers 1100, 1510, 1512, 1514, 1516 and 1518 to enter the central programming mode. In some examples, the user may also use the input device 1210 to collectively instruct the local controllers 1100, 1510, 1512, 1514, 1516 and 1518 to move the coverings to desired positions and cause the local controllers 1100, 1510, 1512, 1514, 1516 and 1518 store the positions of the respective coverings.

In some examples, the manual controllers 120, 1520, 1522, 1524, 1526 and 1528 of each the architectural opening covering assemblies 100, 1500, 1502, 1504, 1506 and 1508 may be used to individually move the respective coverings to desired positions, which are set via the central programming mode. For example, during the central programming mode, one or more of the coverings 102 may be moved via the manual controllers 120, 1520, 1522, 1524, 1526 and 1528 to desired positions such as, for example, lower limit positions, upper limit positions, intermediate positions, etc. After moving the one or more coverings, the input device 1210 of the central controller 1204 may be actuated to cause the central controller 1204 to send a signal to the local controllers 1100, 1510, 1512, 1514, 1516 and 1518 of each of the assemblies 100, 1500, 1502, 1504, 1506 and 1508. As a result, the local controllers 1100, 1510, 1512, 1514, 1516 and 1518 set the positions of the coverings 102 such as, for example, lower limit positions. During normal operation or operative mode, when the central controller 1204 sends a signal to the coverings 102 to move to the lower limit position, each of the coverings 102 moves to its respective lower limit position. Thus, although the architectural opening assemblies 100, 1500, 1502, 1504, 1506 and 1508 are collectively controlled via the central controller 1204, the users may set positions of the coverings via the manual controllers 120, 1520, 1522, 1524, 1526 and 1528 of each of the example architectural opening covering assemblies 100, 1500, 1502, 1504, 1506 and 1508.

The example instructions 2700 of FIG. 27 begin with the local controller 1100 receiving a command from the central controller 1204 to enter a central programming mode (block 2702). In some examples, a user actuates the input device 1210 of the central controller 1204 to cause the central controller 1204 to send the command to a plurality of architectural opening covering assemblies (e.g., the example architectural opening covering assemblies 100, 1500, 1502, 1504, 1506 and 1508 of FIG. 15). In some examples, the signal instruction processor 1406 of the local controller 1100 determines that the signal from the central controller 1204 corresponds to a command to enter the central programming mode using the example instructions 2300 of FIG. 23. In some examples, in response to the command to enter the central programming mode, the rotational direction determiner 1410 determines the winding direction and the unwinding direction using the example instructions 2100 of FIG. 21. In some examples, in response to receiving the command to enter the central programming mode, the fully unwound position determiner 1412 determines the fully unwound position of the covering 106 using the example instructions 2200 of FIG. 22. After the central controller 1204 sends the command to the local controller(s) 1100 to enter the central programming mode, the central controller 1204 causes an indication to be provided (block 2704). For example, the central controller 1204 causes a sound to be provided, a light to blink, and/or any other suitable indication. The indication may be provided at the central controller 1204 and/or at the architectural opening covering assembly 100.

In response to the command from the command from the central controller 1204, the motor controller 1424 sends a signal to the motor 602 to move the covering 102 toward a lower limit position (e.g., a previously set lower limit position, the fully unwound position, one revolution of the tube 104 from the fully unwound position in the winding direction, etc.) (block 2706). In some examples, the manual instruction processor 1418 continuously determines whether a manual countermand has occurred while the covering 106 is moving. For example, a manual countermand may be input via the manual controller 120. If the manual instruction processor 1418 determines that a manual countermand occurred, the motor 602 is stopped. If the manual instruction processor 1418 determines that no manual countermand occurred, the motor 602 is stopped when the covering 106 is at the lower limit position (block 2708). In other examples, the manual instruction processor 1418 does not continuously determine whether a manual countermand occurs while the covering 106 is moving, and the motor 602 is stopped when the covering 106 is at the lower limit position.

The tube position monitor 1414 determines positions of the tube 104 (block 2710). For example, after the covering 106 is stopped at the lower limit position, the user may move the covering 106 via the manual controller 120 (e.g., to a desired position), and the tube position monitor 1414 determines positions of the tube 104 relative to the fully unwound position and/or the lower limit position. Thus, if the central controller is communicatively coupled to a plurality of architectural opening covering assemblies, the user may move each of the coverings of the architectural opening covering assemblies to desired positions via their respective manual controllers. The programming processor 1416 determines whether a programming signal is received from the central controller 1204 (block 2712). In some examples, the programming processor 1416 determines whether a signal sent from the central controller 1204 is a programming signal using the example instructions 2300 of FIG. 23. In some such examples, the programming signal is a signal having six polarity modulations within a period of time (e.g., one second). If the programming processor 1416 determines that the programming signal is not received, the programming processor 1416 determines whether a threshold amount of time has elapsed (e.g., since the motor was stopped at the lower limit position) (block 2713). If the threshold amount of time has elapsed, the programming processor 1416 causes the local controller 1100 to exit the central programming mode (block 2714). In some examples, the threshold amount of time is thirty minutes. If the threshold amount of time has not elapsed, the example instructions return to block 2710.

If the programming signal is received from the central controller 1204, the programming processor 1416 sets a lower limit position (block 2716). In such examples, the lower limit position is a position of the covering 106 when the programming signal was received at block 2712. The central controller 1204 causes an indication to be provided (block 2718).

Continuing to FIG. 28, after block 2718, the motor controller 1424 sends a signal to the motor 602 to move the covering 106 to an upper limit position (block 2800). For example, if a previously set upper limit position exists, the motor controller 1424 causes the motor 602 to rotate the tube 104 toward the previously set upper limit position. In some examples, no previously set upper limit position exists (e.g., after power is initially supplied to the example local controller 1100). If no previously set upper limit position exists, the motor controller 1424 causes the motor 602 to rotate the tube 104 in the winding direction toward a position corresponding to a number of revolutions (e.g., one, two, one and one half, etc.) of the tube 104 in the winding direction from the lower limit position.

After the covering moves to the upper limit position, the tube position monitor 1414 determines positions of the tube 104 (block 2802). For example, after the covering 106 is stopped at the upper limit position, the user may move the covering 106 via the manual controller 120 (e.g., to a desired position), and the tube position monitor 1414 determines positions of the tube 104 relative to the fully unwound position, the lower limit position, the upper limit position, etc. Thus, if the central controller is communicatively coupled to a plurality of architectural opening covering assemblies, the user may move each of the coverings of the architectural opening covering assemblies to desired positions via their respective manual controllers.

The programming processor 1416 determines whether a programming signal is received from the central controller 1204 (block 2804). If the programming processor 1416 determines that the programming signal is not received, the programming processor 1416 determines whether a threshold amount of time has elapsed (e.g., since the covering moved to the upper limit position) (block 2805). If the threshold amount of time has not elapsed, the example instructions return to block 2802. If the threshold amount of time has elapsed, the programming processor 1416 causes the local controller 1100 to exit the central programming mode (block 2806). In some examples, the threshold amount of time is thirty minutes.

If the programming signal is received from the central controller 1204, the programming processor 1416 sets an upper limit position (block 2808). The central controller 1204 causes an indication to be provided (block 2810).

Continuing to FIG. 29, after block 2810, the motor controller 1424 sends a signal to the motor 602 to move the covering 106 to an intermediate position (i.e., a position between the lower limit position and the upper limit position) (block 2900). For example, if a previously set intermediate position exists, the motor controller 1424 causes the motor 602 to rotate the tube 104 toward the previously set intermediate position. In some examples, no previously set intermediate position exists (e.g., after power is initially supplied to the example local controller 1100). If no previously set intermediate position exists, the motor controller 1424 causes the motor 602 to rotate the tube 104 in the unwinding direction toward a position corresponding to a number of revolutions (e.g., one, two, one and one half, etc.) of the tube 104 in the unwinding direction from the upper limit position or toward any other suitable position (e.g., half way between the upper limit position and the lower limit position).

After the covering 106 moves to the intermediate position, the tube position monitor 1414 determines positions of the tube 104 (block 2902). For example, after the covering 106 is stopped at the intermediate position, the user may move the covering 106 via the manual controller 120 (e.g., to a desired position), and the tube position monitor 1414 determines positions of the tube 104 relative to the fully unwound position, the lower limit position, the upper limit position, etc. Thus, if the central controller 1204 is communicatively coupled to a plurality of architectural opening covering assemblies (e.g., the architectural opening covering assemblies 100, 1500, 1502, 1504, 1506 and 1508 of FIG. 15), the user may move each of the coverings of the architectural opening covering assemblies to desired positions via their respective manual controllers.

The programming processor 1416 determines whether a programming signal is received from the central controller 1204 (block 2904). If the programming processor 1416 determines that the programming signal is not received, the programming processor 1416 determines whether a threshold amount of time has elapsed (e.g., since the covering was moved to the intermediate position) (block 2905). If the threshold amount of time has elapsed, the programming processor 1416 causes the local controller 1100 to exit the central programming mode (block 2906). If the programming processor 1416 determines that the threshold amount of time has not elapsed, the example instructions return to block 2902. In some examples, the threshold amount of time is thirty minutes.

If the programming signal is received from the central controller 1204, the programming processor 1416 sets and stores an intermediate position (block 2908). The central controller 1204 causes an indication to be provided (block 2910), and the programming processor 1416 causes the local controller 1100 to exit the central programming mode (block 2912). In some examples, the central programming mode is used to set one or more other positions.

Figure 30:
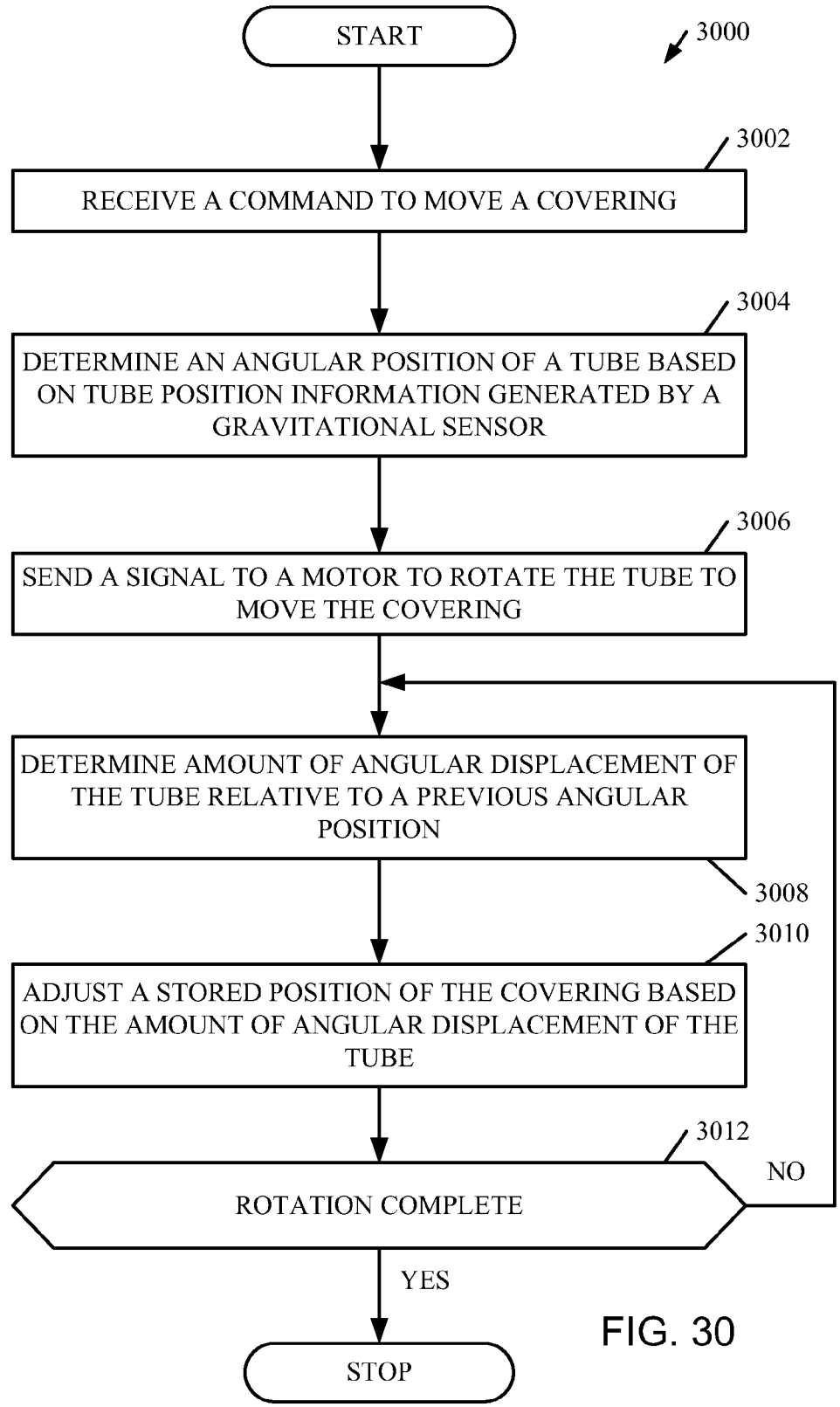
FIG. 30 is a flow chart representative of example machine readable instructions for implementing the local controller of FIG. 19.

FIG. 30 is a flow chart representative of example machine readable instructions that may be executed to implement the example controller 1100 of FIG. 14, the example controller 1622 of FIGS. 16-17, the example controller 1908 of FIG. 19, and/or the example controller 2000 of FIG. 20. The example instructions 3000 of FIG. 30 are executed to raise or lower the covering 1606. In some examples, the instructions are initiated in response to a command from the input device 1638 and/or the instruction processor 2008.

The example instructions 3000 of FIG. 30 begin by the instruction processor 2008 receiving a command to move the covering 1606 (block 3002). For example, the instruction processor 2008 may receive the command from the input device 1638 to raise the covering 1606; to lower the covering 1606; to move the covering 1606 to a lower limit position, an upper limit position, a preset position between the lower limit position and the upper limit position; etc. The angular position determiner 2002 determines an angular position of the tube 1604 based on tube position information generated by the gravitational sensor 1626 (block 3004). Based on the position of the covering 1606 and the command, the instruction processor 2008 instructs the motor controller 2012 to send a signal to the motor 1620 to rotate the tube 1604 to move the covering 1606. For example, if the covering 1606 is at the lower limit position and the instruction received from the input device 1638 is to move the covering 1606 to the upper limit position, the instruction processor 2008 provides instructions to the motor controller 2012 to raise the covering 1606. The example covering position determiner 2006 may determine an amount of rotation of the tube 1604 (e.g., 1.5 revolutions, etc.) to move the covering 1606 to a commanded position.

The motor controller 2012 sends a signal to the motor 1620 to rotate the tube 1604 to move the covering 1606 (block 3006). While the tube 1604 is rotating, the covering position determiner 2006 determines an amount of angular displacement of the tube 1604 relative to a previous angular position (block 3008). For example, the covering position determiner 2006 may increment an amount of rotation of the tube 1604 relative to the previous angular position and/or subtract the previous angular position from an angular position determined based on tube position information generated by the gravitational sensor 1626. The covering position determiner 2006 may also increment a number of revolutions rotated by the tube 1604.

The covering position determiner 2006 adjusts a stored position of the covering 1606 based on the amount of angular displacement of the tube 1604 (block 3010). The example covering position determiner 2006 determines the position of the covering 1606 relative to a reference position such as, for example, the lower limit position, the fully unwound position, etc. The position of the covering 1606 may be determined in units of degrees, revolutions, and/or any other unit of measurement relative to the reference position. In some examples, the covering position determiner 2006 determines the position of the covering 1606 based on tube position information generated by the gravitational sensor 1626, the angular position information determined by the angular position determiner 2002, the angular displacement of the tube 1604, and/or previously stored position information.

The covering position determiner 2006 determines if rotation of the tube 1604 is complete. For example, the covering position determiner 2006 may determine if the covering 1606 is at the commanded position and/or if the tube 1604 has rotated the amount of rotation determined by the covering position determiner 2006 to move the covering 1606 to the commanded position. If the rotation is not complete, the example instructions 3000 return to block 3008. If the rotation is complete (i.e., the covering 1606 is at the commanded position or a limit position), the motor controller 2012 sends a signal to the motor 1620 to stop rotation of the tube 1604 (block 3012).

Figure 31:
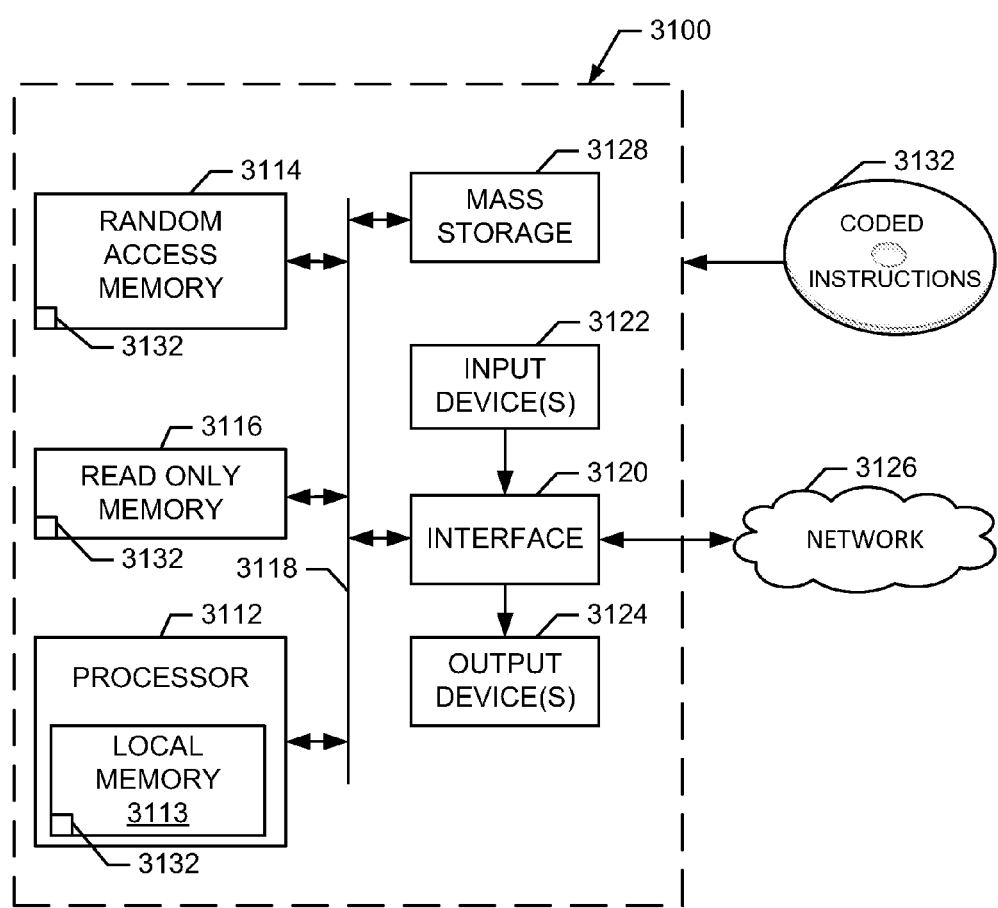
FIG. 31 is a block diagram of an example processor platform to execute the machine readable instructions of FIGS. 21-30 to implement the local controller of FIG. 14, the controller of FIG. 16, the controller of FIG. 19, and/or the controller of FIG. 20.

FIG. 31 is a block diagram of an example processor platform 3100 capable of executing the instructions of FIGS. 21-30 to implement the central controller 1204 of FIGS. 12, 13 and 15, the local controller 1100 of FIG. 14, the controller 1622 of FIG. 16, the controller 1908 of FIG. 19, and/or the controller 2000 of FIG. 20. The processor platform 3100 can be, for example, a server, a personal computer, or any other suitable type of computing device.

The processor platform 3100 of the instant example includes a processor 3112. For example, the processor 3112 can be implemented by one or more microprocessors or controllers from any desired family or manufacturer.

The processor 3112 includes a local memory 3113 (e.g., a cache) and is in communication with a main memory including a volatile memory 3114 and a non-volatile memory 3116 via a bus 3118. The volatile memory 3114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3116 may be implemented by flash memory and/or any other desired type of memory device. Access to the main memory 3114, 3116 is controlled by a memory controller.

The processor platform 3100 also includes an interface circuit 3120. The interface circuit 3120 may be implemented by any type of interface standard, such as an Ethernet interface, a universal serial bus (USB), and/or a PCI express interface.

One or more input devices 3122 are connected to the interface circuit 3120. The input device(s) 3122 permit a user to enter data and commands into the processor 3112. The input device(s) can be implemented by, for example, a keyboard, a mouse, a touchscreen, a track-pad, a trackball, isopoint, a button, a switch, and/or a voice recognition system.

One or more output devices 3124 are also connected to the interface circuit 3120. The output devices 3124 can be implemented, for example, by display devices (e.g., a liquid crystal display, speakers, etc.).

The processor platform 3100 also includes one or more mass storage devices 3128 (e.g., flash memory drive) for storing software and data. The mass storage device 3128 may implement the local storage device 3113.

The coded instructions 3132 of FIGS. 21-30 may be stored in the mass storage device 3128, in the volatile memory 3114, in the non-volatile memory 3116, and/or on a removable storage medium such as a flash memory drive.

From the foregoing, it will appreciate that the above disclosed instructions, methods, apparatus and articles of manufacture enable one or more architectural opening covering assemblies to be automatically raised or lowered by a central controller while enabling a local user to also manually lower or raise each of the coverings via respective manual controllers. The example architectural opening covering assemblies disclosed herein include a motor and a local controller disposed inside a tube of each of the covering assemblies. Each of the local controllers is communicatively coupled to the central controller, and the local controllers and/or the central controller may be used to set desired positions of the coverings (e.g., a lower limit position, an upper limit position, etc.). Some example architectural opening covering assemblies disclosed above include a gravitational sensor, which determines angular positions of a tube of the architectural opening covering based on gravity.

In some instances, the manual controller and the motor cooperate to assist in moving the covering via the manual controller. In other instances, the example local controller controls the motor to counter the operation of the manual controller to prevent lowering or raising the architectural opening covering past a threshold position such as, for example, a lower limit position or an upper limit position. In some examples, a user may countermand or cancel a command from the local controller by operating the manual controller.

Although certain example methods, apparatus and articles of manufacture have been described herein, the scope of coverage of this patent is not limited thereto. On the contrary, this patent covers all methods, apparatus and articles of manufacture fairly falling within the scope of this patent.

What is claimed is:

1. An architectural opening covering assembly, comprising:
a manual controller operatively coupled to a tube to rotate the tube, the tube including an architectural opening covering;
a motor including a motor housing and a motor shaft;
a clutch assembly including a clutch and a clutch housing in which the clutch is disposed, wherein the clutch housing, the tube, and the motor housing are coupled to rotate together;
a gravitational sensor constructed to determine an angular position of the tube; and
a local controller communicatively coupled to the motor, the local controller constructed to:
determine which one of rotation of the tube in a first direction or rotation of the tube in a second direction is to cause the architectural opening covering to wind or unwind around the tube;
detect movement of the tube using the gravitational sensor;
determine whether the movement of the tube is caused by one or both of the motor and the manual controller; and
operate the motor based on the movement and the cause of the movement, wherein, when the motor operates, the clutch enables relative movement between the motor shaft and the clutch housing so that operation of the motor causes the motor housing to rotate, rotating the clutch housing and the tube.

2. The architectural opening covering assembly of claim 1, further including a central controller communicatively coupled to the local controller, wherein a position of the covering is controlled via one or more of the manual controller, the local controller, and the central controller.

3. The architectural opening covering assembly of claim 1, wherein the gravitational sensor is an accelerometer.

4. The architectural opening covering assembly of claim 1, wherein the gravitational sensor is disposed along an axis of rotation of the tube.

5. The architectural opening covering assembly of claim 1, wherein the local controller is constructed to cause the motor to at least one of assist movement or counter movement of the covering by the manual controller.

6. The architectural opening covering of claim 1, wherein operation of the manual controller is constructed to counteract rotation of the tube by the motor.

7. The architectural opening covering of claim 1, wherein the local controller is constructed to determine a position of the architectural opening covering based on the angular position of the tube.

8. The architectural opening covering assembly of claim 7, wherein the local controller is constructed to store one or more positions of the architectural opening covering, the positions selectively adjustable via the manual controller.

9. A tangible computer readable storage medium comprising instructions that, when executed, cause a machine to at least:
determine which one of rotation of a tube in a first direction or rotation of the tube in a second direction is to cause an architectural opening covering to wind or unwind around the tube;
detect movement of the tube of the architectural opening covering assembly;
determine whether the movement of the tube is caused by one or both of a motor and a manual controller, the manual controller operatively coupled to the tube, the motor including a motor housing and a motor shaft, the motor housing coupled to a clutch housing of a clutch assembly, the clutch assembly including a clutch and the clutch housing in which the clutch is disposed, wherein the clutch housing, the tube, and the motor housing are coupled to rotate together; and
operate the motor based on the movement and the cause of the movement, wherein when the motor operates, the clutch enables relative movement between the motor shaft and the clutch housing so that operation of the motor causes the motor housing to rotate, rotating the clutch housing and the tube.

10. The tangible computer readable storage medium of claim 9, wherein the instructions, when executed, cause the machine to operate the motor to assist movement of the tube by the manual controller.

11. The tangible computer readable storage medium of claim 9, wherein the instructions, when executed, cause the machine to operate the motor to counter movement of the tube by the manual controller.

12. The tangible computer readable storage medium of claim 11, wherein the instructions, when executed, cause the machine to counter movement of the tube by the manual controller to substantially prevent the tube from unwinding the architectural opening covering at least partially wound around the tube past a threshold position.

13. The tangible computer readable storage medium of claim 9, wherein the instructions, when executed, cause the machine to terminate operation of the motor in response to operation of the manual controller.

14. The tangible computer readable storage medium of claim 9, wherein the instructions, when executed, further cause the machine to:
enter a programming mode in response to a command from the manual controller;
determine a position of the tube; and
store the position of the tube.

15. The tangible computer readable storage medium of claim 14, wherein the instructions, when executed, cause the machine to determine the position of the tube using a gravitational sensor.

16. The tangible computer readable storage medium of claim 9, wherein the instructions, when executed, cause the machine to:
rotate the tube in the first direction; and rotate the tube in the second direction.

17. The tangible computer readable storage medium of claim 16, wherein the instructions, when executed, further cause the machine to at least determine an amperage of a first signal transmitted to the motor to rotate the tube in the first direction and an amperage of a second signal transmitted to the motor to rotate the tube in the second direction.

18. The tangible computer readable storage medium of claim 9, wherein the instructions, when executed, cause the machine to:
operate the motor to lower the architectural opening covering by causing rotation of the tube; and
determine a position of the tube at which the architectural opening covering is substantially fully unwound.

19. The tangible computer readable storage medium of claim 18, wherein the instructions, when executed, cause the machine to operate the motor to lower the architectural opening covering by causing the motor to apply an amount of torque to the tube less than an amount of torque applied to the tube by a weight of the architectural opening covering.

20. The tangible computer readable storage medium of claim 18, wherein the instructions, when executed, cause the machine to determine the position of the tube by detecting operation of the motor and detecting a lack of rotation of the tube.

21. The tangible computer readable storage medium of claim 20, wherein the instructions, when executed, cause the machine to detect the lack of rotation of the tube using a gravitational sensor.

* * * * *